US012732108B2

(12) United States Patent
Zhang et al.

(10) Patent No.: US 12,732,108 B2
(45) Date of Patent: Sep. 8, 2026

(54) SYSTEMS AND METHODS FOR DRIVING BIPOLAR TRANSISTORS RELATED TO POWER CONVERTERS BY AT LEAST USING THREE SWITCHES

(71) Applicant: ON-BRIGHT ELECTRONICS (SHANGHAI) CO., LTD., Shanghai (CN)

(72) Inventors: Xiuhong Zhang, Shanghai (CN); Lieyi Fang, Shanghai (CN)

(73) Assignee: ON-BRIGHT ELECTRONICS (SHANGHAI) CO., LTD., Shanghai (CN)

( * ) Notice: Subject to any disclaimer, the term of this patent is extended or adjusted under 35 U.S.C. 154(b) by 289 days.

(21) Appl. No.: 18/214,433

(22) Filed: Jun. 26, 2023

(65) Prior Publication Data

US 2024/0006999 A1 Jan. 4, 2024

(30) Foreign Application Priority Data

Jun. 27, 2022 (CN) ......................... 202210737276.2

(51) Int. Cl.

*H02M 3/335* (2006.01)
*H02M 1/088* (2006.01)
*H02M 1/32* (2007.01)

(52) U.S. Cl.

CPC ........... *H02M 3/335* (2013.01); *H02M 1/088* (2013.01); *H02M 1/32* (2013.01); *H02M 3/33507* (2013.01)

(58) Field of Classification Search

CPC ............. H02M 1/0003; H02M 1/0009; H02M 1/0029; H02M 1/0087; H02M 1/0038;

(Continued)

(56) References Cited

U.S. PATENT DOCUMENTS 6,212,084 B1 * 4/2001 Turner .................. H02M 7/217 363/127
8,693,223 B2 4/2014 Lin (Continued)

FOREIGN PATENT DOCUMENTS

CN 1287403 A 3/2001
CN 101753075 A 6/2010

(Continued)

OTHER PUBLICATIONS

Taiwan Intellectual Property Office, Office Action issued Jun. 6, 2023, in Application No. 111145067.

(Continued)

*Primary Examiner* — Thienvu V Tran
*Assistant Examiner* — Shahzeb K Ahmad
(74) *Attorney, Agent, or Firm* — Faegre Drinker Biddle & Reath LLP

(57) ABSTRACT

Controller and method for a power converter. For example, a controller for a power converter, the controller comprising: a first controller terminal connected to a first base of a first bipolar transistor, the first bipolar transistor further including a first collector and a first emitter; a second controller terminal connected to the first emitter of the first bipolar transistor and a second base of a second bipolar transistor, the second bipolar transistor further including a second collector and a second emitter, the second collector being connected to the first collector; a third controller terminal connected to a first resistor terminal of a resistor, the resistor further including a second resistor terminal; a fourth controller terminal connected to the second resistor terminal and also connected through a first transistor to the second emitter of the second bipolar transistor.

20 Claims, 15 Drawing Sheets

(58) Field of Classification Search

CPC .......... H02M 1/08; H02M 1/088; H02M 3/22; H02M 3/24; H02M 3/335; H02M 3/33507; H02M 3/33523; H02M 3/3353; H02M 3/33538; H02M 3/33546; H02M 3/33553; H02M 3/33561; H02M 3/33569; H02M 3/33571; H02M 3/337; H02M 7/155; H02M 7/21; H02M 7/217

See application file for complete search history.

(56) References Cited

U.S. PATENT DOCUMENTS

| | | | |
|---|---|---|---|
| 9,166,490 B2 | 10/2015 | Yu et al. | |
| 9,537,396 B2 | 1/2017 | Knoedgen | |
| 9,843,263 B2 | 12/2017 | Zhai et al. | |
| 10,090,688 B2 | 10/2018 | Houston et al. | |
| 11,181,966 B2 | 11/2021 | Waters et al. | |
| 11,303,218 B2 | 4/2022 | Chen et al. | |
| 2007/0139095 A1* | 6/2007 | Fang | H02M 3/33507 327/432 |
| 2009/0040796 A1 | 2/2009 | Lalithambika et al. | |
| 2014/0056036 A1 | 2/2014 | Pan et al. | |
| 2014/0146575 A1 | 5/2014 | Tse et al. | |
| 2014/0286057 A1 | 9/2014 | Ho et al. | |
| 2017/0317577 A1 | 11/2017 | Zhang et al. | |
| 2018/0177009 A1 | 6/2018 | Zhang et al. | |
| 2022/0364488 A1 | 11/2022 | Stoltz | |
| 2023/0299607 A1* | 9/2023 | Yang | H02J 7/007 |
| 2023/0299608 A1* | 9/2023 | Huang | H02M 1/36 320/137 |
| 2023/0299766 A1* | 9/2023 | Huang | H03K 17/567 327/575 |
| 2023/0369963 A1 | 11/2023 | Zhang et al. | |
| 2024/0204554 A1 | 6/2024 | Wang et al. | |
| 2024/0235223 A1 | 7/2024 | Zheng et al. | |
| 2024/0235224 A1 | 7/2024 | Zheng et al. | |
| 2025/0253686 A1 | 8/2025 | Zheng et al. | |

FOREIGN PATENT DOCUMENTS

| | | | |
|---|---|---|---|
| CN | 101894834 A | 11/2010 | |
| CN | 103475210 B | 4/2016 | |
| CN | 105553887 A | 5/2016 | |
| CN | 106341048 A | 1/2017 | |
| CN | 106385091 A | 2/2017 | |
| CN | 206698127 U | 12/2017 | |
| CN | 206698140 U * | 12/2017 | H02M 3/33507 |
| CN | 207234465 U | 4/2018 | |
| CN | 108880296 A | 11/2018 | |
| CN | 110504250 A | 11/2019 | |
| CN | 110799378 A | 2/2020 | |
| CN | 211791278 U | 10/2020 | |
| CN | 111934403 A | 11/2020 | |
| CN | 112290646 A | 1/2021 | |
| CN | 112366799 A | 2/2021 | |
| CN | 108282089 B | 4/2021 | |
| CN | 112636411 A | 4/2021 | |
| CN | 112825312 A | 5/2021 | |
| CN | 112913106 A | 6/2021 | |
| CN | 110739739 B | 8/2021 | |
| CN | 113315192 A | 8/2021 | |
| CN | 113767651 A | 12/2021 | |
| CN | 114336533 A | 4/2022 | |
| CN | 114938043 A | 8/2022 | |
| CN | 217545855 U | 10/2022 | |
| CN | 115395606 A | 11/2022 | |
| CN | 115498725 A | 12/2022 | |
| CN | 218041230 U | 12/2022 | |
| CN | 218124557 U | 12/2022 | |
| JP | 2004-289891 A | 10/2004 | |
| JP | 5912513 B2 | 4/2016 | |
| JP | 5986839 B2 | 9/2016 | |
| TW | 200803142 A | 1/2008 | |
| TW | 201603444 A | 1/2016 | |
| TW | 201624892 A | 7/2016 | |
| TW | 202040920 A | 11/2020 | |
| TW | M624994 U | 4/2022 | |
| TW | I763527 B | 5/2022 | |
| TW | M629346 U | 7/2022 | |
| TW | 202249381 A | 12/2022 | |
| TW | M640153 U | 4/2023 | |
| WO | 2018/040170 A1 | 3/2018 | |
| WO | 2022/214083 A1 | 10/2022 | |

OTHER PUBLICATIONS

Taiwan Intellectual Property Office, Office Action issued Mar. 3, 2023, in Application No. 111135592.

Taiwan Intellectual Property Office, Office Action issued Nov. 3, 2023, in Application No. 112112686.

Taiwan Intellectual Property Office, Office Action issued Oct. 11, 2023, in Application No. 112112687.

Taiwan Intellectual Property Office, Office Action issued Oct. 11, 2023, in Application No. 112112688.

Taiwan Intellectual Property Office, Office Action issued Sep. 5, 2023, in Application No. 112106152.

Zhang, "A novel drive circuit of monolithic emitter-switching bipolar transistor (ESBT)," Manufacturing Automation, vol. 37, No. 11, pp. 86-89, Nov. 2015.

China Intellectual Property Office, Office Action issued Jun. 4, 2025, in Application No. 202210737276.2.

China Intellectual Property Office, Office Action issued Jun. 5, 2025, in Application No. 202210520590.5.

United States Patent and Trademark Office, Office Action issued Jul. 31, 2025, in U.S. Appl. No. 18/196,667.

China Intellectual Property Office, Office Action issued Dec. 1, 2025, in Application No. 202211630534.3.

China Intellectual Property Office, Office Action issued Dec. 1, 2025, in Application No. 202310012608.5.

China Intellectual Property Office, Office Action issued Dec. 1, 2025, in Application No. 202310012633.3.

China Intellectual Property Office, Office Action issued Nov. 15, 2025, in Application No. 202310012688.4.

He et al., "Novel Current Testing Method Suitable for Switching Voltage Stabilizers," Modern Electronic Technology, Issue 16, pp. 198-201, 2010.

United States Patent and Trademark Office, Notice of Allowance mailed Feb. 19, 2026, in U.S. Appl. No. 18/196,667.

United States Patent and Trademark Office, Notice of Allowance issued May 14, 2026, in U.S. Appl. No. 18/196,667.

* cited by examiner

SYSTEMS AND METHODS FOR DRIVING BIPOLAR TRANSISTORS RELATED TO POWER CONVERTERS BY AT LEAST USING THREE SWITCHES

1. CROSS-REFERENCES TO RELATED APPLICATIONS

This application claims priority to Chinese Patent Application No. 202210737276.2, filed Jun. 27, 2022, incorporated by reference herein for all purposes.

2. BACKGROUND OF THE INVENTION

Certain embodiments of the present invention are directed to circuits. More particularly, some embodiments of the invention provide systems and methods for driving bipolar transistors by at least using three switches. Merely by way of example, some embodiments of the invention have been applied to flyback power converters. But it would be recognized that the invention has a much broader range of applicability.

Among conventional power converters with small and/or medium output power levels, flyback power converters based on primary-side feedback have become a popular choice. Often the flyback power converters based on primary-side feedback possess a small size and can be made at a low cost. Additionally, the flyback power converters based on primary-side feedback include only simple circuits that can provide high conversion efficiency. In recent years, for the output power level that is less than 10 watts, bipolar transistors are widely used in the flyback power converters. The bipolar transistors usually possess good switching characteristics at low costs.

With the increasing functions of mobile devices such as cell phones and tablet computers, the capacity of the batteries that supply power to the mobile devices has also increased significantly. Consequently, for these batteries, chargers and/or adapters often need to provide larger output power. As an example, over the years, the output power of the chargers and/or adapters has changed from 5 watts to 65 watts. Even though the output power has increased, the chargers and/or adapters still need to reduce further in size and/or becomes more efficient.

Hence it is highly desirable to improve the technique for power converters with bipolar transistors.

3. BRIEF SUMMARY OF THE INVENTION

Certain embodiments of the present invention are directed to circuits. More particularly, some embodiments of the invention provide systems and methods for driving bipolar transistors by at least using three switches. Merely by way of example, some embodiments of the invention have been applied to flyback power converters. But it would be recognized that the invention has a much broader range of applicability.

According to certain embodiments, a controller for a power converter, the controller comprising: a first controller terminal connected to a first base of a first bipolar transistor, the first bipolar transistor further including a first collector and a first emitter; a second controller terminal connected to the first emitter of the first bipolar transistor and a second base of a second bipolar transistor, the second bipolar transistor further including a second collector and a second emitter, the second collector being connected to the first collector; a third controller terminal connected to a first resistor terminal of a resistor, the resistor further including a second resistor terminal; a fourth controller terminal connected to the second resistor terminal and also connected through a first transistor to the second emitter of the second bipolar transistor, the resistor being configured to generate a sensing voltage received by the third controller terminal with respect to a controller ground voltage at the fourth controller terminal; wherein: if an absolute value of the sensing voltage with respect to the controller ground voltage is smaller than a predetermined threshold, the first controller terminal is configured to output a first current to the first base to generate a second current at the first emitter, the second current flowing from the first emitter to the second base to turn on the second bipolar transistor; and if the absolute value of the sensing voltage with respect to the controller ground voltage reaches the predetermined threshold, the first controller terminal is configured to stop the second current from flowing from the first emitter to the second base and the second controller terminal is configured to make a base voltage at the second base of the second bipolar transistor floating before the second bipolar transistor becomes turned off.

According to some embodiments, a controller for a power converter includes: a current source configured to generate a first current; a first transistor including a first transistor terminal, a second transistor terminal, and a third transistor terminal, the first transistor terminal being connected to the current source; a second transistor including a fourth transistor terminal, a fifth transistor terminal, and a sixth transistor terminal, the fourth transistor terminal being connected to the third transistor terminal; a third transistor including a seventh transistor terminal, an eighth transistor terminal, and a ninth transistor terminal, the seventh transistor terminal being connected to the sixth transistor terminal; and a drive voltage generator configured to: output a first drive voltage to the second transistor terminal of the first transistor; output a second drive voltage to the fifth transistor terminal of the second transistor; and output a third drive voltage to the eighth transistor terminal of the third transistor.

According to certain embodiments, a method for a power converter, the method comprising: receiving a sensing voltage from a resistor with respect to a controller ground voltage; if an absolute value of the sensing voltage with respect to the controller ground voltage is smaller than a predetermined threshold, outputting a first current to a first base of a first bipolar transistor to generate a second current at a first emitter of the first bipolar transistor, the first emitter of the first bipolar transistor being connected to a second base of a second bipolar transistor, the second current flowing to the second base to turn on the second bipolar transistor, the first bipolar transistor further including a first collector, the second bipolar transistor further including a second collector and a second emitter, the second collector being connected to the first collector, the second emitter being connected to the resistor through a transistor; and if the absolute value of the sensing voltage with respect to the controller ground voltage reaches the predetermined threshold, stopping the second current from flowing from the first emitter to the second base and making a base voltage at the second base of the second bipolar transistor floating before the second bipolar transistor becomes turned off.

According to some embodiments, a method for a power converter includes: outputting a first drive voltage to a first transistor including a first transistor terminal, a second transistor terminal, and a third transistor terminal, the first transistor terminal being connected to a current source configured to generate a first current, the second transistor terminal being configured to receive the first drive voltage; outputting a second drive voltage to a second transistor, the second transistor including a fourth transistor terminal, a fifth transistor terminal, and a sixth transistor terminal, the fourth transistor terminal being connected to the third transistor terminal, the fifth transistor terminal configured to receive the second drive voltage; and outputting a third drive voltage to a third transistor, the third transistor including a seventh transistor terminal, an eighth transistor terminal, and a ninth transistor terminal, the seventh transistor terminal being connected to the sixth transistor terminal, the eighth transistor terminal being configured to receive the third drive voltage.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 1:
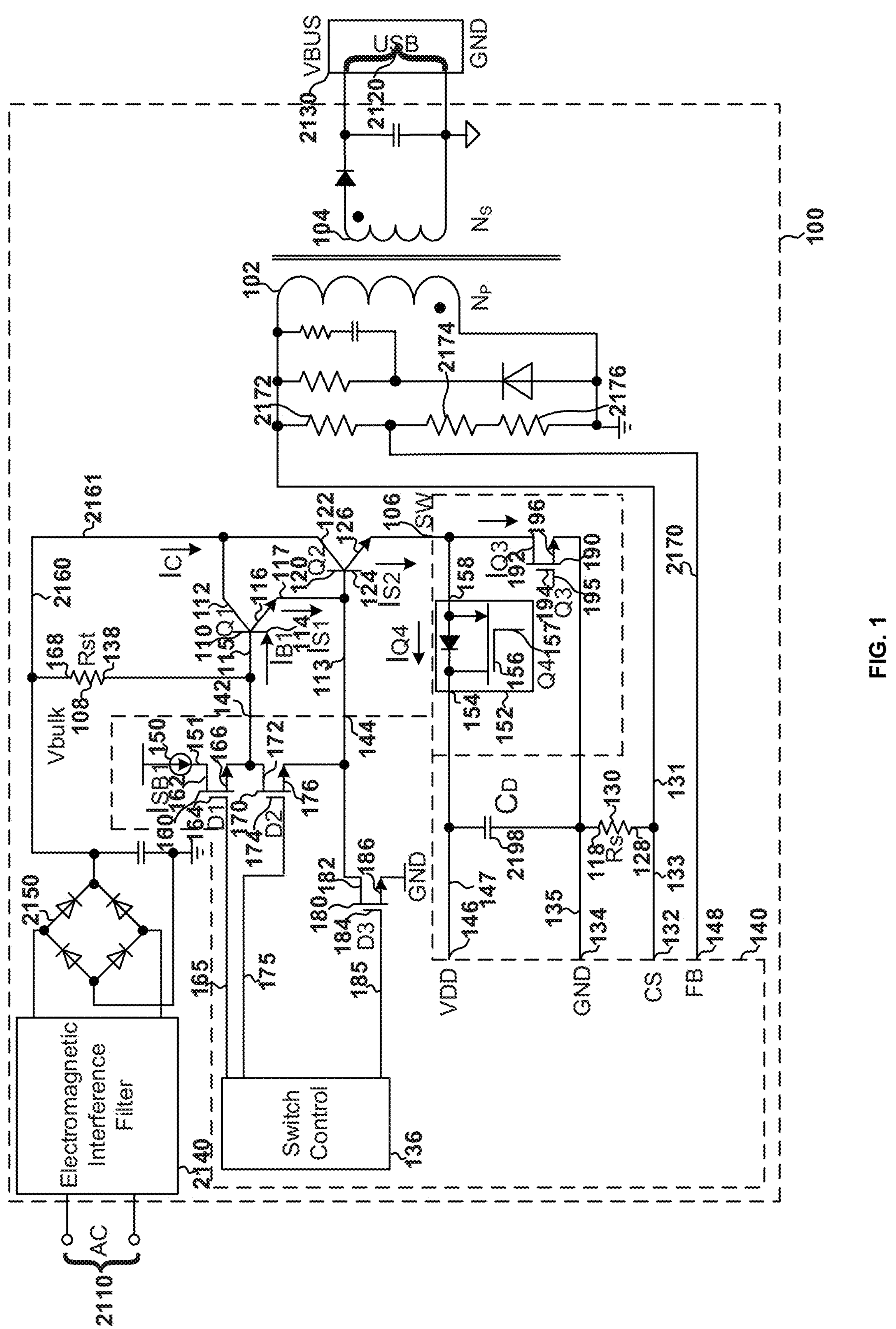
FIG. 1 is a simplified diagram showing a power converter including bipolar transistors according to certain embodiments of the present invention.
Figure 2:
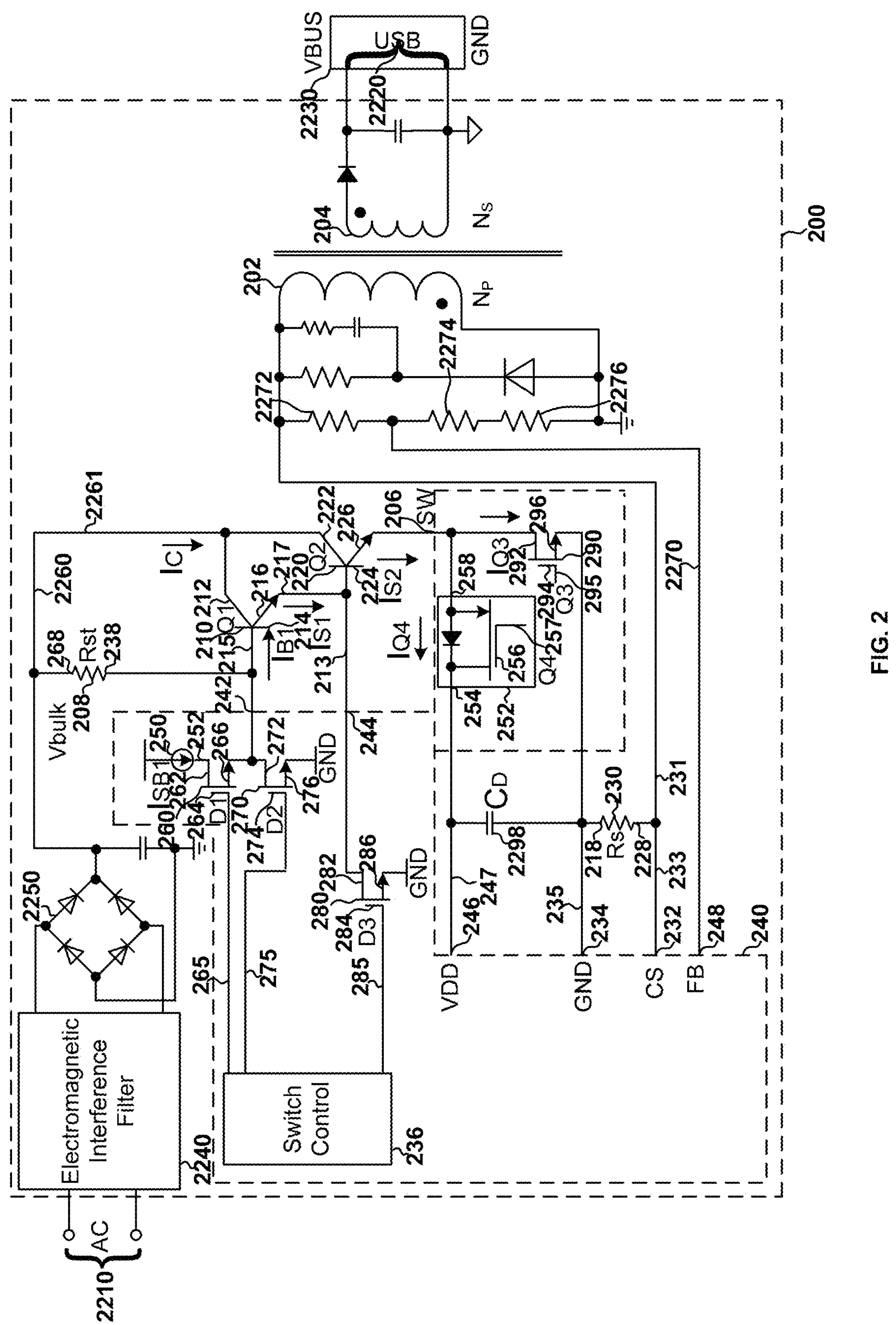
FIG. 2 is a simplified diagram showing a power converter including bipolar transistors according to certain embodiments of the present invention.
Figure 3:
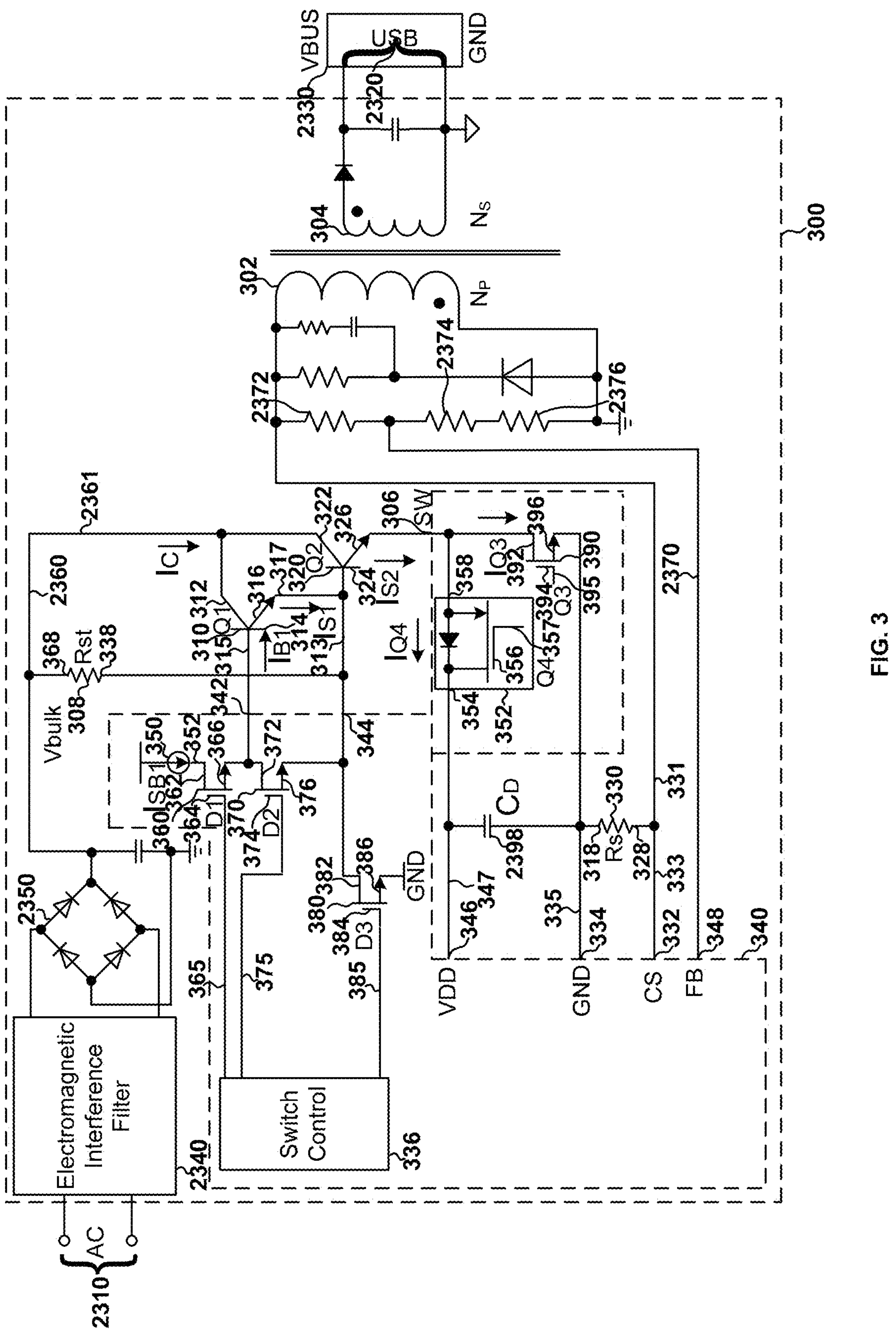
FIG. 3 is a simplified diagram showing a power converter including bipolar transistors according to certain embodiments of the present invention.
Figure 4:
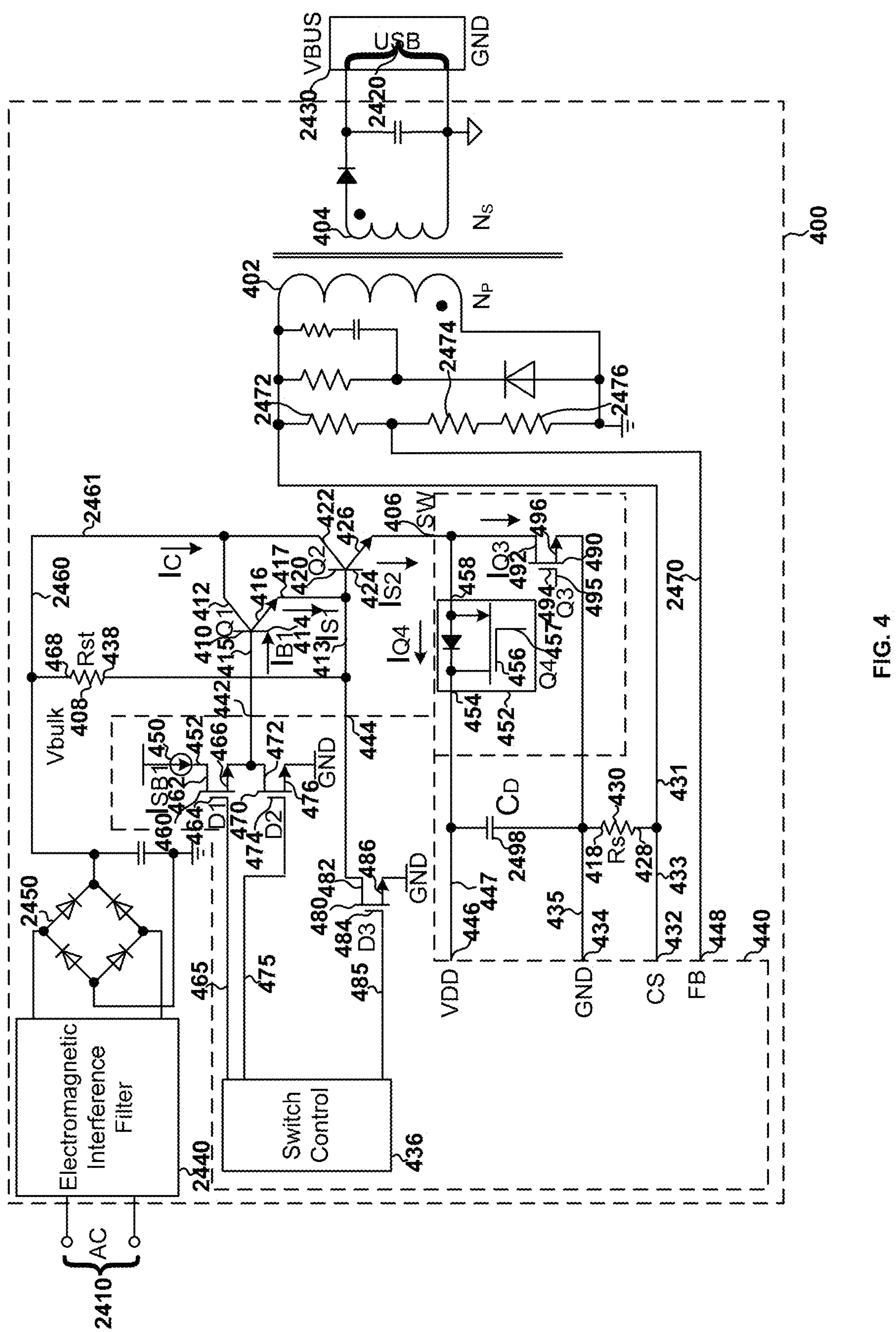
FIG. 4 is a simplified diagram showing a power converter including bipolar transistors according to certain embodiments of the present invention.
Figure 5:
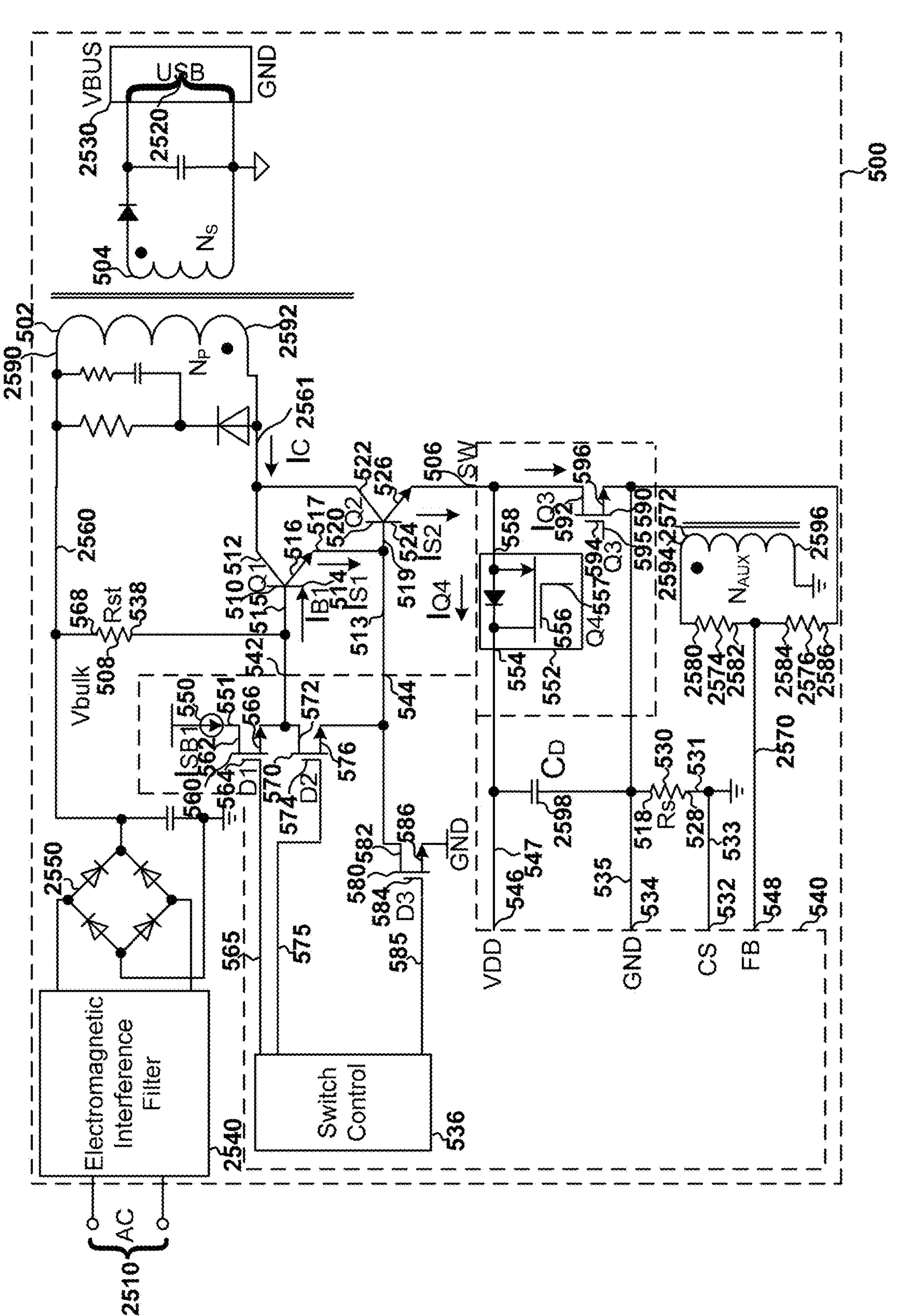
FIG. 5 is a simplified diagram showing a power converter including bipolar transistors according to certain embodiments of the present invention.
Figure 6:
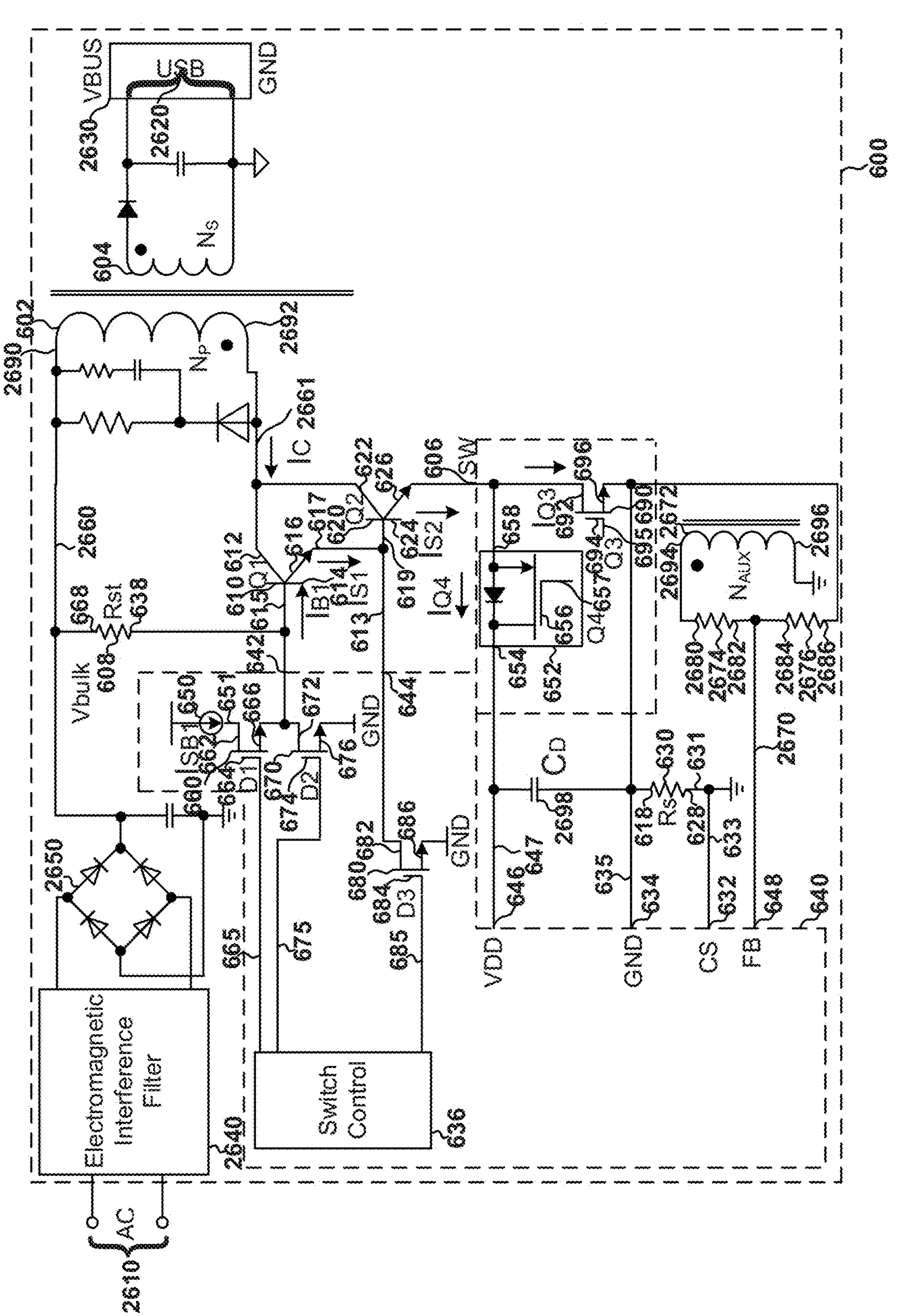
FIG. 6 is a simplified diagram showing a power converter including bipolar transistors according to certain embodiments of the present invention.
Figure 7:
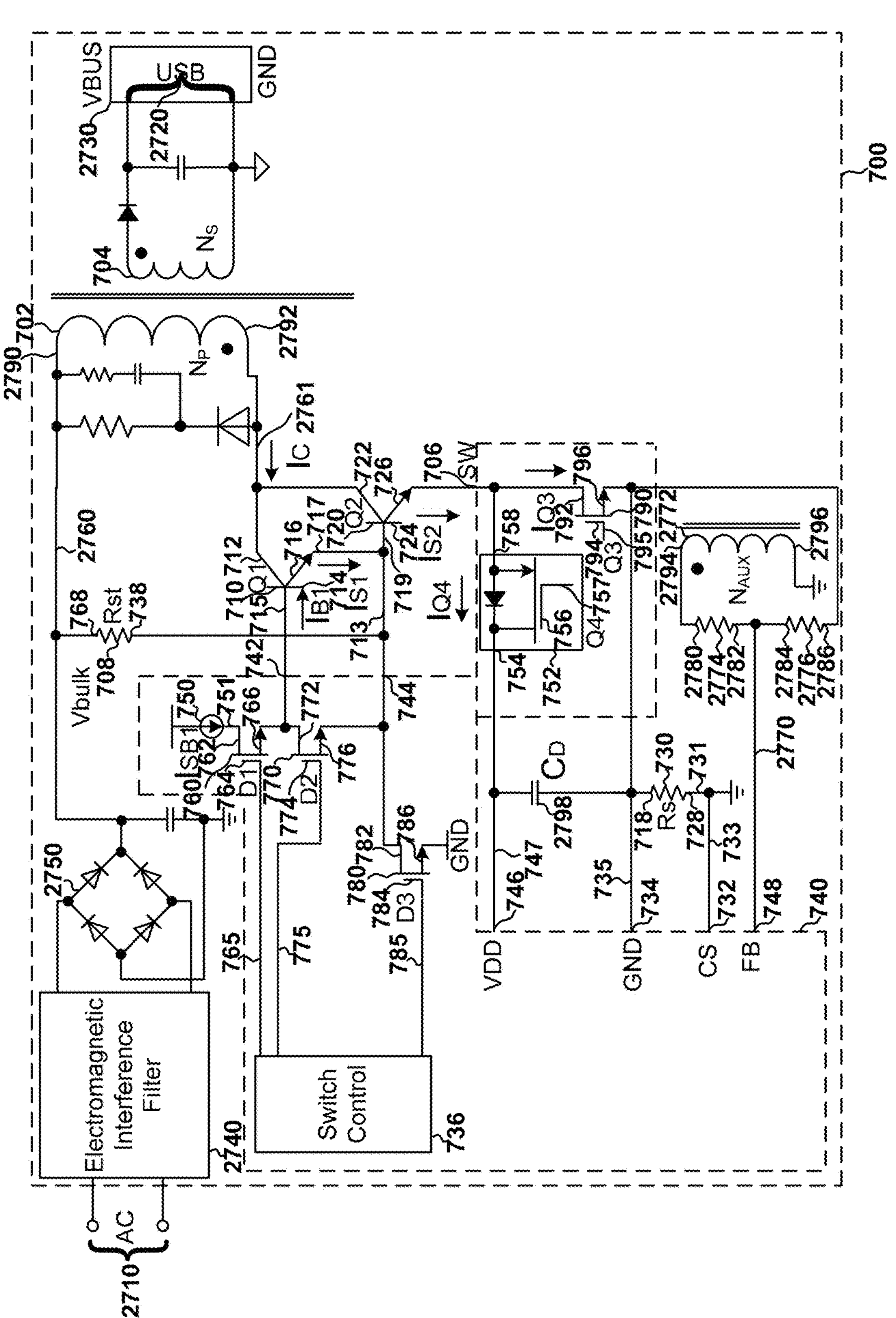
FIG. 7 is a simplified diagram showing a power converter including bipolar transistors according to certain embodiments of the present invention.
Figure 8:
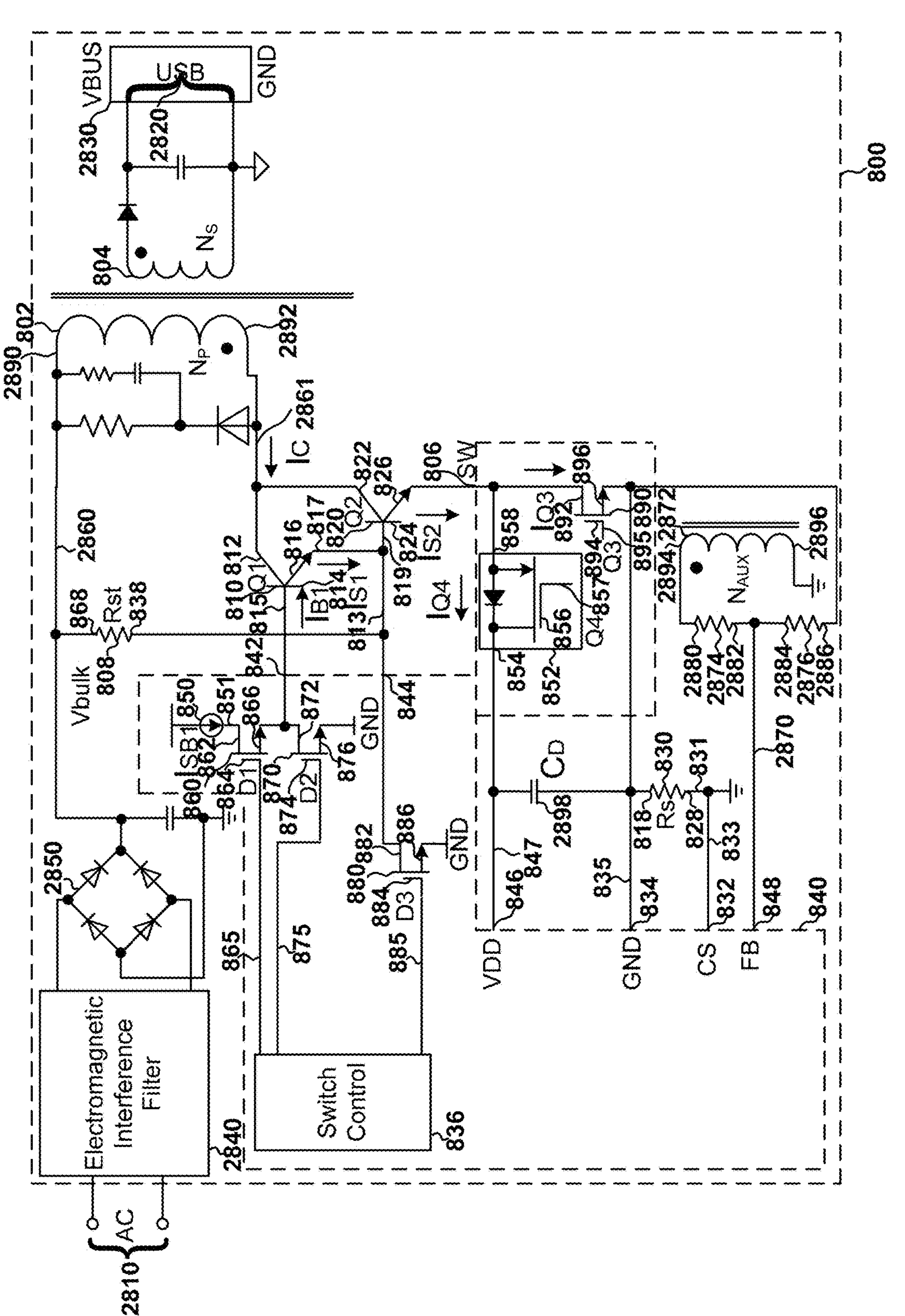
FIG. 8 is a simplified diagram showing a power converter including bipolar transistors according to certain embodiments of the present invention.
Figure 9:
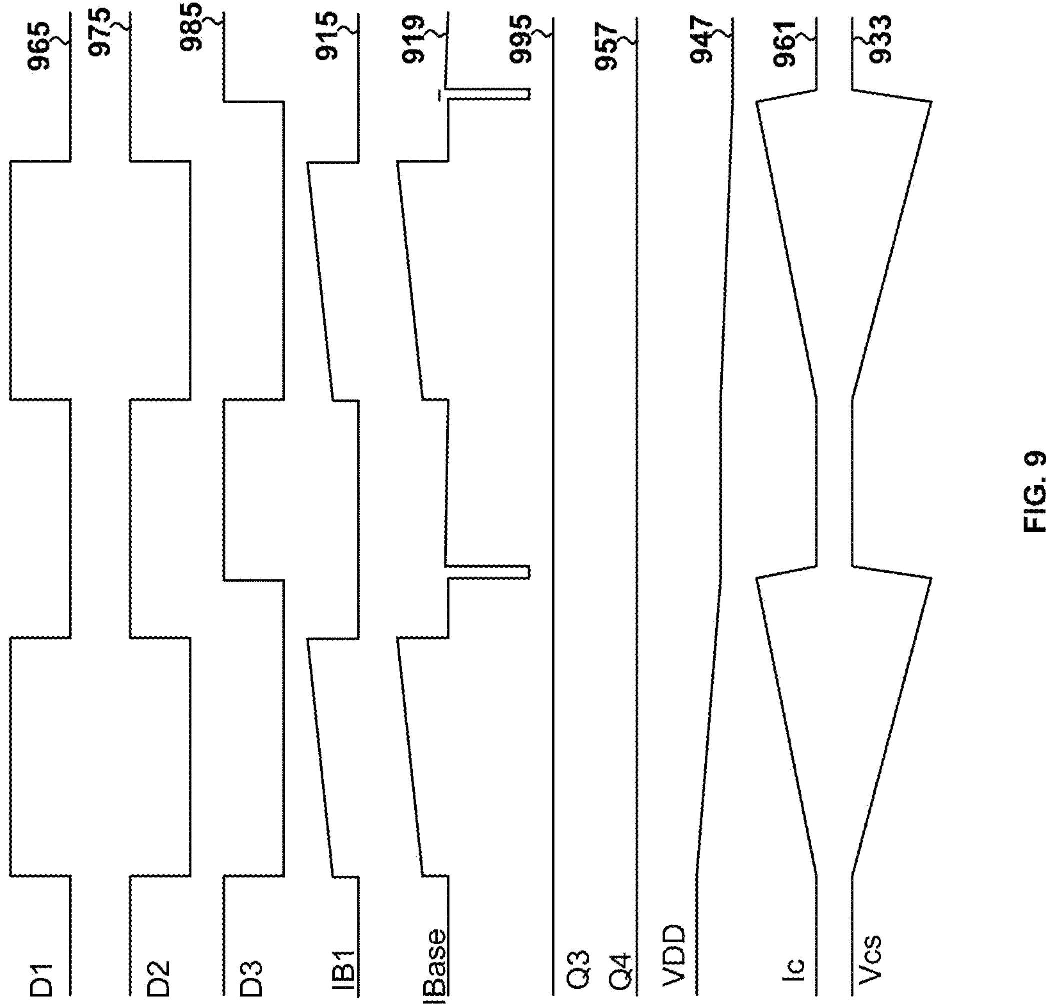

FIG. 9 shows simplified timing diagrams for the power converter as shown in FIG. 1, the power converter as shown in FIG. 2, the power converter as shown in FIG. 3, the power converter as shown in FIG. 4, the power converter as shown in FIG. 5, the power converter as shown in FIG. 6, the power converter as shown in FIG. 7, and/or the power converter as shown in FIG. 8 according to some embodiments of the present invention.

Figure 10:
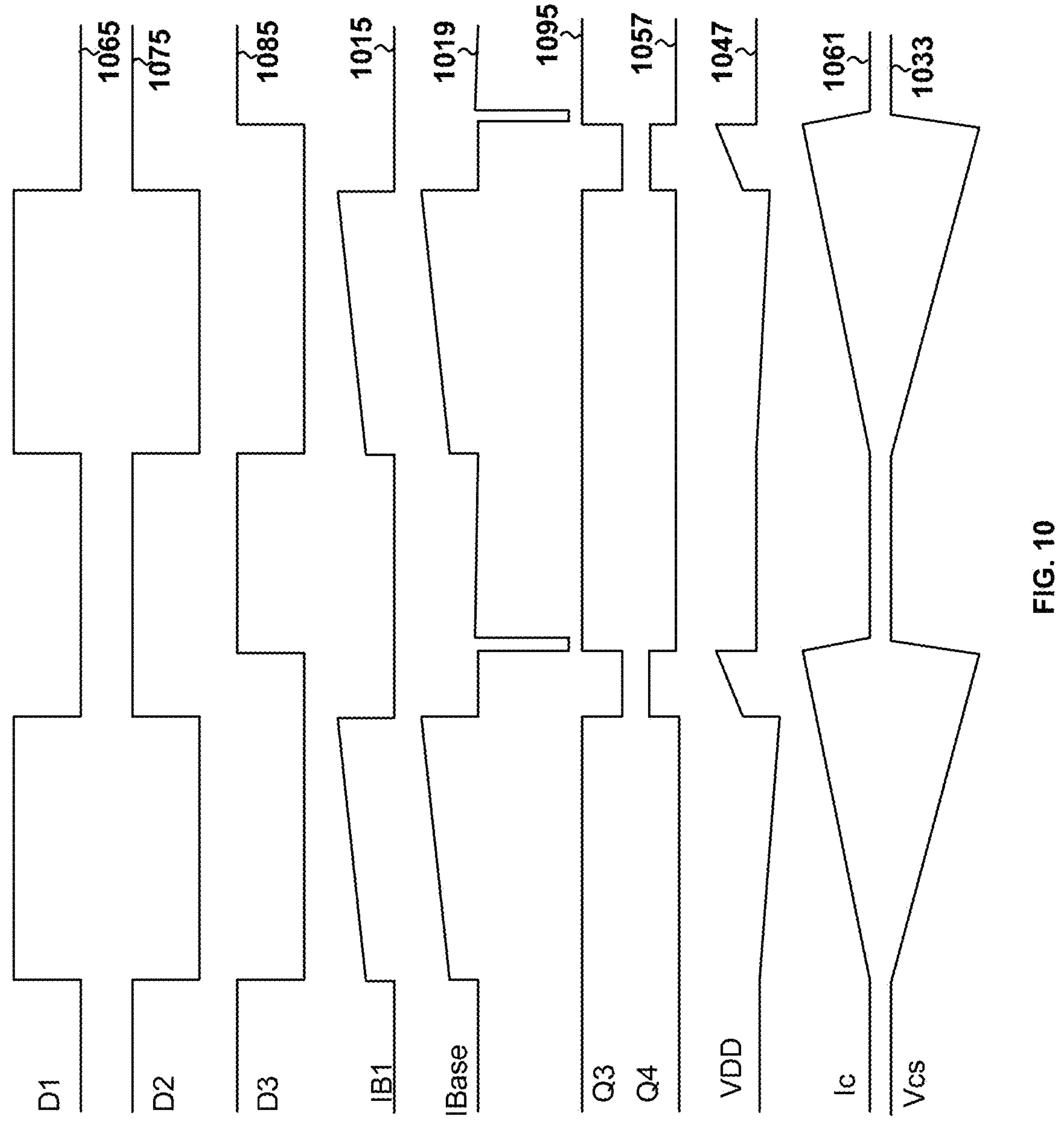

FIG. 10 shows simplified timing diagrams for the power converter as shown in FIG. 1, the power converter as shown in FIG. 2, the power converter as shown in FIG. 3, the power converter as shown in FIG. 4, the power converter as shown in FIG. 5, the power converter as shown in FIG. 6, the power converter as shown in FIG. 7, and/or the power converter as shown in FIG. 8 according to some embodiments of the present invention.

Figure 11:
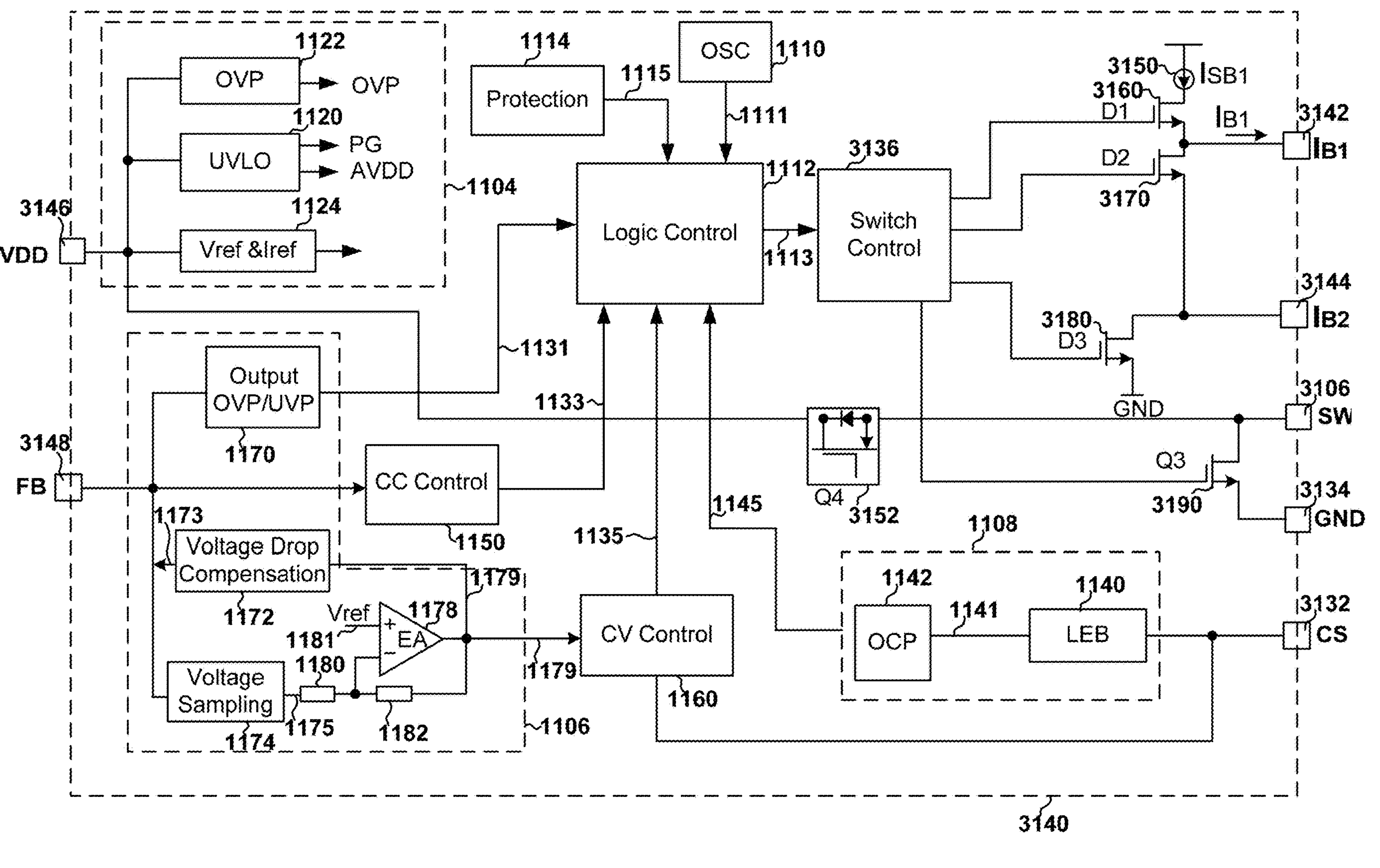

FIG. 11 is a simplified diagram showing certain components of a controller chip for the power converter as shown in FIG. 1, the power converter as shown in FIG. 3, the power converter as shown in FIG. 5, and/or the power converter as shown in FIG. 7 according to certain embodiments of the present invention.

Figure 12:
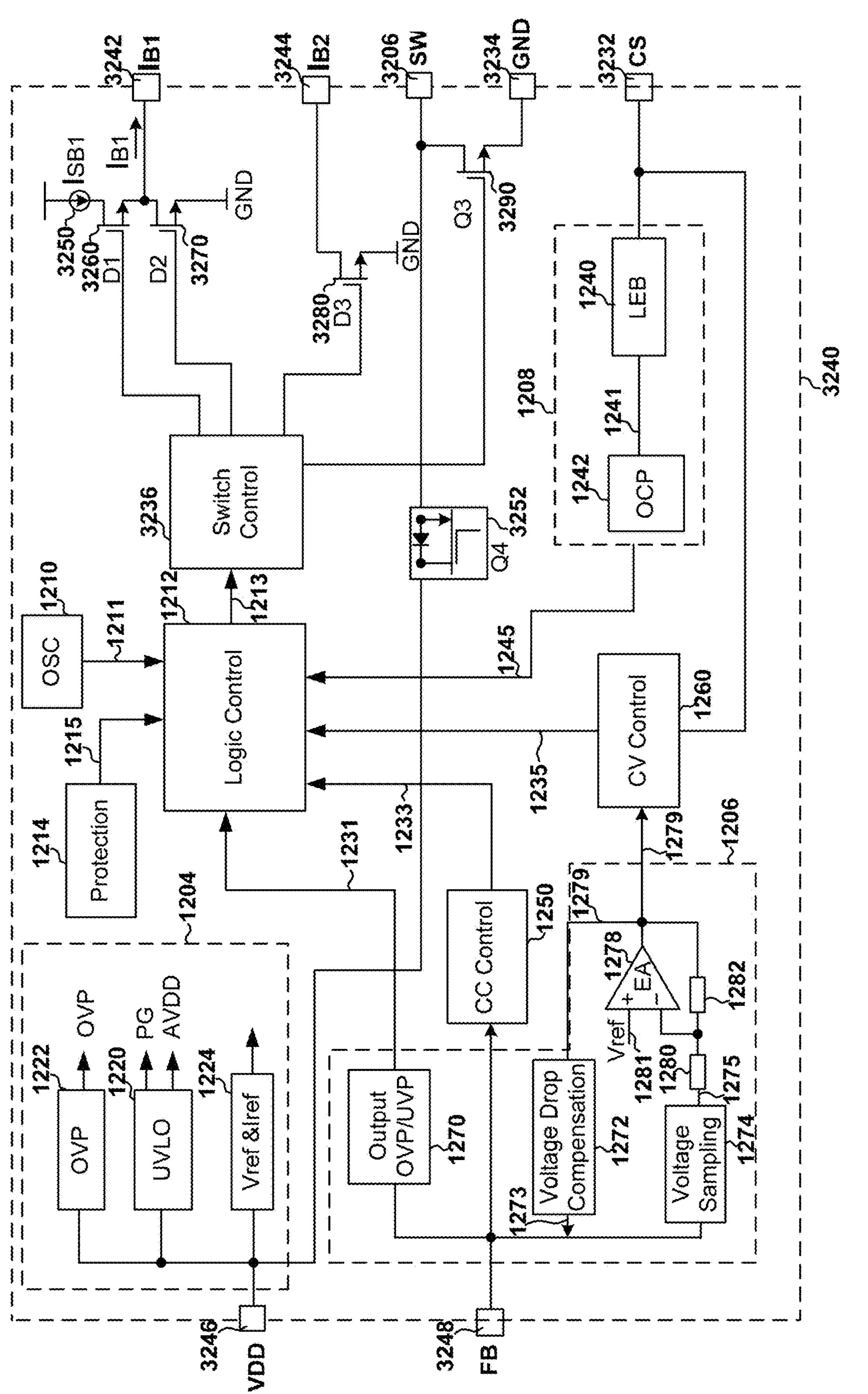

FIG. 12 is a simplified diagram showing certain components of a controller chip for the power converter as shown in FIG. 2, the power converter as shown in FIG. 4, the power converter as shown in FIG. 6, and/or the power converter as shown in FIG. 8 as shown in FIG. 8 according to certain embodiments of the present invention.

Figure 13:
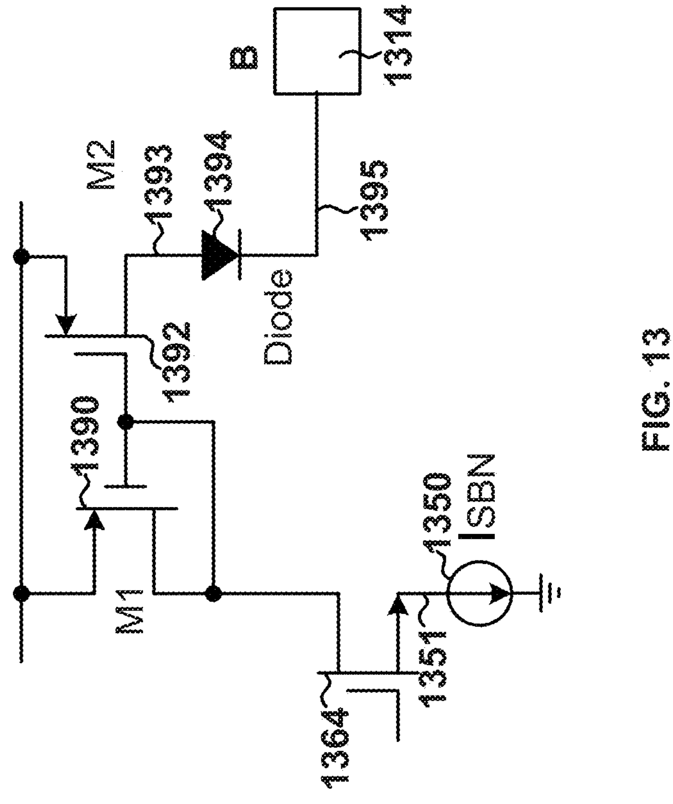

FIG. 13 is a simplified diagram showing certain components of the power converter as shown in FIG. 1, the power converter as shown in FIG. 2, the power converter as shown in FIG. 3, the power converter as shown in FIG. 4, the power converter as shown in FIG. 5, the power converter as shown in FIG. 6, the power converter as shown in FIG. 7, and/or the power converter as shown in FIG. 8 according to certain embodiments of the present invention.

Figure 14:
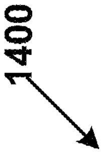
Figure 14:
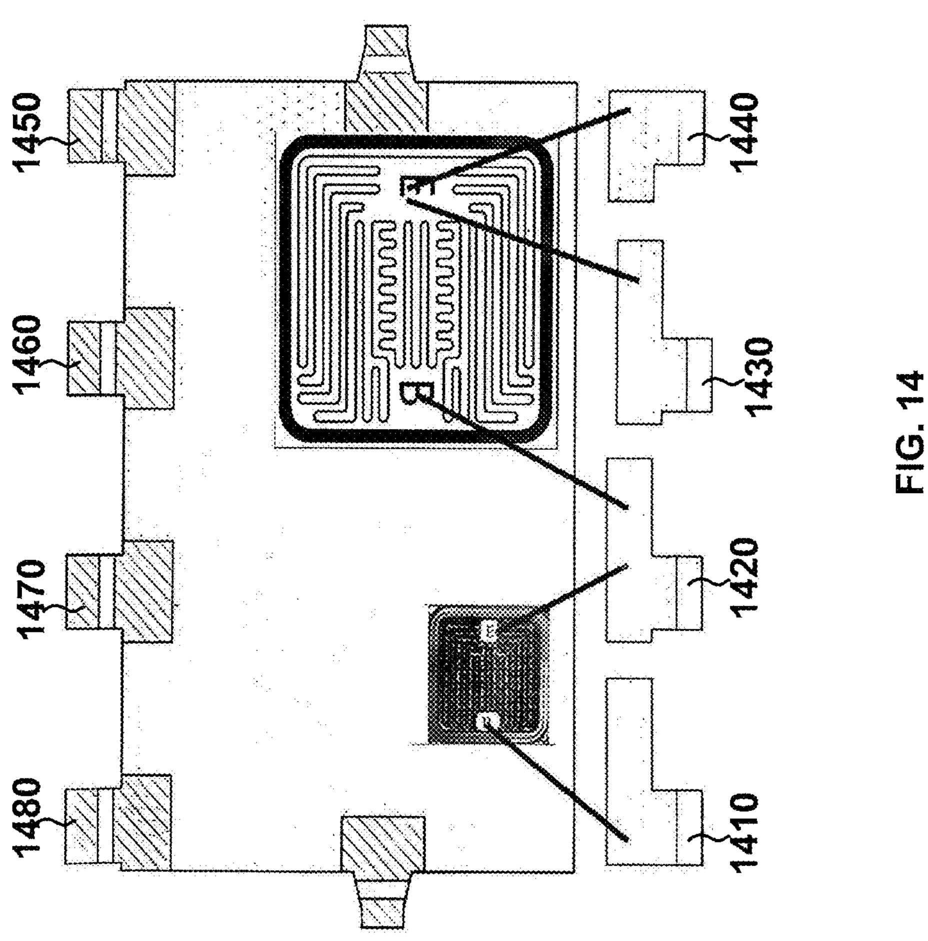

FIG. 14 is a simplified diagram showing a chip package for the bipolar transistor Q1 and the bipolar transistor Q2 as parts of a power converter as shown in FIG. 1, FIG. 2, FIG. 3, FIG. 4, FIG. 5, FIG. 6, FIG. 7 and/or FIG. 8 according to certain embodiments of the present invention.

Figure 15:
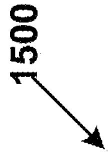
Figure 15:
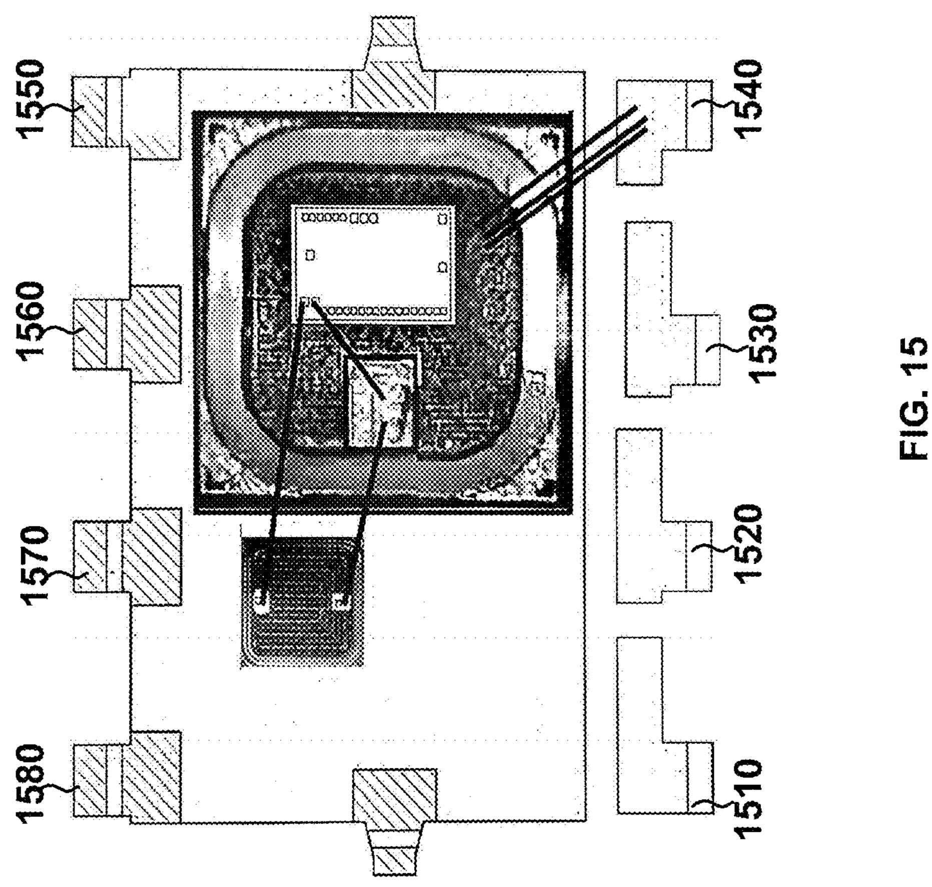

FIG. 15 is a simplified diagram showing a chip package for the bipolar transistor Q1, the bipolar transistor Q2, and a controller chip as parts of a power converter as shown in FIG. 1, FIG. 2, FIG. 3, FIG. 4, FIG. 5, FIG. 6, FIG. 7 and/or FIG. 8 according to certain embodiments of the present invention.

5. DETAILED DESCRIPTION OF THE INVENTION

Certain embodiments of the present invention are directed to circuits. More particularly, some embodiments of the invention provide systems and methods for driving bipolar transistors by at least using three switches. Merely by way of example, some embodiments of the invention have been applied to flyback power converters. But it would be recognized that the invention has a much broader range of applicability.

FIG. 1 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 100 (e.g., a flyback power converter) includes a primary winding 102, a secondary winding 104, bipolar transistors 110 and 120, resistors 130 and 108, a controller chip 140, an electromagnetic interference filter 2140, a rectifier 2150, resistors 2172, 2174 and 2176, and a capacitor 2198. For example, the controller chip 140 (e.g., a controller) includes terminals 132, 134, 142, 144, 146, 148, and 106 (e.g., pins). As an example, the controller chip 140 (e.g., a controller) also includes a current source 150, transistors 160, 170, 180, 190, and 152, and a switch control circuit 136 (e.g., a drive voltage generator). In some examples, each transistor of the transistors 160, 170, 180, and 190 is an N-Channel MOSFET, and the transistor 152 is a P-Channel MOSFET. In certain examples, the primary winding 102 and the secondary winding 104 are coupled to each other and are parts of a transformer. In some examples, the power converter 100 receives an AC input voltage 2110 and generates an output voltage 2120. In some examples, the output voltage 2120 is received by a USB connector 2130. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 110 includes a collector 112, a base 114 and an emitter 116, and the bipolar transistor 120 includes a collector 122, a base 124 and an emitter 126. For example, the transistor 160 includes a drain 162, a gate 164, and a source 166. As an example, the transistor 170 includes a drain 172, a gate 174, and a source 176. For example, the transistor 180 includes a drain 182, a gate 184, and a source 186. As an example, the transistor 190 includes a drain 192, a gate 194, and a source 196. For example, the transistor 152 includes a drain 154, a gate 156, and a source 158.

In certain examples, the gate 164 of the transistor 160 receives a drive voltage 165 from the switch control circuit 136, the gate 174 of the transistor 170 receives a drive voltage 175 from the switch control circuit 136, the gate 184 of the transistor 180 receives a drive voltage 185 from the switch control circuit 136, the gate 194 of the transistor 190 receives a drive voltage 195 from the switch control circuit 136, and the gate 156 of the transistor 152 receives a drive voltage 157 from the switch control circuit 136. In some examples, the drain 162 of the transistor 160 is connected to the current source 150. For example, the source 166 of the transistor 160 is connected to the drain 172 of the transistor 170 and the base 114 of the bipolar transistor 110. As an example, the source 176 of the transistor 170 is connected to the drain 182 of the transistor 180 and the base 124 of the bipolar transistor 120. For example, the source 186 of the transistor 180 is biased to a voltage 135 (e.g., a controller ground voltage) at the terminal 134 of the controller chip 140.

In certain embodiments, the collector 112 of the bipolar transistor 110 receives a voltage 2160 from the rectifier 2150, and the collector 122 of the bipolar transistor 120 also receives the voltage 2160 from the rectifier 2150. For example, the total current that flows into the collector 112 of the bipolar transistor 110 and the collector 122 of the bipolar transistor 120 is equal to a current 2161 as shown in FIG. 1.

In some examples, the base 114 of the bipolar transistor 110 is connected to the source 166 of the transistor 160 and the drain 172 of the transistor 170. For example, the base 114 of the bipolar transistor 110 receives a drive current 115. As an example, the emitter 116 of the bipolar transistor 110 is connected to the base 124 of the bipolar transistor 120, the source 176 of the transistor 170, and the drain 182 of the transistor 180. In certain examples, the base 124 of the bipolar transistor 120 is connected to the source 176 of the transistor 170, the drain 182 of the transistor 180, and the emitter 116 of the bipolar transistor 110. For example, the base 124 of the bipolar transistor 120 receives a drive current 119. As an example, the drive current 119 is equal to a current 117 from the emitter 116 of the bipolar transistor 110.

In some examples, the emitter 126 of the bipolar transistor 120 is connected to the drain 192 of the transistor 190 and the source 158 of the transistor 152. For example, the drain 154 of the transistor 152 is connected to the terminal 146 of the controller chip 140. As an example, the source 196 of the transistor 190 is connected to the terminal 134 of the controller chip 140 and a terminal 118 of the resistor 130, and the terminal 118 of the resistor 130 is biased to the voltage 135 (e.g., a controller ground voltage) at the terminal 134 of the controller chip 140.

In certain examples, the resistor 130 includes the terminal 118 and a terminal 128. For example, the terminal 128 of the resistor 130 is connected to the terminal 132 of the controller chip 140 and the primary winding 102. As an example, the resistor 130 receives a current 131 that flows through the resistor 130 to generate a voltage 133 (e.g., a sensing voltage). For example, the voltage 133 is received by the terminal 132 of the controller chip 140. As an example, the voltage 133 (e.g., a sensing voltage) is lower than the voltage 135 (e.g., a controller ground voltage). In some examples, the voltage 133 (e.g., a sensing voltage) with respect to the voltage 135 (e.g., a controller ground voltage) is equal to the voltage 133 (e.g., a sensing voltage) minus the voltage 135 (e.g., a controller ground voltage). For example, the voltage 133 (e.g., a sensing voltage) with respect to the voltage 135 (e.g., a controller ground voltage) has a negative value. As an example, the absolute value of the voltage 133 (e.g., a sensing voltage) with respect to the voltage 135 (e.g., a controller ground voltage) is equal to the negative value multiplied by minus one. In certain examples, the voltage 133 (e.g., a sensing voltage) with respect to the voltage 135 (e.g., a controller ground voltage) has a magnitude that is equal to the absolute value of the voltage 133 (e.g., a sensing voltage) with respect to the voltage 135 (e.g., a controller ground voltage). In some examples, the resistor 108 includes terminals 138 and 168. For example, the terminal 168 receives the voltage 2160 from the rectifier 2150. As an example, the terminal 138 is connected to the base 114 of the bipolar transistor 110, the source 166 of the transistor 160, and the drain 172 of the transistor 170.

According to some embodiments, the resistors 2172, 2174 and 2176 are parts of a voltage divider that receives a voltage across the primary winding 102 and generates a voltage 2170. For example, the voltage 2170 is received by the terminal 148 of the controller chip 140. In certain examples, the capacitor 2198 includes a terminal connected to the terminal 134 of the controller chip 140 and also includes a terminal connected to the terminal 146 of the controller chip 140. For example, the terminal 146 of the controller chip 140 is biased to a voltage 147. In some examples, the voltage 147 is provided by the terminal of the capacitor 2198 that is connected to the terminal 146 of the controller chip 140. For example, if the transistor 152 is turned off and the transistor 190 is turned on, the capacitor 2198 does not receive a charging current. As an example, if the transistor 152 is turned on and the transistor 190 is turned off before the bipolar transistor 120 becomes turned off, the capacitor 2198 receives a charging current (e.g., a current that flows out of the emitter 126 of the bipolar transistor 120).

As shown in FIG. 1, the power converter 100 is a flyback power converter based on primary-side feedback according to certain embodiments. For example, the flyback power converter 100 includes the primary winding 102 and the secondary winding 104. As an example, the flyback power converter 100 turns on and/or turns off the bipolar transistor 110 and/or the bipolar transistor 120 based at least upon the primary winding 102 and the secondary winding 104, without using any auxiliary winding.

As mentioned above and further emphasized here, FIG. 1 is merely an example, which should not unduly limit the scope of the claims. One of ordinary skill in the art would recognize many variations, alternatives, and modifications. For example, the transistor 160 is a P-Channel MOSFET, the transistor 170 is an N-Channel MOSFET, and the transistor 180 is a N-Channel MOSFET. As an example, each transistor of the transistors 160, 170 and 180 is a bipolar transistor. For example, the transistor 152 is a diode. In some examples, the current source 150 is not directly connected to the transistors 160, so long as the current source 150 provides a current 151 when the bipolar transistor 120 changes from being turned off to being turned on but does not provide the current 151 when the bipolar transistor 120 changes from being turned on to being turned off. In certain examples, the current 151 is a current with a constant value, a current that changes (e.g., increases linearly) with time, and/or a current that changes (e.g., increases linearly) with the current 131.

FIG. 2 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 200 (e.g., a flyback power converter) includes a primary winding 202, a secondary winding 204, bipolar transistors 210 and 220, resistors 230 and 208, a controller chip 240, an electromagnetic interference filter 2240, a rectifier 2250, resistors 2272, 2274 and 2276, and a capacitor 2298. For example, the controller chip 240 (e.g., a controller) includes terminals 232, 234, 242, 244, 246, 248, and 206 (e.g., pins). As an example, the controller chip 240 (e.g., a controller) also includes a current source 250, transistors 260, 270, 280, 290, and 252, and a switch control circuit 236 (e.g., a drive voltage generator). In some examples, each transistor of the transistors 260, 270, 280, and 290 is an N-Channel MOSFET, and the transistor 252 is a P-Channel MOSFET. In certain examples, the primary winding 202 and the secondary winding 204 are coupled to each other and are parts of a transformer. In some examples, the power converter 200 receives an AC input voltage 2210 and generates an output voltage 2220. In some examples, the output voltage 2220 is received by a USB connector 2230. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 210 includes a collector 212, a base 214 and an emitter 216, and the bipolar transistor 220 includes a collector 222, a base 224 and an emitter 226. For example, the transistor 260 includes a drain 262, a gate 264, and a source 266. As an example, the transistor 270 includes a drain 272, a gate 274, and a source 276. For example, the transistor 280 includes a drain 282, a gate 284, and a source 286. As an example, the transistor 290 includes a drain 292, a gate 294, and a source 296. For example, the transistor 252 includes a drain 254, a gate 256, and a source 258.

In certain examples, the gate 264 of the transistor 260 receives a drive voltage 265 from the switch control circuit 236, the gate 274 of the transistor 270 receives a drive voltage 275 from the switch control circuit 236, the gate 284 of the transistor 280 receives a drive voltage 285 from the switch control circuit 236, the gate 294 of the transistor 290 receives a drive voltage 295 from the switch control circuit 236, and the gate 256 of the transistor 252 receives a drive voltage 257 from the switch control circuit 236. In some examples, the drain 262 of the transistor 260 is connected to the current source 250. For example, the source 266 of the transistor 260 is connected to the drain 272 of the transistor 270 and the base 214 of the bipolar transistor 210. As an example, the source 276 of the transistor 270 is biased to a voltage 235 (e.g., a controller ground voltage) at the terminal 234 of the controller chip 240. For example, the drain 282 of the transistor 280 is connected to the base 224 of the bipolar transistor 220. As an example, the source 286 of the transistor 280 is biased to the voltage 235 (e.g., a controller ground voltage) at the terminal 234 of the controller chip 240.

In certain embodiments, the collector 212 of the bipolar transistor 210 receives a voltage 2260 from the rectifier 2250, and the collector 222 of the bipolar transistor 220 also receives the voltage 2260 from the rectifier 2250. For example, the total current that flows into the collector 212 of the bipolar transistor 210 and the collector 222 of the bipolar transistor 220 is equal to a current 2261 as shown in FIG. 2. In some examples, the base 214 of the bipolar transistor 210 is connected to the source 266 of the transistor 260 and the drain 272 of the transistor 270. For example, the base 214 of the bipolar transistor 210 receives a drive current 215. As an example, the emitter 216 of the bipolar transistor 210 is connected to the base 224 of the bipolar transistor 220 and the drain 282 of the transistor 280. In certain examples, the base 224 of the bipolar transistor 220 is connected to the drain 282 of the transistor 280 and the emitter 216 of the bipolar transistor 210. For example, the base 224 of the bipolar transistor 220 receives a drive current 219. As an example, the drive current 219 is equal to a current 217 from the emitter 216 of the bipolar transistor 210.

In some examples, the emitter 226 of the bipolar transistor 220 is connected to the drain 292 of the transistor 290 and the source 258 of the transistor 252. For example, the drain 254 of the transistor 252 is connected to the terminal 246 of the controller chip 240. As an example, the source 296 of the transistor 290 is connected to the terminal 234 of the controller chip 240 and a terminal 218 of the resistor 230, and the terminal 218 of the resistor 230 is biased to the voltage 235 (e.g., a controller ground voltage) at the terminal 234 of the controller chip 240.

In certain examples, the resistor 230 includes the terminal 218 and a terminal 228. For example, the terminal 228 of the resistor 230 is connected to the terminal 232 of the controller chip 240 and the primary winding 202. As an example, the resistor 230 receives a current 231 that flows through the resistor 230 to generate a voltage 233 (e.g., a sensing voltage). For example, the voltage 233 is received by the terminal 232 of the controller chip 240. As an example, the voltage 233 (e.g., a sensing voltage) is lower than the voltage 235 (e.g., a controller ground voltage). In some examples, the voltage 233 (e.g., a sensing voltage) with respect to the voltage 235 (e.g., a controller ground voltage) is equal to the voltage 233 (e.g., a sensing voltage) minus the voltage 235 (e.g., a controller ground voltage). For example, the voltage 233 (e.g., a sensing voltage) with respect to the voltage 235 (e.g., a controller ground voltage) has a negative value. As an example, the absolute value of the voltage 233 (e.g., a sensing voltage) with respect to the voltage 235 (e.g., a controller ground voltage) is equal to the negative value multiplied by minus one. In certain examples, the voltage 233 (e.g., a sensing voltage) with respect to the voltage 235 (e.g., a controller ground voltage) has a magnitude that is equal to the absolute value of the voltage 233 (e.g., a sensing voltage) with respect to the voltage 235 (e.g., a controller ground voltage). In some examples, the resistor 208 includes terminals 238 and 268. For example, the terminal 268 receives the voltage 2260 from the rectifier 2250. As an example, the terminal 238 is connected to the base 214 of the bipolar transistor 210, the source 266 of the transistor 260, and the drain 272 of the transistor 270.

According to some embodiments, the resistors 2272, 2274 and 2276 are parts of a voltage divider that receives a voltage across the primary winding 202 and generates a voltage 2270. For example, the voltage 2270 is received by the terminal 248 of the controller chip 240. In certain examples, the capacitor 2298 includes a terminal connected to the terminal 234 of the controller chip 240 and also includes a terminal connected to the terminal 246 of the controller chip 240. For example, the terminal 246 of the controller chip 240 is biased to a voltage 247. In some examples, the voltage 247 is provided by the terminal of the capacitor 2298 that is connected to the terminal 246 of the controller chip 240. For example, if the transistor 252 is turned off and the transistor 290 is turned on, the capacitor 2298 does not receive a charging current. As an example, if the transistor 252 is turned on and the transistor 290 is turned off before the bipolar transistor 220 becomes turned off, the capacitor 2298 receives a charging current (e.g., a current that flows out of the emitter 226 of the bipolar transistor 220).

As shown in FIG. 2, the power converter 200 is a flyback power converter based on primary-side feedback according to certain embodiments. For example, the flyback power converter 200 includes the primary winding 202 and the secondary winding 204. As an example, the flyback power converter 200 turns on and/or turns off the bipolar transistor 210 and/or the bipolar transistor 220 based at least upon the primary winding 202 and the secondary winding 204, without using any auxiliary winding.

As mentioned above and further emphasized here, FIG. 2 is merely an example, which should not unduly limit the scope of the claims. One of ordinary skill in the art would recognize many variations, alternatives, and modifications. For example, the transistor 260 is a P-Channel MOSFET, the transistor 270 is an N-Channel MOSFET, and the transistor 280 is a N-Channel MOSFET. As an example, each transistor of the transistors 260, 270 and 280 is a bipolar transistor. For example, the transistor 252 is a diode. In some examples, the current source 250 is not directly connected to the transistors 260, so long as the current source 250 provides a current 251 when the bipolar transistor 220 changes from being turned off to being turned on but does not provide the current 251 when the bipolar transistor 220 changes from being turned on to being turned off. In certain examples, the current 251 is a current with a constant value, a current that changes (e.g., increases linearly) with time, and/or a current that changes (e.g., increases linearly) with the current 231.

FIG. 3 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 300 (e.g., a flyback power converter) includes a primary winding 302, a secondary winding 304, bipolar transistors 310 and 320, resistors 330 and 308, a controller chip 340, an electromagnetic interference filter 2340, a rectifier 2350, resistors 2372, 2374 and 2376, and a capacitor 2398. For example, the controller chip 340 (e.g., a controller) includes terminals 332, 334, 342, 344, 346, 348, and 306 (e.g., pins). As an example, the controller chip 340 (e.g., a controller) also includes a current source 350, transistors 360, 370, 380, 390, and 352, and a switch control circuit 336 (e.g., a drive voltage generator). In some examples, each transistor of the transistors 360, 370, 380, and 390 is an N-Channel MOSFET, and the transistor 352 is a P-Channel MOSFET. In certain examples, the primary winding 302 and the secondary winding 304 are coupled to each other and are parts of a transformer. In some examples, the power converter 300 receives an AC input voltage 2310 and generates an output voltage 2320. In some examples, the output voltage 2320 is received by a USB connector 2330. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 310 includes a collector 312, a base 314 and an emitter 316, and the bipolar transistor 320 includes a collector 322, a base 324 and an emitter 326. For example, the transistor 360 includes a drain 362, a gate 364, and a source 366. As an example, the transistor 370 includes a drain 372, a gate 374, and a source 376. For example, the transistor 380 includes a drain 382, a gate 384, and a source 386. As an example, the transistor 390 includes a drain 392, a gate 394, and a source 396. For example, the transistor 352 includes a drain 354, a gate 356, and a source 358.

In certain examples, the gate 364 of the transistor 360 receives a drive voltage 365 from the switch control circuit 336, the gate 374 of the transistor 370 receives a drive voltage 375 from the switch control circuit 336, the gate 384 of the transistor 380 receives a drive voltage 385 from the switch control circuit 336, the gate 394 of the transistor 390 receives a drive voltage 395 from the switch control circuit 336, and the gate 356 of the transistor 352 receives a drive voltage 357 from the switch control circuit 336. In some examples, the drain 362 of the transistor 360 is connected to the current source 350. For example, the source 366 of the transistor 360 is connected to the drain 372 of the transistor 370 and the base 314 of the bipolar transistor 310. As an example, the source 376 of the transistor 370 is connected to the drain 382 of the transistor 380 and the base 324 of the bipolar transistor 320. For example, the source 386 of the transistor 380 is biased to a voltage 335 (e.g., a controller ground voltage) at the terminal 334 of the controller chip 340.

In certain embodiments, the collector 312 of the bipolar transistor 310 receives a voltage 2360 from the rectifier 2350, and the collector 322 of the bipolar transistor 320 also receives the voltage 2360 from the rectifier 2350. For example, the total current that flows into the collector 312 of the bipolar transistor 310 and the collector 322 of the bipolar transistor 320 is equal to a current 2361 as shown in FIG. 3. In some examples, the base 314 of the bipolar transistor 310 is connected to the source 366 of the transistor 360 and the drain 372 of the transistor 370. For example, the base 314 of the bipolar transistor 310 receives a drive current 315. As an example, the emitter 316 of the bipolar transistor 310 is connected to the base 324 of the bipolar transistor 320, the source 376 of the transistor 370, and the drain 382 of the transistor 380. In certain examples, the base 324 of the bipolar transistor 320 is connected to the source 376 of the transistor 370, the drain 382 of the transistor 380, and the emitter 316 of the bipolar transistor 310. For example, the base 324 of the bipolar transistor 320 receives a drive current 319. As an example, the drive current 319 is equal to a current 317 from the emitter 316 of the bipolar transistor 310.

In some examples, the emitter 326 of the bipolar transistor 320 is connected to the drain 392 of the transistor 390 and the source 358 of the transistor 352. For example, the drain 354 of the transistor 352 is connected to the terminal 346 of the controller chip 340. As an example, the source 396 of the transistor 390 is connected to the terminal 334 of the controller chip 340 and a terminal 318 of the resistor 330, and the terminal 318 of the resistor 330 is biased to the voltage 335 (e.g., a controller ground voltage) at the terminal 334 of the controller chip 340.

In certain examples, the resistor 330 includes the terminal 318 and a terminal 328. For example, the terminal 328 of the resistor 330 is connected to the terminal 332 of the controller chip 340 and the primary winding 302. As an example, the resistor 330 receives a current 331 that flows through the resistor 330 to generate a voltage 333 (e.g., a sensing voltage). For example, the voltage 333 is received by the terminal 332 of the controller chip 340. As an example, the voltage 333 (e.g., a sensing voltage) is lower than the voltage 335 (e.g., a controller ground voltage). In some examples, the voltage 333 (e.g., a sensing voltage) with respect to the voltage 335 (e.g., a controller ground voltage) is equal to the voltage 333 (e.g., a sensing voltage) minus the voltage 335 (e.g., a controller ground voltage). For example, the voltage 333 (e.g., a sensing voltage) with respect to the voltage 335 (e.g., a controller ground voltage) has a negative value. As an example, the absolute value of the voltage 333 (e.g., a sensing voltage) with respect to the voltage 335 (e.g., a controller ground voltage) is equal to the negative value multiplied by minus one. In certain examples, the voltage 333 (e.g., a sensing voltage) with respect to the voltage 335 (e.g., a controller ground voltage) has a magnitude that is equal to the absolute value of the voltage 333 (e.g., a sensing voltage) with respect to the voltage 335 (e.g., a controller ground voltage). In some examples, the resistor 308 includes terminals 338 and 368. For example, the terminal 368 receives the voltage 2360 from the rectifier 2350. As an example, the terminal 338 is connected to the base 324 of the bipolar transistor 320, the source 376 of the transistor 370, the drain 382 of the transistor 380, and the emitter 316 of the bipolar transistor 310.

According to some embodiments, the resistors 2372, 2374 and 2376 are parts of a voltage divider that receives a voltage across the primary winding 302 and generates a voltage 2370. For example, the voltage 2370 is received by the terminal 348 of the controller chip 340. In certain examples, the capacitor 2398 includes a terminal connected to the terminal 334 of the controller chip 340 and also includes a terminal connected to the terminal 346 of the controller chip 340. For example, the terminal 346 of the controller chip 340 is biased to a voltage 347. In some examples, the voltage 347 is provided by the terminal of the capacitor 2398 that is connected to the terminal 346 of the controller chip 340. For example, if the transistor 352 is turned off and the transistor 390 is turned on, the capacitor 2398 does not receive a charging current. As an example, if the transistor 352 is turned on and the transistor 390 is turned off before the bipolar transistor 320 becomes turned off, the capacitor 2398 receives a charging current (e.g., a current that flows out of the emitter 326 of the bipolar transistor 320).

As shown in FIG. 3, the power converter 300 is a flyback power converter based on primary-side feedback according to certain embodiments. For example, the flyback power converter 300 includes the primary winding 302 and the secondary winding 304. As an example, the flyback power converter 300 turns on and/or turns off the bipolar transistor 310 and/or the bipolar transistor 320 based at least upon the primary winding 302 and the secondary winding 304, without using any auxiliary winding.

As mentioned above and further emphasized here, FIG. 3 is merely an example, which should not unduly limit the scope of the claims. One of ordinary skill in the art would recognize many variations, alternatives, and modifications. For example, the transistor 360 is a P-Channel MOSFET, the transistor 370 is an N-Channel MOSFET, and the transistor 380 is a N-Channel MOSFET. As an example, each transistor of the transistors 360, 370 and 380 is a bipolar transistor. For example, the transistor 352 is a diode. In some examples, the current source 350 is not directly connected to the transistors 360, so long as the current source 350 provides a current 351 when the bipolar transistor 320 changes from being turned off to being turned on but does not provide the current 351 when the bipolar transistor 320 changes from being turned on to being turned off. In certain examples, the current 351 is a current with a constant value, a current that changes (e.g., increases linearly) with time, and/or a current that changes (e.g., increases linearly) with the current 331.

FIG. 4 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 400 (e.g., a flyback power converter) includes a primary winding 402, a secondary winding 404, bipolar transistors 410 and 420, resistors 430 and 408, a controller chip 440, an electromagnetic interference filter 2440, a rectifier 2450, resistors 2472, 2474 and 2476, and a capacitor 2498. For example, the controller chip 440 (e.g., a controller) includes terminals 432, 434, 442, 444, 446, 448, and 406 (e.g., pins). As an example, the controller chip 440 (e.g., a controller) also includes a current source 450, transistors 460, 470, 480, 490, and 452, and a switch control circuit 436 (e.g., a drive voltage generator). In some examples, each transistor of the transistors 460, 470, 480, and 490 is an N-Channel MOSFET, and the transistor 452 is a P-Channel MOSFET. In certain examples, the primary winding 402 and the secondary winding 404 are coupled to each other and are parts of a transformer. In some examples, the power converter 400 receives an AC input voltage 2410 and generates an output voltage 2420. In some examples, the output voltage 2420 is received by a USB connector 2430. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 410 includes a collector 412, a base 414 and an emitter 416, and the bipolar transistor 420 includes a collector 422, a base 424 and an emitter 426. For example, the transistor 460 includes a drain 462, a gate 464, and a source 466. As an example, the transistor 470 includes a drain 472, a gate 474, and a source 476. For example, the transistor 480 includes a drain 482, a gate 484, and a source 486. As an example, the transistor 490 includes a drain 492, a gate 494, and a source 496. For example, the transistor 452 includes a drain 454, a gate 456, and a source 458.

In certain examples, the gate 464 of the transistor 460 receives a drive voltage 465 from the switch control circuit 436, the gate 474 of the transistor 470 receives a drive voltage 475 from the switch control circuit 436, the gate 484 of the transistor 480 receives a drive voltage 485 from the switch control circuit 436, the gate 494 of the transistor 490 receives a drive voltage 495 from the switch control circuit 436, and the gate 456 of the transistor 452 receives a drive voltage 457 from the switch control circuit 436. In some examples, the drain 462 of the transistor 460 is connected to the current source 450. For example, the source 466 of the transistor 460 is connected to the drain 472 of the transistor 470 and the base 414 of the bipolar transistor 410. As an example, the source 476 of the transistor 470 is biased to a voltage 435 (e.g., a controller ground voltage) at the terminal 434 of the controller chip 440. For example, the drain 482 of the transistor 480 is connected to the base 424 of the bipolar transistor 420. As an example, the source 486 of the transistor 480 is biased to the voltage 435 (e.g., a controller ground voltage) at the terminal 434 of the controller chip 440.

In certain embodiments, the collector 412 of the bipolar transistor 410 receives a voltage 2460 from the rectifier 2450, and the collector 422 of the bipolar transistor 420 also receives the voltage 2460 from the rectifier 2450. For example, the total current that flows into the collector 412 of the bipolar transistor 410 and the collector 422 of the bipolar transistor 420 is equal to a current 2461 as shown in FIG. 4. In some examples, the base 414 of the bipolar transistor 410 is connected to the source 466 of the transistor 460 and the drain 472 of the transistor 470. For example, the base 414 of the bipolar transistor 410 receives a drive current 415. As an example, the emitter 416 of the bipolar transistor 410 is connected to the base 424 of the bipolar transistor 420 and the drain 482 of the transistor 480. In certain examples, the base 424 of the bipolar transistor 420 is connected to the drain 482 of the transistor 480 and the emitter 416 of the bipolar transistor 410. For example, the base 424 of the bipolar transistor 420 receives a drive current 419. As an example, the drive current 419 is equal to a current 417 from the emitter 416 of the bipolar transistor 410.

In some examples, the emitter 426 of the bipolar transistor 420 is connected to the drain 492 of the transistor 490 and the source 458 of the transistor 452. For example, the drain 454 of the transistor 452 is connected to the terminal 446 of the controller chip 440. As an example, the source 496 of the transistor 490 is connected to the terminal 434 of the controller chip 440 and a terminal 418 of the resistor 430, and the terminal 418 of the resistor 430 is biased to the voltage 435 (e.g., a controller ground voltage) at the terminal 434 of the controller chip 440.

In certain examples, the resistor 430 includes the terminal 418 and a terminal 428. For example, the terminal 428 of the resistor 430 is connected to the terminal 432 of the controller chip 440 and the primary winding 402. As an example, the resistor 430 receives a current 431 that flows through the resistor 430 to generate a voltage 433 (e.g., a sensing voltage). For example, the voltage 433 is received by the terminal 432 of the controller chip 440. As an example, the voltage 433 (e.g., a sensing voltage) is lower than the voltage 435 (e.g., a controller ground voltage). In some examples, the voltage 433 (e.g., a sensing voltage) with respect to the voltage 435 (e.g., a controller ground voltage) is equal to the voltage 433 (e.g., a sensing voltage) minus the voltage 435 (e.g., a controller ground voltage). For example, the voltage 433 (e.g., a sensing voltage) with respect to the voltage 435 (e.g., a controller ground voltage) has a negative value. As an example, the absolute value of the voltage 433 (e.g., a sensing voltage) with respect to the voltage 435 (e.g., a controller ground voltage) is equal to the negative value multiplied by minus one. In certain examples, the voltage 433 (e.g., a sensing voltage) with respect to the voltage 435 (e.g., a controller ground voltage) has a magnitude that is equal to the absolute value of the voltage 433 (e.g., a sensing voltage) with respect to the voltage 435 (e.g., a controller ground voltage). In some examples, the resistor 408 includes terminals 438 and 468. For example, the terminal 468 receives the voltage 2460 from the rectifier 2450. As an example, the terminal 438 is connected to the base 424 of the bipolar transistor 420, the source 476 of the transistor 470, the drain 482 of the transistor 480, and the emitter 416 of the bipolar transistor 410.

According to some embodiments, the resistors 2472, 2474 and 2476 are parts of a voltage divider that receives a voltage across the primary winding 402 and generates a voltage 2470. For example, the voltage 2470 is received by the terminal 448 of the controller chip 440. In certain examples, the capacitor 2498 includes a terminal connected to the terminal 434 of the controller chip 440 and also includes a terminal connected to the terminal 446 of the controller chip 440. For example, the terminal 446 of the controller chip 440 is biased to a voltage 447. In some examples, the voltage 447 is provided by the terminal of the capacitor 2498 that is connected to the terminal 446 of the controller chip 440. For example, if the transistor 452 is turned off and the transistor 490 is turned on, the capacitor 2498 does not receive a charging current. As an example, if the transistor 452 is turned on and the transistor 490 is turned off before the bipolar transistor 420 becomes turned off, the capacitor 2498 receives a charging current (e.g., a current that flows out of the emitter 426 of the bipolar transistor 420).

As shown in FIG. 4, the power converter 400 is a flyback power converter based on primary-side feedback according to certain embodiments. For example, the flyback power converter 400 includes the primary winding 402 and the secondary winding 404. As an example, the flyback power converter 400 turns on and/or turns off the bipolar transistor 410 and/or the bipolar transistor 420 based at least upon the primary winding 402 and the secondary winding 404, without using any auxiliary winding.

As mentioned above and further emphasized here, FIG. 4 is merely an example, which should not unduly limit the scope of the claims. One of ordinary skill in the art would recognize many variations, alternatives, and modifications. For example, the transistor 460 is a P-Channel MOSFET, the transistor 470 is an N-Channel MOSFET, and the transistor 480 is a N-Channel MOSFET. As an example, each transistor of the transistors 460, 470 and 480 is a bipolar transistor. For example, the transistor 452 is a diode. In some examples, the current source 450 is not directly connected to the transistors 460, so long as the current source 450 provides a current 451 when the bipolar transistor 420 changes from being turned off to being turned on but does not provide the current 451 when the bipolar transistor 420 changes from being turned on to being turned off. In certain examples, the current 451 is a current with a constant value, a current that changes (e.g., increases linearly) with time, and/or a current that changes (e.g., increases linearly) with the current 431.

FIG. 5 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 500 (e.g., a flyback power converter based on primary-side feedback) includes a primary winding 502, a secondary winding 504, bipolar transistors 510 and 520, resistors 530 and 508, a controller chip 540, an electromagnetic interference filter 2540, a rectifier 2550, an auxiliary winding 2572, resistors 2574 and 2576, and a capacitor 2598. For example, the controller chip 540 (e.g., a controller) includes terminals 532, 534, 542, 544, 546, 548, and 506 (e.g., pins). As an example, the controller chip 540 (e.g., a controller) also includes a current source 550, transistors 560, 570, 580, 590, and 552, and a switch control circuit 536 (e.g., a drive voltage generator). In some examples, each transistor of the transistors 560, 570, 580, and 590 is an N-Channel MOSFET, and the transistor 552 is a P-Channel MOSFET. In certain examples, the primary winding 502, the secondary winding 504, and the auxiliary winding 2572 are coupled to each other and are parts of a transformer. In some examples, the power converter 500 receives an AC input voltage 2510 and generates an output voltage 2520. In some examples, the output voltage 2520 is received by a USB connector 2530. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 510 includes a collector 512, a base 514 and an emitter 516, and the bipolar transistor 520 includes a collector 522, a base 524 and an emitter 526. For example, the transistor 560 includes a drain 562, a gate 564, and a source 566. As an example, the transistor 570 includes a drain 572, a gate 574, and a source 576. For example, the transistor 580 includes a drain 582, a gate 584, and a source 586. As an example, the transistor 590 includes a drain 592, a gate 594, and a source 596. For example, the transistor 552 includes a drain 554, a gate 556, and a source 558.

In certain examples, the gate 564 of the transistor 560 receives a drive voltage 565 from the switch control circuit 536, the gate 574 of the transistor 570 receives a drive voltage 575 from the switch control circuit 536, the gate 584 of the transistor 580 receives a drive voltage 585 from the switch control circuit 536, the gate 594 of the transistor 590 receives a drive voltage 595 from the switch control circuit 536, and the gate 556 of the transistor 552 receives a drive voltage 557 from the switch control circuit 536. In some examples, the drain 562 of the transistor 560 is connected to the current source 550. For example, the source 566 of the transistor 560 is connected to the drain 572 of the transistor 570 and the base 514 of the bipolar transistor 510. As an example, the source 576 of the transistor 570 is connected to the drain 582 of the transistor 580 and the base 524 of the bipolar transistor 520. For example, the source 586 of the transistor 580 is biased to a voltage 535 (e.g., a controller ground voltage) at the terminal 534 of the controller chip 540.

In certain embodiments, the collector 512 of the bipolar transistor 510 is connected to a terminal 2592 of the primary winding 502, and the collector 522 of the bipolar transistor 520 is also connected to the terminal 2592 of the primary winding 502. As an example, the total current that flows into the collector 512 of the bipolar transistor 510 and the collector 522 of the bipolar transistor 520 is equal to a current 2561 as shown in FIG. 5. For example, the primary winding 502 includes the terminal 2592 and a terminal 2590. As an example, the terminal 2590 of the primary winding 502 receives a voltage 2560 from the rectifier 2550. In some examples, the base 514 of the bipolar transistor 510 is connected to the source 566 of the transistor 560 and the drain 572 of the transistor 570. For example, the base 514 of the bipolar transistor 510 receives a drive current 515. As an example, the emitter 516 of the bipolar transistor 510 is connected to the base 524 of the bipolar transistor 520, the source 576 of the transistor 570, and the drain 582 of the transistor 580. In certain examples, the base 524 of the bipolar transistor 520 is connected to the source 576 of the transistor 570, the drain 582 of the transistor 580, and the emitter 516 of the bipolar transistor 510. For example, the base 524 of the bipolar transistor 520 receives a drive current 519. As an example, the drive current 519 is equal to a current 517 from the emitter 516 of the bipolar transistor 510.

In some examples, the emitter 526 of the bipolar transistor 520 is connected to the drain 592 of the transistor 590 and the source 558 of the transistor 552. For example, the drain 554 of the transistor 552 is connected to the terminal 546 of the controller chip 540. As an example, the source 596 of the transistor 590 is connected to the terminal 534 of the controller chip 540 and a terminal 518 of the resistor 530, and the terminal 518 of the resistor 530 is biased to the voltage 535 (e.g., a controller ground voltage) at the terminal 534 of the controller chip 540.

In certain examples, the resistor 530 includes the terminal 518 and a terminal 528. For example, the terminal 528 of the resistor 530 is connected to the terminal 532 of the controller chip 540, and is biased to a voltage 533 (e.g., a sensing voltage) that is equal to a ground voltage on the primary side of the power converter 500. In some examples, a current 531 flows through the resistor 530 to generate a voltage drop from the voltage 535 (e.g., a controller ground voltage) to the voltage 533 (e.g., a sensing voltage). For example, the voltage 533 (e.g., a sensing voltage) is lower than the voltage 535 (e.g., a controller ground voltage). In certain examples, the voltage 533 (e.g., a sensing voltage) with respect to the voltage 535 (e.g., a controller ground voltage) is equal to the voltage 533 (e.g., a sensing voltage) minus the voltage 535 (e.g., a controller ground voltage). For example, the voltage 533 (e.g., a sensing voltage) with respect to the voltage 535 (e.g., a controller ground voltage) has a negative value. As an example, the absolute value of the voltage 533 (e.g., a sensing voltage) with respect to the voltage 535 (e.g., a controller ground voltage) is equal to the negative value multiplied by minus one. In some examples, the voltage 533 (e.g., a sensing voltage) with respect to the voltage 535 (e.g., a controller ground voltage) has a magnitude that is equal to the absolute value of the voltage 533 (e.g., a sensing voltage) with respect to the voltage 535 (e.g., a controller ground voltage). In certain examples, the resistor 508 includes terminals 538 and 568. For example, the terminal 568 receives the voltage 2560 from the rectifier 2550. As an example, the terminal 538 is connected to the base 514 of the bipolar transistor 510, the source 566 of the transistor 560, and the drain 572 of the transistor 570.

According to some embodiments, the resistor 2574 includes terminals 2580 and 2582, and the resistor 2576 includes terminals 2584 and 2586. For example, the auxiliary winding 2572 includes terminals 2594 and 2596. As an example, the terminal 2580 of the resistor 2574 is connected to the terminal 2594 of the auxiliary winding 2572, and the terminal 2586 of the resistor 2576 is biased to the voltage 535 (e.g., a controller ground voltage) at the terminal 534 of the controller chip 540. In certain examples, the terminal 2596 of the auxiliary winding 2572 is biased to the ground voltage on the primary side of the power converter 500. In some examples, the terminal 2582 of the resistor 2574 and the terminal 2584 of the resistor 2576 are both connected to the terminal 548 of the controller chip 540. For example, the terminal 2582 of the resistor 2574 and the terminal 2584 of the resistor 2576 provide a voltage 2570 to the terminal 548 of the controller chip 540.

In some examples, the capacitor 2598 includes a terminal connected to the terminal 534 of the controller chip 540 and also includes a terminal connected to the terminal 546 of the controller chip 540. For example, the terminal 546 of the controller chip 540 is biased to a voltage 547. In certain examples, the voltage 547 is provided by the terminal of the capacitor 2598 that is connected to the terminal 546 of the controller chip 540. For example, if the transistor 552 is turned off and the transistor 590 is turned on, the capacitor 2598 does not receive a charging current. As an example, if the transistor 552 is turned on and the transistor 590 is turned off before the bipolar transistor 520 becomes turned off, the capacitor 2598 receives a charging current (e.g., a current that flows out of the emitter 526 of the bipolar transistor 520).

As shown in FIG. 5, the power converter 500 is a flyback power converter based on primary-side feedback according to certain embodiments. For example, the flyback power converter 500 includes the primary winding 502, the secondary winding 504, and the auxiliary winding 2572. As an example, the auxiliary winding 2572 is used as a sensing winding, not as a power supply winding. In some examples, the flyback power converter 500 uses the auxiliary winding 2572 as a shield winding in order to reduce electromagnetic interference. For example, the resistors 2574 and 2576 are parts of a voltage divider, which is connected between the terminal 2594 of the auxiliary winding 2572 and the terminal 534 of the controller chip 540, wherein the controller chip 540 is used to control turning-on and/or turning-off of the bipolar transistor 510 and/or the bipolar transistor 520. As an example, the auxiliary winding 2572 is not used for power supply, but instead the auxiliary winding 2572 is used as a shield winding. In certain examples, the ratio of the number of turns of the auxiliary winding 2572 to the number of turns of the primary winding 502 and the ratio of the number of turns of the auxiliary winding 2572 to the number of turns of the secondary winding 504 are determined based at least in part on test results for electromagnetic interference.

As mentioned above and further emphasized here, FIG. 5 is merely an example, which should not unduly limit the scope of the claims. One of ordinary skill in the art would recognize many variations, alternatives, and modifications. For example, the transistor 560 is a P-Channel MOSFET, the transistor 570 is an N-Channel MOSFET, and the transistor 580 is a N-Channel MOSFET. As an example, each transistor of the transistors 560, 570 and 580 is a bipolar transistor. For example, the transistor 552 is a diode. In some examples, the current source 550 is not directly connected to the transistors 560, so long as the current source 550 provides a current 551 when the bipolar transistor 520 changes from being turned off to being turned on but does not provide the current 551 when the bipolar transistor 520 changes from being turned on to being turned off. In certain examples, the current 551 is a current with a constant value, a current that changes (e.g., increases linearly) with time, and/or a current that changes (e.g., increases linearly) with the current 531.

FIG. 6 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 600 (e.g., a flyback power converter based on primary-side feedback) includes a primary winding 602, a secondary winding 604, bipolar transistors 610 and 620, resistors 630 and 608, a controller chip 640, an electromagnetic interference filter 2640, a rectifier 2650, an auxiliary winding 2672, resistors 2674 and 2676, and a capacitor 2698. For example, the controller chip 640 (e.g., a controller) includes terminals 632, 634, 642, 644, 646, 648, and 606 (e.g., pins). As an example, the controller chip 640 (e.g., a controller) also includes a current source 650, transistors 660, 670, 680, 690, and 652, and a switch control circuit 636 (e.g., a drive voltage generator). In some examples, each transistor of the transistors 660, 670, 680, and 690 is an N-Channel MOSFET, and the transistor 652 is a P-Channel MOSFET. In certain examples, the primary winding 602, the secondary winding 604, and the auxiliary winding 2672 are coupled to each other and are parts of a transformer. In some examples, the power converter 600 receives an AC input voltage 2610 and generates an output voltage 2620. In some examples, the output voltage 2620 is received by a USB connector 2630. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 610 includes a collector 612, a base 614 and an emitter 616, and the bipolar transistor 620 includes a collector 622, a base 624 and an emitter 626. For example, the transistor 660 includes a drain 662, a gate 664, and a source 666. As an example, the transistor 670 includes a drain 672, a gate 674, and a source 676. For example, the transistor 680 includes a drain 682, a gate 684, and a source 686. As an example, the transistor 690 includes a drain 692, a gate 694, and a source 696. For example, the transistor 652 includes a drain 654, a gate 656, and a source 658.

In certain examples, the gate 664 of the transistor 660 receives a drive voltage 665 from the switch control circuit 636, the gate 674 of the transistor 670 receives a drive voltage 675 from the switch control circuit 636, the gate 684 of the transistor 680 receives a drive voltage 685 from the switch control circuit 636, the gate 694 of the transistor 690 receives a drive voltage 695 from the switch control circuit 636, and the gate 656 of the transistor 652 receives a drive voltage 657 from the switch control circuit 636. In some examples, the drain 662 of the transistor 660 is connected to the current source 650. For example, the source 666 of the transistor 660 is connected to the drain 672 of the transistor 670 and the base 614 of the bipolar transistor 610. As an example, the source 676 of the transistor 670 is biased to a voltage 635 (e.g., a controller ground voltage) at the terminal 634 of the controller chip 640. For example, the drain 682 of the transistor 680 is connected to the base 624 of the bipolar transistor 620. As an example, the source 686 of the transistor 680 is biased to the voltage 635 (e.g., a controller ground voltage) at the terminal 634 of the controller chip 640.

In certain embodiments, the collector 612 of the bipolar transistor 610 is connected to a terminal 2692 of the primary winding 602, and the collector 622 of the bipolar transistor 620 is also connected to the terminal 2692 of the primary winding 602. As an example, the total current that flows into the collector 612 of the bipolar transistor 610 and the collector 622 of the bipolar transistor 620 is equal to a current 2661 as shown in FIG. 6. For example, the primary winding 602 includes the terminal 2692 and a terminal 2690. As an example, the terminal 2690 of the primary winding 602 receives a voltage 2660 from the rectifier 2650. In some examples, the base 614 of the bipolar transistor 610 is connected to the source 666 of the transistor 660 and the drain 672 of the transistor 670. For example, the base 614 of the bipolar transistor 610 receives a drive current 615. As an example, the emitter 616 of the bipolar transistor 610 is connected to the base 624 of the bipolar transistor 620, the source 676 of the transistor 670, and the drain 682 of the transistor 680. In certain examples, the base 624 of the bipolar transistor 620 is connected to the source 676 of the transistor 670, the drain 682 of the transistor 680, and the emitter 616 of the bipolar transistor 610. For example, the base 624 of the bipolar transistor 620 receives a drive current 619. As an example, the drive current 619 is equal to a current 617 from the emitter 616 of the bipolar transistor 610.

In some examples, the emitter 626 of the bipolar transistor 620 is connected to the drain 692 of the transistor 690 and the source 658 of the transistor 652. For example, the drain 654 of the transistor 652 is connected to the terminal 646 of the controller chip 640. As an example, the source 696 of the transistor 690 is connected to the terminal 634 of the controller chip 640 and a terminal 618 of the resistor 630, and the terminal 618 of the resistor 630 is biased to the voltage 635 (e.g., a controller ground voltage) at the terminal 634 of the controller chip 640.

In certain examples, the resistor 630 includes the terminal 618 and a terminal 628. For example, the terminal 628 of the resistor 630 is connected to the terminal 632 of the controller chip 640, and is biased to a voltage 633 (e.g., a sensing voltage) that is equal to a ground voltage on the primary side of the power converter 600. In some examples, a current 631 flows through the resistor 630 to generate a voltage drop from the voltage 635 (e.g., a controller ground voltage) to the voltage 633 (e.g., a sensing voltage). For example, the voltage 633 (e.g., a sensing voltage) is lower than the voltage 635 (e.g., a controller ground voltage). In certain examples, the voltage 633 (e.g., a sensing voltage) with respect to the voltage 635 (e.g., a controller ground voltage) is equal to the voltage 633 (e.g., a sensing voltage) minus the voltage 635 (e.g., a controller ground voltage). For example, the voltage 633 (e.g., a sensing voltage) with respect to the voltage 635 (e.g., a controller ground voltage) has a negative value. As an example, the absolute value of the voltage 633 (e.g., a sensing voltage) with respect to the voltage 635 (e.g., a controller ground voltage) is equal to the negative value multiplied by minus one. In some examples, the voltage 633 (e.g., a sensing voltage) with respect to the voltage 635 (e.g., a controller ground voltage) has a magnitude that is equal to the absolute value of the voltage 633 (e.g., a sensing voltage) with respect to the voltage 635 (e.g., a controller ground voltage). In certain examples, the resistor 608 includes terminals 638 and 668. For example, the terminal 668 receives the voltage 2660 from the rectifier 2650. As an example, the terminal 638 is connected to the base 614 of the bipolar transistor 610, the source 666 of the transistor 660, and the drain 672 of the transistor 670.

According to some embodiments, the resistor 2674 includes terminals 2680 and 2682, and the resistor 2676 includes terminals 2684 and 2686. For example, the auxiliary winding 2672 includes terminals 2694 and 2696. As an example, the terminal 2680 of the resistor 2674 is connected to the terminal 2694 of the auxiliary winding 2672, and the terminal 2686 of the resistor 2676 is biased to the voltage 635 (e.g., a controller ground voltage) at the terminal 634 of the controller chip 640. In certain examples, the terminal 2696 of the auxiliary winding 2672 is biased to the ground voltage on the primary side of the power converter 600. In some examples, the terminal 2682 of the resistor 2674 and the terminal 2684 of the resistor 2676 are both connected to the terminal 648 of the controller chip 640. For example, the terminal 2682 of the resistor 2674 and the terminal 2684 of the resistor 2676 provide a voltage 2670 to the terminal 648 of the controller chip 640.

In some examples, the capacitor 2698 includes a terminal connected to the terminal 634 of the controller chip 640 and also includes a terminal connected to the terminal 646 of the controller chip 640. For example, the terminal 646 of the controller chip 640 is biased to a voltage 647. In certain examples, the voltage 647 is provided by the terminal of the capacitor 2698 that is connected to the terminal 646 of the controller chip 640. For example, if the transistor 652 is turned off and the transistor 690 is turned on, the capacitor 2698 does not receive a charging current. As an example, if the transistor 652 is turned on and the transistor 690 is turned off before the bipolar transistor 620 becomes turned off, the capacitor 2698 receives a charging current (e.g., a current that flows out of the emitter 626 of the bipolar transistor 620).

As shown in FIG. 6, the power converter 600 is a flyback power converter based on primary-side feedback according to certain embodiments. For example, the flyback power converter 600 includes the primary winding 602, the secondary winding 604, and the auxiliary winding 2672. As an example, the auxiliary winding 2672 is used as a sensing winding, not as a power supply winding. In some examples, the flyback power converter 600 uses the auxiliary winding 2672 as a shield winding in order to reduce electromagnetic interference. For example, the resistors 2674 and 2676 are parts of a voltage divider, which is connected between the terminal 2694 of the auxiliary winding 2672 and the terminal 634 of the controller chip 640, wherein the controller chip 640 is used to control turning-on and/or turning-off of the bipolar transistor 610 and/or the bipolar transistor 620. As an example, the auxiliary winding 2672 is not used for power supply, but instead the auxiliary winding 2672 is used as a shield winding. In certain examples, the ratio of the number of turns of the auxiliary winding 2672 to the number of turns of the primary winding 602 and the ratio of the number of turns of the auxiliary winding 2672 to the number of turns of the secondary winding 604 are determined based at least in part on test results for electromagnetic interference.

As mentioned above and further emphasized here, FIG. 6 is merely an example, which should not unduly limit the scope of the claims. One of ordinary skill in the art would recognize many variations, alternatives, and modifications. For example, the transistor 660 is a P-Channel MOSFET, the transistor 670 is an N-Channel MOSFET, and the transistor 680 is a N-Channel MOSFET. As an example, each transistor of the transistors 660, 670 and 680 is a bipolar transistor. For example, the transistor 652 is a diode. In some examples, the current source 650 is not directly connected to the transistors 660, so long as the current source 650 provides a current 651 when the bipolar transistor 620 changes from being turned off to being turned on but does not provide the current 651 when the bipolar transistor 620 changes from being turned on to being turned off. In certain examples, the current 651 is a current with a constant value, a current that changes (e.g., increases linearly) with time, and/or a current that changes (e.g., increases linearly) with the current 631.

FIG. 7 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 700 (e.g., a flyback power converter based on primary-side feedback) includes a primary winding 702, a secondary winding 704, bipolar transistors 710 and 720, resistors 730 and 708, a controller chip 740, an electromagnetic interference filter 2740, a rectifier 2750, an auxiliary winding 2772, resistors 2774 and 2776, and a capacitor 2798. For example, the controller chip 740 (e.g., a controller) includes terminals 732, 734, 742, 744, 746, 748, and 706 (e.g., pins). As an example, the controller chip 740 (e.g., a controller) also includes a current source 750, transistors 760, 770, 780, 790, and 752, and a switch control circuit 736 (e.g., a drive voltage generator). In some examples, each transistor of the transistors 760, 770, 780, and 790 is an N-Channel MOSFET, and the transistor 752 is a P-Channel MOSFET. In certain examples, the primary winding 702, the secondary winding 704, and the auxiliary winding 2772 are coupled to each other and are parts of a transformer. In some examples, the power converter 700 receives an AC input voltage 2710 and generates an output voltage 2720. In some examples, the output voltage 2720 is received by a USB connector 2730. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 710 includes a collector 712, a base 714 and an emitter 716, and the bipolar transistor 720 includes a collector 722, a base 724 and an emitter 726. For example, the transistor 760 includes a drain 762, a gate 764, and a source 766. As an example, the transistor 770 includes a drain 772, a gate 774, and a source 776. For example, the transistor 780 includes a drain 782, a gate 784, and a source 786. As an example, the transistor 790 includes a drain 792, a gate 794, and a source 796. For example, the transistor 752 includes a drain 754, a gate 756, and a source 758.

In certain examples, the gate 764 of the transistor 760 receives a drive voltage 765 from the switch control circuit 736, the gate 774 of the transistor 770 receives a drive voltage 775 from the switch control circuit 736, the gate 784 of the transistor 780 receives a drive voltage 785 from the switch control circuit 736, the gate 794 of the transistor 790 receives a drive voltage 795 from the switch control circuit 736, and the gate 756 of the transistor 752 receives a drive voltage 757 from the switch control circuit 736. In some examples, the drain 762 of the transistor 760 is connected to the current source 750. For example, the source 766 of the transistor 760 is connected to the drain 772 of the transistor 770 and the base 714 of the bipolar transistor 710. As an example, the source 776 of the transistor 770 is connected to the drain 782 of the transistor 780 and the base 724 of the bipolar transistor 720. For example, the source 786 of the transistor 780 is biased to a voltage 735 (e.g., a controller ground voltage) at the terminal 734 of the controller chip 740.

In certain embodiments, the collector 712 of the bipolar transistor 710 is connected to a terminal 2792 of the primary winding 702, and the collector 722 of the bipolar transistor 720 is also connected to the terminal 2792 of the primary winding 702. As an example, the total current that flows into the collector 712 of the bipolar transistor 710 and the collector 722 of the bipolar transistor 720 is equal to a current 2761 as shown in FIG. 7. For example, the primary winding 702 includes the terminal 2792 and a terminal 2790. As an example, the terminal 2790 of the primary winding 702 receives a voltage 2760 from the rectifier 2750. In some examples, the base 714 of the bipolar transistor 710 is connected to the source 766 of the transistor 760 and the drain 772 of the transistor 770. For example, the base 714 of the bipolar transistor 710 receives a drive current 715. As an example, the emitter 716 of the bipolar transistor 710 is connected to the base 724 of the bipolar transistor 720, the source 776 of the transistor 770, and the drain 782 of the transistor 780. In certain examples, the base 724 of the bipolar transistor 720 is connected to the source 776 of the transistor 770, the drain 782 of the transistor 780, and the emitter 716 of the bipolar transistor 710. For example, the base 724 of the bipolar transistor 720 receives a drive current 719. As an example, the drive current 719 is equal to a current 717 from the emitter 716 of the bipolar transistor 710.

In some examples, the emitter 726 of the bipolar transistor 720 is connected to the drain 792 of the transistor 790 and the source 758 of the transistor 752. For example, the drain 754 of the transistor 752 is connected to the terminal 746 of the controller chip 740. As an example, the source 796 of the transistor 790 is connected to the terminal 734 of the controller chip 740 and a terminal 718 of the resistor 730, and the terminal 718 of the resistor 730 is biased to the voltage 735 (e.g., a controller ground voltage) at the terminal 734 of the controller chip 740.

In certain examples, the resistor 730 includes the terminal 718 and a terminal 728. For example, the terminal 728 of the resistor 730 is connected to the terminal 732 of the controller chip 740, and is biased to a voltage 733 (e.g., a sensing voltage) that is equal to a ground voltage on the primary side of the power converter 700. In some examples, a current 731 flows through the resistor 730 to generate a voltage drop from the voltage 735 (e.g., a controller ground voltage) to the voltage 733 (e.g., a sensing voltage). For example, the voltage 733 (e.g., a sensing voltage) is lower than the voltage 735 (e.g., a controller ground voltage). In certain examples, the voltage 733 (e.g., a sensing voltage) with respect to the voltage 735 (e.g., a controller ground voltage) is equal to the voltage 733 (e.g., a sensing voltage) minus the voltage 735 (e.g., a controller ground voltage). For example, the voltage 733 (e.g., a sensing voltage) with respect to the voltage 735 (e.g., a controller ground voltage) has a negative value. As an example, the absolute value of the voltage 733 (e.g., a sensing voltage) with respect to the voltage 735 (e.g., a controller ground voltage) is equal to the negative value multiplied by minus one. In some examples, the voltage 733 (e.g., a sensing voltage) with respect to the voltage 735 (e.g., a controller ground voltage) has a magnitude that is equal to the absolute value of the voltage 733 (e.g., a sensing voltage) with respect to the voltage 735 (e.g., a controller ground voltage). In certain examples, the resistor 708 includes terminals 738 and 768. For example, the terminal 768 receives the voltage 2760 from the rectifier 2750. As an example, the terminal 738 is connected to the base 724 of the bipolar transistor 720, the source 776 of the transistor 770, the drain 782 of the transistor 780, and the emitter 716 of the bipolar transistor 710.

According to some embodiments, the resistor 2774 includes terminals 2780 and 2782, and the resistor 2776 includes terminals 2784 and 2786. For example, the auxiliary winding 2772 includes terminals 2794 and 2796. As an example, the terminal 2780 of the resistor 2774 is connected to the terminal 2794 of the auxiliary winding 2772, and the terminal 2786 of the resistor 2776 is biased to the voltage 735 (e.g., a controller ground voltage) at the terminal 734 of the controller chip 740. In certain examples, the terminal 2796 of the auxiliary winding 2772 is biased to the ground voltage on the primary side of the power converter 700. In some examples, the terminal 2782 of the resistor 2774 and the terminal 2784 of the resistor 2776 are both connected to the terminal 748 of the controller chip 740. For example, the terminal 2782 of the resistor 2774 and the terminal 2784 of the resistor 2776 provide a voltage 2770 to the terminal 748 of the controller chip 740.

In some examples, the capacitor 2798 includes a terminal connected to the terminal 734 of the controller chip 740 and also includes a terminal connected to the terminal 746 of the controller chip 740. For example, the terminal 746 of the controller chip 740 is biased to a voltage 747. In certain examples, the voltage 747 is provided by the terminal of the capacitor 2798 that is connected to the terminal 746 of the controller chip 740. For example, if the transistor 752 is turned off and the transistor 790 is turned on, the capacitor 2798 does not receive a charging current. As an example, if the transistor 752 is turned on and the transistor 790 is turned off before the bipolar transistor 720 becomes turned off, the capacitor 2798 receives a charging current (e.g., a current that flows out of the emitter 726 of the bipolar transistor 720).

As shown in FIG. 7, the power converter 700 is a flyback power converter based on primary-side feedback according to certain embodiments. For example, the flyback power converter 700 includes the primary winding 702, the secondary winding 704, and the auxiliary winding 2772. As an example, the auxiliary winding 2772 is used as a sensing winding, not as a power supply winding. In some examples, the flyback power converter 700 uses the auxiliary winding 2772 as a shield winding in order to reduce electromagnetic interference. For example, the resistors 2774 and 2776 are parts of a voltage divider, which is connected between the terminal 2794 of the auxiliary winding 2772 and the terminal 734 of the controller chip 740, wherein the controller chip 740 is used to control turning-on and/or turning-off of the bipolar transistor 710 and/or the bipolar transistor 720. As an example, the auxiliary winding 2772 is not used for power supply, but instead the auxiliary winding 2772 is used as a shield winding. In certain examples, the ratio of the number of turns of the auxiliary winding 2772 to the number of turns of the primary winding 702 and the ratio of the number of turns of the auxiliary winding 2772 to the number of turns of the secondary winding 704 are determined based at least in part on test results for electromagnetic interference.

As mentioned above and further emphasized here, FIG. 7 is merely an example, which should not unduly limit the scope of the claims. One of ordinary skill in the art would recognize many variations, alternatives, and modifications. For example, the transistor 760 is a P-Channel MOSFET, the transistor 770 is an N-Channel MOSFET, and the transistor 780 is a N-Channel MOSFET. As an example, each transistor of the transistors 760, 770 and 780 is a bipolar transistor. For example, the transistor 752 is a diode. In some examples, the current source 750 is not directly connected to the transistors 760, so long as the current source 750 provides a current 751 when the bipolar transistor 720 changes from being turned off to being turned on but does not provide the current 751 when the bipolar transistor 720 changes from being turned on to being turned off. In certain examples, the current 751 is a current with a constant value, a current that changes (e.g., increases linearly) with time, and/or a current that changes (e.g., increases linearly) with the current 731.

FIG. 8 is a simplified diagram showing a power converter including bipolar transistors according to certain embodiments of the present invention. This diagram is merely an example, which should not unduly limit the scope of the claims. One of ordinary skill in the art would recognize many variations, alternatives, and modifications. The power converter 800 (e.g., a flyback power converter based on primary-side feedback) includes a primary winding 802, a secondary winding 804, bipolar transistors 810 and 820, resistors 830 and 808, a controller chip 840, an electromagnetic interference filter 2840, a rectifier 2850, an auxiliary winding 2872, resistors 2874 and 2876, and a capacitor 2898. For example, the controller chip 840 (e.g., a controller) includes terminals 832, 834, 842, 844, 846, 848, and 806 (e.g., pins). As an example, the controller chip 840 (e.g., a controller) also includes a current source 850, transistors 860, 870, 880, 890, and 852, and a switch control circuit 836 (e.g., a drive voltage generator). In some examples, each transistor of the transistors 860, 870, 880, and 890 is an N-Channel MOSFET, and the transistor 852 is a P-Channel MOSFET. In certain examples, the primary winding 802, the secondary winding 804, and the auxiliary winding 2872 are coupled to each other and are parts of a transformer. In some examples, the power converter 800 receives an AC input voltage 2810 and generates an output voltage 2820. In some examples, the output voltage 2820 is received by a USB connector 2830. Although the above has been shown using a selected group of components for the power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the bipolar transistor 810 includes a collector 812, a base 814 and an emitter 816, and the bipolar transistor 820 includes a collector 822, a base 824 and an emitter 826. For example, the transistor 860 includes a drain 862, a gate 864, and a source 866. As an example, the transistor 870 includes a drain 872, a gate 874, and a source

876. For example, the transistor 880 includes a drain 882, a gate 884, and a source 886. As an example, the transistor 890 includes a drain 892, a gate 894, and a source 896. For example, the transistor 852 includes a drain 854, a gate 856, and a source 858.

In certain examples, the gate 864 of the transistor 860 receives a drive voltage 865 from the switch control circuit 836, the gate 874 of the transistor 870 receives a drive voltage 875 from the switch control circuit 836, the gate 884 of the transistor 880 receives a drive voltage 885 from the switch control circuit 836, the gate 894 of the transistor 890 receives a drive voltage 895 from the switch control circuit 836, and the gate 856 of the transistor 852 receives a drive voltage 857 from the switch control circuit 836. In some examples, the drain 862 of the transistor 860 is connected to the current source 850. For example, the source 866 of the transistor 860 is connected to the drain 872 of the transistor 870 and the base 814 of the bipolar transistor 810. As an example, the source 876 of the transistor 870 is biased to a voltage 835 (e.g., a controller ground voltage) at the terminal 834 of the controller chip 840. For example, the drain 882 of the transistor 880 is connected to the base 824 of the bipolar transistor 820. As an example, the source 886 of the transistor 880 is biased to the voltage 835 (e.g., a controller ground voltage) at the terminal 834 of the controller chip 840.

In certain embodiments, the collector 812 of the bipolar transistor 810 is connected to a terminal 2892 of the primary winding 802, and the collector 822 of the bipolar transistor 820 is also connected to the terminal 2892 of the primary winding 802. As an example, the total current that flows into the collector 812 of the bipolar transistor 810 and the collector 822 of the bipolar transistor 820 is equal to a current 2861 as shown in FIG. 8. For example, the primary winding 802 includes the terminal 2892 and a terminal 2890. As an example, the terminal 2890 of the primary winding 802 receives a voltage 2860 from the rectifier 2850. In some examples, the base 814 of the bipolar transistor 810 is connected to the source 866 of the transistor 860 and the drain 872 of the transistor 870. For example, the base 814 of the bipolar transistor 810 receives a drive current 815. As an example, the emitter 816 of the bipolar transistor 810 is connected to the base 824 of the bipolar transistor 820, the source 876 of the transistor 870, and the drain 882 of the transistor 880. In certain examples, the base 824 of the bipolar transistor 820 is connected to the source 876 of the transistor 870, the drain 882 of the transistor 880, and the emitter 816 of the bipolar transistor 810. For example, the base 824 of the bipolar transistor 820 receives a drive current 819. As an example, the drive current 819 is equal to a current 817 from the emitter 816 of the bipolar transistor 810.

In some examples, the emitter 826 of the bipolar transistor 820 is connected to the drain 892 of the transistor 890 and the source 858 of the transistor 852. For example, the drain 854 of the transistor 852 is connected to the terminal 846 of the controller chip 840. As an example, the source 896 of the transistor 890 is connected to the terminal 834 of the controller chip 840 and a terminal 818 of the resistor 830, and the terminal 818 of the resistor 830 is biased to the voltage 835 (e.g., a controller ground voltage) at the terminal 834 of the controller chip 840.

In certain examples, the resistor 830 includes the terminal 818 and a terminal 828. For example, the terminal 828 of the resistor 830 is connected to the terminal 832 of the controller chip 840, and is biased to a voltage 833 (e.g., a sensing voltage) that is equal to a ground voltage on the primary side of the power converter 800. In some examples, a current 831 flows through the resistor 830 to generate a voltage drop from the voltage 835 (e.g., a controller ground voltage) to the voltage 833 (e.g., a sensing voltage). For example, the voltage 833 (e.g., a sensing voltage) is lower than the voltage 835 (e.g., a controller ground voltage). In certain examples, the voltage 833 (e.g., a sensing voltage) with respect to the voltage 835 (e.g., a controller ground voltage) is equal to the voltage 833 (e.g., a sensing voltage) minus the voltage 835 (e.g., a controller ground voltage). For example, the voltage 833 (e.g., a sensing voltage) with respect to the voltage 835 (e.g., a controller ground voltage) has a negative value. As an example, the absolute value of the voltage 833 (e.g., a sensing voltage) with respect to the voltage 835 (e.g., a controller ground voltage) is equal to the negative value multiplied by minus one. In some examples, the voltage 833 (e.g., a sensing voltage) with respect to the voltage 835 (e.g., a controller ground voltage) has a magnitude that is equal to the absolute value of the voltage 833 (e.g., a sensing voltage) with respect to the voltage 835 (e.g., a controller ground voltage). In certain examples, the resistor 808 includes terminals 838 and 868. For example, the terminal 868 receives the voltage 2860 from the rectifier 2850. As an example, the terminal 838 is connected to the base 824 of the bipolar transistor 820, the source 876 of the transistor 870, the drain 882 of the transistor 880, and the emitter 816 of the bipolar transistor 810.

According to some embodiments, the resistor 2874 includes terminals 2880 and 2882, and the resistor 2876 includes terminals 2884 and 2886. For example, the auxiliary winding 2872 includes terminals 2894 and 2896. As an example, the terminal 2880 of the resistor 2874 is connected to the terminal 2894 of the auxiliary winding 2872, and the terminal 2886 of the resistor 2876 is biased to the voltage 835 (e.g., a controller ground voltage) at the terminal 834 of the controller chip 840. In certain examples, the terminal 2896 of the auxiliary winding 2872 is biased to the ground voltage on the primary side of the power converter 800. In some examples, the terminal 2882 of the resistor 2874 and the terminal 2884 of the resistor 2876 are both connected to the terminal 848 of the controller chip 840. For example, the terminal 2882 of the resistor 2874 and the terminal 2884 of the resistor 2876 provide a voltage 2870 to the terminal 848 of the controller chip 840.

In some examples, the capacitor 2898 includes a terminal connected to the terminal 834 of the controller chip 840 and also includes a terminal connected to the terminal 846 of the controller chip 840. For example, the terminal 846 of the controller chip 840 is biased to a voltage 847. In certain examples, the voltage 847 is provided by the terminal of the capacitor 2898 that is connected to the terminal 846 of the controller chip 840. For example, if the transistor 852 is turned off and the transistor 890 is turned on, the capacitor 2898 does not receive a charging current. As an example, if the transistor 852 is turned on and the transistor 890 is turned off before the bipolar transistor 820 becomes turned off, the capacitor 2898 receives a charging current (e.g., a current that flows out of the emitter 826 of the bipolar transistor 820).

As shown in FIG. 8, the power converter 800 is a flyback power converter based on primary-side feedback according to certain embodiments. For example, the flyback power converter 800 includes the primary winding 802, the secondary winding 804, and the auxiliary winding 2872. As an example, the auxiliary winding 2872 is used as a sensing winding, not as a power supply winding. In some examples, the flyback power converter 800 uses the auxiliary winding

2872 as a shield winding in order to reduce electromagnetic interference. For example, the resistors 2874 and 2876 are parts of a voltage divider, which is connected between the terminal 2894 of the auxiliary winding 2872 and the terminal 834 of the controller chip 840, wherein the controller chip 840 is used to control turning-on and/or turning-off of the bipolar transistor 810 and/or the bipolar transistor 820. As an example, the auxiliary winding 2872 is not used for power supply, but instead the auxiliary winding 2872 is used as a shield winding. In certain examples, the ratio of the number of turns of the auxiliary winding 2872 to the number of turns of the primary winding 802 and the ratio of the number of turns of the auxiliary winding 2872 to the number of turns of the secondary winding 804 are determined based at least in part on test results for electromagnetic interference.

As mentioned above and further emphasized here, FIG. 8 is merely an example, which should not unduly limit the scope of the claims. One of ordinary skill in the art would recognize many variations, alternatives, and modifications. For example, the transistor 860 is a P-Channel MOSFET, the transistor 870 is an N-Channel MOSFET, and the transistor 880 is a N-Channel MOSFET. As an example, each transistor of the transistors 860, 870 and 880 is a bipolar transistor. For example, the transistor 852 is a diode. In some examples, the current source 850 is not directly connected to the transistors 860, so long as the current source 850 provides a current 851 when the bipolar transistor 820 changes from being turned off to being turned on but does not provide the current 851 when the bipolar transistor 820 changes from being turned on to being turned off. In certain examples, the current 851 is a current with a constant value, a current that changes (e.g., increases linearly) with time, and/or a current that changes (e.g., increases linearly) with the current 831.

FIG. 9 shows simplified timing diagrams for the power converter 100 as shown in FIG. 1, the power converter 200 as shown in FIG. 2, the power converter 300 as shown in FIG. 3, the power converter 400 as shown in FIG. 4, the power converter 500 as shown in FIG. 5, the power converter 600 as shown in FIG. 6, the power converter 700 as shown in FIG. 7, and/or the power converter 800 as shown in FIG. 8 according to some embodiments of the present invention. These diagrams are merely examples, which should not unduly limit the scope of the claims. One of ordinary skill in the art would recognize many variations, alternatives, and modifications.

In certain examples, the timing diagrams as shown in FIG. 9 represent waveforms when a capacitor CD (e.g., the capacitor 2198, the capacitor 2298, the capacitor 2398, the capacitor 2498, the capacitor 2598, the capacitor 2698, the capacitor 2798, and/or the capacitor 2898) does not receive a charging current. For example, the waveform 965 represents a drive voltage for a transistor D1 (e.g., the transistor 160, the transistor 260, the transistor 360, the transistor 460, the transistor 560, the transistor 660, the transistor 760, and/or the transistor 860) as a function of time. As an example, the waveform 975 represents a drive voltage for a transistor D2 (e.g., the transistor 170, the transistor 270, the transistor 370, the transistor 470, the transistor 570, the transistor 670, the transistor 770, and/or the transistor 870) as a function of time. For example, the waveform 985 represents a drive voltage for a transistor D3 (e.g., the transistor 180, the transistor 280, the transistor 380, the transistor 480, the transistor 580, the transistor 680, the transistor 780, and/or the transistor 880) as a function of time. As an example, the waveform 915 represents a drive current for a bipolar transistor Q1 (e.g., the bipolar transistor 110, the bipolar transistor 210, the bipolar transistor 310, the bipolar transistor 410, the bipolar transistor 510, the bipolar transistor 610, the bipolar transistor 710, and/or the bipolar transistor 810) as a function of time. For example, the waveform 919 represents a drive current for a bipolar transistor Q2 (e.g., the bipolar transistor 120, the bipolar transistor 220, the bipolar transistor 320, the bipolar transistor 420, the bipolar transistor 520, the bipolar transistor 620, the bipolar transistor 720, and/or the bipolar transistor 820) as a function of time. As an example, the waveform 995 represents a drive voltage for a transistor Q3 (e.g., the transistor 190, the transistor 290, the transistor 390, the transistor 490, the transistor 590, the transistor 690, the transistor 790, and/or the transistor 890) as a function of time. For example, the waveform 957 represents a drive voltage for a transistor Q4 (e.g., the transistor 152, the transistor 252, the transistor 352, the transistor 452, the transistor 552, the transistor 652, the transistor 752, and/or the transistor 852) as a function of time. As an example, the waveform 947 represents a voltage VDD (e.g., the voltage 147, the voltage 247, the voltage 347, the voltage 447, the voltage 547, the voltage 647, the voltage 747, the voltage 847, and/or the voltage 947) as a function of time. For example, the waveform 961 represents a current Ic (e.g., the current 2161, the current 2261, the current 2361, the current 2461, the current 2561, the current 2661, the current 2761, and/or the current 2861) as a function of time. As an example, the waveform 933 represents a voltage Vcs with respect to a controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) as a function of time.

In some examples, as shown in FIG. 1, the waveform 965 represents the drive voltage 165 as a function of time, the waveform 975 represents the drive voltage 175 as a function of time, the waveform 985 represents the drive voltage 185 as a function of time, the waveform 915 represents the drive current 115 as a function of time, the waveform 919 represents the drive current 119 as a function of time, the waveform 995 represents the drive voltage 195 as a function of time, the waveform 957 represents the drive voltage 157 as a function of time, the waveform 947 represents the voltage 147 as a function of time, the waveform 961 represents the current 2161 as a function of time, and the waveform 933 represents the voltage 133 with respect to the voltage 135 (e.g., a controller ground voltage) as a function of time. In certain examples, as shown in FIG. 2, the waveform 965 represents the drive voltage 265 as a function of time, the waveform 975 represents the drive voltage 275 as a function of time, the waveform 985 represents the drive voltage 285 as a function of time, the waveform 915 represents the drive current 215 as a function of time, the waveform 919 represents the drive current 219 as a function of time, the waveform 995 represents the drive voltage 295 as a function of time, the waveform 957 represents the drive voltage 257 as a function of time, the waveform 947 represents the voltage 247 as a function of time, the waveform 961 represents the current 2261 as a function of time, and the waveform 933 represents the voltage 233 with respect to the voltage 235 (e.g., a controller ground voltage) as a function of time.

In some examples, as shown in FIG. 3, the waveform 965 represents the drive voltage 365 as a function of time, the waveform 975 represents the drive voltage 375 as a function of time, the waveform 985 represents the drive voltage 385 as a function of time, the waveform 915 represents the drive current 315 as a function of time, the waveform 919 represents the drive current 319 as a function of time, the waveform 995 represents the drive voltage 395 as a function of time, the waveform 957 represents the drive voltage 357 as a function of time, the waveform 947 represents the voltage 347 as a function of time, the waveform 961 represents the current 2361 as a function of time, and the waveform 933 represents the voltage 333 with respect to the voltage 335 (e.g., a controller ground voltage) as a function of time. In certain examples, as shown in FIG. 4, the waveform 965 represents the drive voltage 465 as a function of time, the waveform 975 represents the drive voltage 475 as a function of time, the waveform 985 represents the drive voltage 485 as a function of time, the waveform 915 represents the drive current 415 as a function of time, the waveform 919 represents the drive current 419 as a function of time, the waveform 995 represents the drive voltage 495 as a function of time, the waveform 957 represents the drive voltage 457 as a function of time, the waveform 947 represents the voltage 447 as a function of time, the waveform 961 represents the current 2461 as a function of time, and the waveform 933 represents the voltage 433 with respect to the voltage 435 (e.g., a controller ground voltage) as a function of time.

In some examples, as shown in FIG. 5, the waveform 965 represents the drive voltage 565 as a function of time, the waveform 975 represents the drive voltage 575 as a function of time, the waveform 985 represents the drive voltage 585 as a function of time, the waveform 915 represents the drive current 515 as a function of time, the waveform 919 represents the drive current 519 as a function of time, the waveform 995 represents the drive voltage 595 as a function of time, the waveform 957 represents the drive voltage 557 as a function of time, the waveform 947 represents the voltage 547 as a function of time, the waveform 961 represents the current 2561 as a function of time, and the waveform 933 represents the voltage 533 with respect to the voltage 535 (e.g., a controller ground voltage) as a function of time. In certain examples, as shown in FIG. 6, the waveform 965 represents the drive voltage 665 as a function of time, the waveform 975 represents the drive voltage 675 as a function of time, the waveform 985 represents the drive voltage 685 as a function of time, the waveform 915 represents the drive current 615 as a function of time, the waveform 919 represents the drive current 619 as a function of time, the waveform 995 represents the drive voltage 695 as a function of time, the waveform 957 represents the drive voltage 657 as a function of time, the waveform 947 represents the voltage 647 as a function of time, the waveform 961 represents the current 2661 as a function of time, and the waveform 933 represents the voltage 633 with respect to the voltage 635 (e.g., a controller ground voltage) as a function of time.

In some examples, as shown in FIG. 7, the waveform 965 represents the drive voltage 765 as a function of time, the waveform 975 represents the drive voltage 775 as a function of time, the waveform 985 represents the drive voltage 785 as a function of time, the waveform 915 represents the drive current 715 as a function of time, the waveform 919 represents the drive current 719 as a function of time, the waveform 995 represents the drive voltage 795 as a function of time, the waveform 957 represents the drive voltage 757 as a function of time, the waveform 947 represents the voltage 747 as a function of time, the waveform 961 represents the current 2761 as a function of time, and the waveform 933 represents the voltage 733 with respect to the voltage 735 (e.g., a controller ground voltage) as a function of time. In certain examples, as shown in FIG. 8, the waveform 965 represents the drive voltage 865 as a function of time, the waveform 975 represents the drive voltage 875 as a function of time, the waveform 985 represents the drive voltage 885 as a function of time, the waveform 915 represents the drive current 815 as a function of time, the waveform 919 represents the drive current 819 as a function of time, the waveform 995 represents the drive voltage 895 as a function of time, the waveform 957 represents the drive voltage 857 as a function of time, the waveform 947 represents the voltage 847 as a function of time, the waveform 961 represents the current 2861 as a function of time, and the waveform 933 represents the voltage 833 with respect to the voltage 835 (e.g., a controller ground voltage) as a function of time.

FIG. 10 shows simplified timing diagrams for the power converter 100 as shown in FIG. 1, the power converter 200 as shown in FIG. 2, the power converter 300 as shown in FIG. 3, the power converter 400 as shown in FIG. 4, the power converter 500 as shown in FIG. 5, the power converter 600 as shown in FIG. 6, the power converter 700 as shown in FIG. 7, and/or the power converter 800 as shown in FIG. 8 according to some embodiments of the present invention. These diagrams are merely examples, which should not unduly limit the scope of the claims. One of ordinary skill in the art would recognize many variations, alternatives, and modifications.

In certain examples, the timing diagrams as shown in FIG. 10 represent waveforms when a capacitor CD (e.g., the capacitor 2198, the capacitor 2298, the capacitor 2398, the capacitor 2498, the capacitor 2598, the capacitor 2698, the capacitor 2798, and/or the capacitor 2898) receives a charging current. For example, the waveform 1065 represents a drive voltage for a transistor D1 (e.g., the transistor 160, the transistor 260, the transistor 360, the transistor 460, the transistor 560, the transistor 660, the transistor 760, and/or the transistor 860) as a function of time. As an example, the waveform 1075 represents a drive voltage for a transistor D2 (e.g., the transistor 170, the transistor 270, the transistor 370, the transistor 470, the transistor 570, the transistor 670, the transistor 770, and/or the transistor 870) as a function of time. For example, the waveform 1085 represents a drive voltage for a transistor D3 (e.g., the transistor 180, the transistor 280, the transistor 380, the transistor 480, the transistor 580, the transistor 680, the transistor 780, and/or the transistor 880) as a function of time. As an example, the waveform 1015 represents a drive current for a bipolar transistor Q1 (e.g., the bipolar transistor 110, the bipolar transistor 210, the bipolar transistor 310, the bipolar transistor 410, the bipolar transistor 510, the bipolar transistor 610, the bipolar transistor 710, and/or the bipolar transistor 810) as a function of time. For example, the waveform 1019 represents a drive current for a bipolar transistor Q2 (e.g., the bipolar transistor 120, the bipolar transistor 220, the bipolar transistor 320, the bipolar transistor 420, the bipolar transistor 520, the bipolar transistor 620, the bipolar transistor 720, and/or the bipolar transistor 820) as a function of time. As an example, the waveform 1095 represents a drive voltage for a transistor Q3 (e.g., the transistor 190, the transistor 290, the transistor 390, the transistor 490, the transistor 590, the transistor 690, the transistor 790, and/or the transistor 890) as a function of time. For example, the waveform 1057 represents a drive voltage for a transistor Q4 (e.g., the transistor 152, the transistor 252, the transistor 352, the transistor 452, the transistor 552, the transistor 652, the transistor 752, and/or the transistor 852) as a function of time. As an example, the waveform 1047 represents a voltage VDD (e.g., the voltage 147, the voltage 247, the voltage 347, the voltage 447, the voltage 547, the voltage 647, the voltage 747, the voltage 847, and/or the voltage 947) as a function of time. For example, the waveform 1061 represents a current Ic (e.g., the current 2161, the current 2261, the current 2361, the current 2461, the current 2561, the current 2661, the current 2761, and/or the current 2861) as a function of time. As an example, the waveform 1033 represents a voltage Vcs with respect to a controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) as a function of time.

In some examples, as shown in FIG. 1, the waveform 1065 represents the drive voltage 165 as a function of time, the waveform 1075 represents the drive voltage 175 as a function of time, the waveform 1085 represents the drive voltage 185 as a function of time, the waveform 1015 represents the drive current 115 as a function of time, the waveform 1019 represents the drive current 119 as a function of time, the waveform 1095 represents the drive voltage 195 as a function of time, the waveform 1057 represents the drive voltage 157 as a function of time, the waveform 1047 represents the voltage 147 as a function of time, the waveform 1061 represents the current 2161 as a function of time, and the waveform 1033 represents the voltage 133 with respect to the voltage 135 (e.g., a controller ground voltage) as a function of time. In certain examples, as shown in FIG. 2, the waveform 1065 represents the drive voltage 265 as a function of time, the waveform 1075 represents the drive voltage 275 as a function of time, the waveform 1085 represents the drive voltage 285 as a function of time, the waveform 1015 represents the drive current 215 as a function of time, the waveform 1019 represents the drive current 219 as a function of time, the waveform 1095 represents the drive voltage 295 as a function of time, the waveform 1057 represents the drive voltage 257 as a function of time, the waveform 1047 represents the voltage 247 as a function of time, the waveform 1061 represents the current 2261 as a function of time, and the waveform 1033 represents the voltage 233 with respect to the voltage 235 (e.g., a controller ground voltage) as a function of time.

In some examples, as shown in FIG. 3, the waveform 1065 represents the drive voltage 365 as a function of time, the waveform 1075 represents the drive voltage 375 as a function of time, the waveform 1085 represents the drive voltage 385 as a function of time, the waveform 1015 represents the drive current 315 as a function of time, the waveform 1019 represents the drive current 319 as a function of time, the waveform 1095 represents the drive voltage 395 as a function of time, the waveform 1057 represents the drive voltage 357 as a function of time, the waveform 1047 represents the voltage 347 as a function of time, the waveform 1061 represents the current 2361 as a function of time, and the waveform 1033 represents the voltage 333 with respect to the voltage 335 (e.g., a controller ground voltage) as a function of time. In certain examples, as shown in FIG. 4, the waveform 1065 represents the drive voltage 465 as a function of time, the waveform 1075 represents the drive voltage 475 as a function of time, the waveform 1085 represents the drive voltage 485 as a function of time, the waveform 1015 represents the drive current 415 as a function of time, the waveform 1019 represents the drive current 419 as a function of time, the waveform 1095 represents the drive voltage 495 as a function of time, the waveform 1057 represents the drive voltage 457 as a function of time, the waveform 1047 represents the voltage 447 as a function of time, the waveform 1061 represents the current 2461 as a function of time, and the waveform 1033 represents the voltage 433 with respect to the voltage 435 (e.g., a controller ground voltage) as a function of time.

In some examples, as shown in FIG. 5, the waveform 1065 represents the drive voltage 565 as a function of time, the waveform 1075 represents the drive voltage 575 as a function of time, the waveform 1085 represents the drive voltage 585 as a function of time, the waveform 1015 represents the drive current 515 as a function of time, the waveform 1019 represents the drive current 519 as a function of time, the waveform 1095 represents the drive voltage 595 as a function of time, the waveform 1057 represents the drive voltage 557 as a function of time, the waveform 1047 represents the voltage 547 as a function of time, the waveform 1061 represents the current 2561 as a function of time, and the waveform 1033 represents the voltage 533 with respect to the voltage 535 (e.g., a controller ground voltage) as a function of time. In certain examples, as shown in FIG. 6, the waveform 1065 represents the drive voltage 665 as a function of time, the waveform 1075 represents the drive voltage 675 as a function of time, the waveform 1085 represents the drive voltage 685 as a function of time, the waveform 1015 represents the drive current 615 as a function of time, the waveform 1019 represents the drive current 619 as a function of time, the waveform 1095 represents the drive voltage 695 as a function of time, the waveform 1057 represents the drive voltage 657 as a function of time, the waveform 1047 represents the voltage 647 as a function of time, the waveform 1061 represents the current 2661 as a function of time, and the waveform 1033 represents the voltage 633 with respect to the voltage 635 (e.g., a controller ground voltage) as a function of time.

In some examples, as shown in FIG. 7, the waveform 1065 represents the drive voltage 765 as a function of time, the waveform 1075 represents the drive voltage 775 as a function of time, the waveform 1085 represents the drive voltage 785 as a function of time, the waveform 1015 represents the drive current 715 as a function of time, the waveform 1019 represents the drive current 719 as a function of time, the waveform 1095 represents the drive voltage 795 as a function of time, the waveform 1057 represents the drive voltage 757 as a function of time, the waveform 1047 represents the voltage 747 as a function of time, the waveform 1061 represents the current 2761 as a function of time, and the waveform 1033 represents the voltage 733 with respect to the voltage 735 (e.g., a controller ground voltage) as a function of time. In certain examples, as shown in FIG. 8, the waveform 1065 represents the drive voltage 865 as a function of time, the waveform 1075 represents the drive voltage 875 as a function of time, the waveform 1085 represents the drive voltage 885 as a function of time, the waveform 1015 represents the drive current 815 as a function of time, the waveform 1019 represents the drive current 819 as a function of time, the waveform 1095 represents the drive voltage 895 as a function of time, the waveform 1057 represents the drive voltage 857 as a function of time, the waveform 1047 represents the voltage 847 as a function of time, the waveform 1061 represents the current 2861 as a function of time, and the waveform 1033 represents the voltage 833 with respect to the voltage 835 (e.g., a controller ground voltage) as a function of time.

As shown in FIG. 1, FIG. 2, FIG. 3, FIG. 4, FIG. 5, FIG. 6, FIG. 7, FIG. 8, FIG. 9, and/or FIG. 10, during the process of the bipolar transistor Q2 changing from being turned off to being turned on (e.g., when the absolute value of the voltage Vcs with respect to a controller ground voltage is smaller than a predetermined threshold A), the transistor D1 and the bipolar transistor Q1 are turned on, and the transistors D2 and D3 are turned off according to certain embodiments. For example, if the transistor D1 and the bipolar transistor Q1 are turned on and the transistors D2 and D3 are turned off, the base of the bipolar transistor Q2 receives a current (e.g., the current 117, the current 217, the current 317, the current 417, the current 517, the current 617, the current 717, and/or the current 817) from the emitter of the bipolar transistor Q1. As an example, if the transistor D1 and the bipolar transistor Q1 are turned on and the transistors D2 and D3 are turned off, the bipolar transistor Q2 uses, as its drive current, the current (e.g., the current 117, the current 217, the current 317, the current 417, the current 517, the current 617, the current 717, and/or the current 817) from the emitter of the bipolar transistor Q1. In some examples, when the absolute value of the voltage Vcs with respect to the controller ground voltage (e.g., the voltage 133 with respect to the voltage 135, the voltage 233 with respect to the voltage 235, the voltage 333 with respect to the voltage 335, and/or the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) is smaller than a predetermined threshold A (e.g., during the process of the bipolar transistor Q2 changing from being turned off to being turned on), the transistor D1 and the bipolar transistor Q1 are turned on, and the transistors D2 and D3 are turned off. For example, the absolute value of the voltage Vcs with respect to the controller ground voltage is equal to the absolute value of the difference between the voltage Vcs and the controller ground voltage.

In some embodiments, after the bipolar transistor Q2 becomes turned on, when the bipolar transistor Q2 remains turned on but before the absolute value of the voltage Vcs with respect to the controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) reaches the predetermined threshold A, the transistor D1 and the bipolar transistor Q1 remain turned on, and the transistors D2 and D3 remain turned off. For example, if the transistor D1 and the bipolar transistor Q1 remain turned on and the transistors D2 and D3 remain turned off, the base of the bipolar transistor Q2 receives the current (e.g., the current 117, the current 217, the current 317, the current 417, the current 517, the current 617, the current 717, and/or the current 817) from the emitter of the bipolar transistor Q1. As an example, if the transistor D1 and the bipolar transistor Q1 remain turned on and the transistors D2 and D3 remain turned off, the bipolar transistor Q2 uses, as its drive current, the current (e.g., the current 117, the current 217, the current 317, the current 417, the current 517, the current 617, the current 717, and/or the current 817) from the emitter of the bipolar transistor Q1. In certain examples, when the bipolar transistor Q2 remains turned on and the absolute value of the voltage Vcs with respect to the controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) remains smaller than the predetermined threshold A, the transistor D1 and the bipolar transistor Q1 remain turned on, and the transistors D2 and D3 remain turned off.

In certain embodiments, after the absolute value of the voltage Vcs with respect to the controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) reaches the predetermined threshold A, when the bipolar transistor Q2 remains turned on, the transistors D1 and D3 and the bipolar transistor Q1 are turned off, and the transistor D2 is turned on. For example, if the transistors D1 and D3 and the bipolar transistor Q1 are turned off, and the transistor D2 is turned on, a current from the emitter of the bipolar transistor Q1 (e.g., the current 117, the current 217, the current 317, the current 417, the current 517, the current 617, the current 717, and/or the current 817) is reduced to zero and hence stopped from flowing, the voltage at the base of the bipolar transistor Q2 (e.g., a base voltage 113, a base voltage 213, a base voltage 313, a base voltage 413, a base voltage 513, a base voltage 613, a base voltage 713, and/or a base voltage 813) is floating, and the minority charge carriers in the base of the bipolar transistor Q2 are used to maintain the bipolar transistor Q2 being turned on.

In some examples, after the absolute value of the voltage Vcs with respect to the controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) becomes equal to and/or larger than the predetermined threshold A, when the bipolar transistor Q2 remains turned on, the transistors D1 and D3 and the bipolar transistor Q1 are turned off, and the transistor D2 is turned on. For example, after the absolute value of the voltage Vcs with respect to the controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) becomes equal to and/or larger than the predetermined threshold A, the transistor D1 is turned off and the transistor D2 is turned on, so that the current from the emitter of the bipolar transistor Q1 (e.g., the current 117, the current 217, the current 317, the current 417, the current 517, the current 617, the current 717, and/or the current 817) is reduced to zero and hence stopped from flowing, the voltage at the base of the bipolar transistor Q2 (e.g., the base voltage 113, the base voltage 213, the base voltage 313, the base voltage 413, the base voltage 513, the base voltage 613, the base voltage 713, and/or the base voltage 813) is floating, and the minority charge carriers in the base of the bipolar transistor Q2 are used to maintain the bipolar transistor Q2 being turned on. As an example, after the absolute value of the voltage Vcs with respect to the controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) reaches the predetermined threshold A, the transistor D1 is turned off and the transistor D2 is turned on, so that the current from the emitter of the bipolar transistor Q1 (e.g., the current 117, the current 217, the current 317, the current 417, the current 517, the current 617, the current 717, and/or the current 817) is reduced to zero and hence stopped from flowing, the voltage at the base of the bipolar transistor Q2 (e.g., the base voltage 113, the base voltage 213, the base voltage 313, the base voltage 413, the base voltage 513, the base voltage 613, the base voltage 713, and/or the base voltage 813) is floating, and the minority charge carriers in the base of the bipolar transistor Q2 are used to maintain the bipolar transistor Q2 being turned on.

According to some embodiments, after the transistors D1 and D3 and the bipolar transistor Q1 are turned off and the transistor D2 is turned on, if the absolute value of the voltage Vcs with respect to the controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) becomes equal to and/or larger than a predetermined threshold B, the transistor D1 and the bipolar transistor Q1 remains turned off, the transistor D2 remains turned on, and the transistor D3 becomes turned on. As an example, the absolute value of the voltage Vcs with respect to the controller ground voltage is equal to the absolute value of the difference between the voltage Vcs and the controller ground voltage. For example, the predetermined threshold B is larger than the predetermined threshold A. As an example, after the transistors D1 and D3 and the bipolar transistor Q1 are turned off and the transistor D2 is turned on, if the absolute value of the voltage Vcs with respect to the controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) reaches the predetermined threshold B, the transistor D1 and the bipolar transistor Q1 remains turned off, the transistor D2 remains turned on, and the transistor D3 becomes turned on.

In certain examples, if the transistor D1 and the bipolar transistor Q1 remains turned off, the transistor D2 remains turned on, and the transistor D3 becomes turned on, the bipolar transistor Q2 becomes turned off. As an example, when the transistor D1 and the bipolar transistor Q1 remains turned off and the transistor D2 remains turned on, but before the transistor D3 becomes turned on, the current from the emitter of the bipolar transistor Q1 (e.g., the current 117, the current 217, the current 317, the current 417, the current 517, the current 617, the current 717, and/or the current 817) remains equal to zero and hence remains stopped from flowing, and the bipolar transistor Q2 remains turned on with the floating voltage (e.g., the base voltage 113, the base voltage 213, the base voltage 313, the base voltage 413, the base voltage 513, the base voltage 613, the base voltage 713, and/or the base voltage 813) at the base of the bipolar transistor Q2. In some examples, when the bipolar transistor Q2 remains turned off, the transistor D1 and the bipolar transistor Q1 remains turned off, the transistor D2 remains turned on, and the transistor D3 also remains turned on, According to some embodiments, when the bipolar transistor Q2 is turned on, the bipolar transistor Q2 first uses a current (e.g., the current 117, the current 217, the current 317, the current 417, the current 517, the current 617, the current 717, and/or the current 817) from the emitter of the bipolar transistor Q1 as its drive current, and then stops using the current from the emitter of the bipolar transistor Q1 as its drive current but instead makes the voltage at the base of the bipolar transistor Q2 (e.g., the base voltage 113, the base voltage 213, the base voltage 313, the base voltage 413, the base voltage 513, the base voltage 613, the base voltage 713, and/or the base voltage 813) become floating. In certain examples, during the process of the bipolar transistor Q2 changing from being turned off to being turned on, the bipolar transistor Q2 uses, as its drive current, the current from the emitter of the bipolar transistor Q1. For example, the current from the emitter of the bipolar transistor Q1, which is used as the drive current of the bipolar transistor Q2, is sufficiently large so that the bipolar transistor Q2 can quickly enter the saturation region in order to reduce the turn-on energy loss of the bipolar transistor Q2 and also to increase the turn-on speed of the bipolar transistor Q2. As an example, if the current from the emitter of the bipolar transistor Q1 is used as the drive current of the bipolar transistor Q2 when the bipolar transistor Q2 becomes turned off, the drive current of the bipolar transistor Q2 is too large, thus reducing the turn-off speed of the bipolar transistor Q2 and increasing the turn-off energy loss of the bipolar transistor Q2. In certain examples, in order to increase the turn-off speed of the bipolar transistor Q2 and decrease the turn-off energy loss of the bipolar transistor Q2, before the bipolar transistor Q2 becomes turned off, the current from the emitter of the bipolar transistor Q1 (e.g., the current 117, the current 217, the current 317, the current 417, the current 517, the current 617, the current 717, and/or the current 817) is reduced to zero and hence stopped from flowing, and the voltage at the base of the bipolar transistor Q2 (e.g., the base voltage 113, the base voltage 213, the base voltage 313, the base voltage 413, the base voltage 513, the base voltage 613, the base voltage 713, and/or the base voltage 813) becomes floating. For example, with the floating voltage (e.g., the base voltage 113, the base voltage 213, the base voltage 313, the base voltage 413, the base voltage 513, the base voltage 613, the base voltage 713, and/or the base voltage 813) at the base of the bipolar transistor Q2, during the process of the bipolar transistor Q2 changing from being turned on to being turned off, the minority charge carriers previously stored in the base of the bipolar transistor Q2 when the bipolar transistor Q2 is turned on can recombine rapidly in order to increase the turn-off speed of the bipolar transistor Q2 and decrease the turn-off energy loss of the bipolar transistor Q2, thus improving the system efficiency and the output power of the power converter (e.g., the power converter 100, the power converter 200, the power converter 300, the power converter 400, the power converter 500, the power converter 600, the power converter 700, and/or the power converter 800).

Referring to FIG. 1, FIG. 2, FIG. 3, FIG. 4, FIG. 5, FIG. 6, FIG. 7, FIG. 8, FIG. 9, and/or FIG. 10, a current source (e.g., the current source 150, the current source 250, the current source 350, the current source 450, the current source 550, the current source 650, the current source 750, and/or the current source 850) generates a current $I_{SB1}$ (e.g., the current 151, the current 251, the current 351, the current 451, the current 551, the current 651, the current 751, and/or the current 851) according to certain embodiments. For example, if the transistor D1 becomes turned on when the transistors D2 and D3 are turned off, the bipolar transistor Q1 becomes turned on, causing the bipolar transistor Q2 to also become turned on. As an example, the base of the bipolar transistor Q1 receives a drive current (e.g., the drive current 115, the drive current 215, the drive current 315, the drive current 415, the drive current 515, the drive current 615, the drive current 715, and/or the drive current 815), which is equal to the current $I_{SB1}$, and the emitter of the bipolar transistor Q1 outputs a current (e.g., the current 117, the current 217, the current 317, the current 417, the current 517, the current 617, the current 717, and/or the current 817). As an example, the current from the emitter of the bipolar transistor Q1 has the following relationship with the current Ism generated by the current source:

$$I_{EQ1}=\beta\times I_{SB1} \quad \text{(Equation 1)}$$

wherein $I_{EQ1}$ represents the current from the emitter of the bipolar transistor Q1, and Ism represents the current generated by the current source (e.g., the current source 150, the current source 250, the current source 350, the current source 450, the current source 550, the current source 650, the current source 750, and/or the current source 850). Additionally, β represents the amplification factor of the bipolar transistor Q1. For example, β is larger than 1. As an example, $I_{EQ1}$ is larger than Ism in magnitude.

In some examples, during the process of the bipolar transistor Q2 changing from being turned off to being turned on, the bipolar transistor Q2 uses the current from the emitter of the bipolar transistor Q1 as its drive current. For example, the current from the emitter of the bipolar transistor Q1, which is used as the drive current of the bipolar transistor Q2, is sufficiently large so that the bipolar transistor Q2 can quickly enter the saturation region in order to reduce the turn-on energy loss of the bipolar transistor Q2.

In certain examples, after the bipolar transistor Q2 becomes turned on, when the bipolar transistor Q2 remains turned on but before the absolute value of the voltage Vcs with respect to a controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) reaches the predetermined threshold A, the bipolar transistor Q2 also uses the current from the emitter of the bipolar transistor Q1 as its drive current. For example, a current (e.g., the current 131, the current 231, the current 331, the current 431, the current 531, the current 631, the current 731, and/or the current 831) that flows through a resistor $R_S$ (e.g., the resistor 130, the resistor 230, the resistor 330, the resistor 430, the resistor 530, the resistor 630, the resistor 730, and/or the resistor 830) has the following relationship with the current from the emitter of the bipolar transistor Q1 as the drive current of the bipolar transistor Q2:

$$I_{RS}=I_c+\beta\times I_{SB1} \quad \text{(Equation 2)}$$

wherein $I_{RS}$ represents the current (e.g., the current 131, the current 231, the current 331, the current 431, the current 531, the current 631, the current 731, and/or the current 831) that flows through the resistor $R_S$ (e.g., the resistor 130, the resistor 230, the resistor 330, the resistor 430, the resistor 530, the resistor 630, the resistor 730, and/or the resistor 830). Additionally, $I_c$ represents the current that is received by the collector of the bipolar transistor Q2, and $I_{SB1}$ represents the current generated by the current source (e.g., the current source 150, the current source 250, the current source 350, the current source 450, the current source 550, the current source 650, the current source 750, and/or the current source 850). Additionally, β represents the amplification factor of the bipolar transistor Q1. As an example, the predetermined threshold A is equal to a predetermined percentage (e.g., 90%) of a maximum voltage (e.g., $V_{csmax}$) that is allowed by the resistor $R_S$.

In some embodiments, after the absolute value of the voltage Vcs with respect to a controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) reaches the predetermined threshold A, when the bipolar transistor Q2 remains turned on, the current from the emitter of the bipolar transistor Q1 (e.g., the current 117, the current 217, the current 317, the current 417, the current 517, the current 617, the current 717, and/or the current 817) is equal to zero and hence is stopped from flowing, the voltage at the base of the bipolar transistor Q2 (e.g., the base voltage 113, the base voltage 213, the base voltage 313, the base voltage 413, the base voltage 513, the base voltage 613, the base voltage 713, and/or the base voltage 813) is floating, and the minority charge carriers in the base of the bipolar transistor Q2 are used to maintain the bipolar transistor Q2 being turned on. In some examples, after the transistors D1 and D3 and the bipolar transistor Q1 are turned off and the transistor D2 is turned on, if the absolute value of the voltage Vcs with respect to a controller ground voltage (e.g., the voltage 133 with respect to the voltage 135, the voltage 233 with respect to the voltage 235, the voltage 333 with respect to the voltage 335, the voltage 433 with respect to the voltage 435, the voltage 533 with respect to the voltage 535, the voltage 633 with respect to the voltage 635, the voltage 733 with respect to the voltage 735, and/or the voltage 833 with respect to the voltage 835) becomes equal to and/or larger than the predetermined threshold B, the transistor D3 becomes turned on, causing the bipolar transistor Q2 to become turned off. For example, the predetermined threshold B is equal to a maximum voltage (e.g., $V_{csmax}$) that is allowed by the resistor $R_S$. In certain examples, during the process of the bipolar transistor 120 changing from being turned on to being turned off, the minority charge carriers previously stored in the base of the bipolar transistor Q2 when the bipolar transistor 120 is turned on can recombine rapidly in order to reduce the turn-off time of the bipolar transistor Q2 and decrease the turn-off energy loss of the bipolar transistor Q2.

In certain embodiments, if the voltage VDD (e.g., the voltage 147, the voltage 247, the voltage 347, the voltage 447, the voltage 547, the voltage 647, the voltage 747, the voltage 847, and/or the voltage 947) is equal to or larger than a power supply threshold, the transistor Q3 (e.g., the transistor 190, the transistor 290, the transistor 390, the transistor 490, the transistor 590, the transistor 690, the transistor 790, and/or the transistor 890) is turned on, the transistor Q4 (e.g., the transistor 152, the transistor 252, the transistor 352, the transistor 452, the transistor 552, the transistor 652, the transistor 752, and/or the transistor 852) is turned off, and the capacitor CD (e.g., the capacitor 2198, the capacitor 2298, the capacitor 2398, the capacitor 2498, the capacitor 2598, the capacitor 2698, and the capacitor 2798, and/or the capacitor 2898) provides power (e.g., an operation current) to a controller chip (e.g., the controller chip 140, the controller chip 240, the controller chip 340, the controller chip 440, the controller chip 540, the controller chip 640, the controller chip 740, and/or the controller chip 840), but the capacitor CD does not receive a charging current as shown in FIG. 9.

In some embodiments, if the voltage VDD (e.g., the voltage 147, the voltage 247, the voltage 347, the voltage 447, the voltage 547, the voltage 647, the voltage 747, the voltage 847, and/or the voltage 947) is smaller than the power supply threshold, the transistor Q3 (e.g., the transistor 190, the transistor 290, the transistor 390, the transistor 490, the transistor 590, the transistor 690, the transistor 790, and/or the transistor 890) is turned off, the transistor Q4 (e.g., the transistor 152, the transistor 252, the transistor 352, the transistor 452, the transistor 552, the transistor 652, the transistor 752, and/or the transistor 852) is turned on, and the capacitor CD receive a charging current that flows from the transistor Q2 through the transistor Q4 as shown in FIG. 10. For example, the transistor Q2 (e.g., the bipolar transistor 120, the bipolar transistor 220, the bipolar transistor 320, the bipolar transistor 420, the bipolar transistor 520, the bipolar transistor 620, the bipolar transistor 720, and/or the bipolar transistor 820) provides, through the transistor Q4 (e.g., the transistor 152, the transistor 252, the transistor 352, the transistor 452, the transistor 552, the transistor 652, the transistor 752, and/or the transistor 852), not only the charging current but also an operation current to the controller chip (e.g., the controller chip 140, the controller chip 240, the controller chip 340, the controller chip 440, the controller chip 540, the controller chip 640, the controller chip 740, and/or the controller chip 840).

For example, if the voltage VDD (e.g., the voltage 147, the voltage 247, the voltage 347, the voltage 447, the voltage 547, the voltage 647, the voltage 747, the voltage 847, and/or the voltage 947) is smaller than the power supply threshold, the bipolar transistors Q1 and Q2 are turned on. As an example, if the voltage VDD (e.g., the voltage 147, the voltage 247, the voltage 347, the voltage 447, the voltage 547, the voltage 647, the voltage 747, the voltage 847, and/or the voltage 947) is smaller than the power supply threshold, the bipolar transistor Q1 is turned off but the bipolar transistor Q2 is turned on.

FIG. 11 is a simplified diagram showing certain components of a controller chip 3140 for the power converter 100 as shown in FIG. 1, the power converter 300 as shown in FIG. 3, the power converter 500 as shown in FIG. 5, and/or the power converter 700 as shown in FIG. 7 according to certain embodiments of the present invention. This diagram is merely an example, which should not unduly limit the scope of the claims. One of ordinary skill in the art would recognize many variations, alternatives, and modifications. The controller chip 3140 (e.g., a controller) includes terminals 3106, 3132, 3134, 3142, 3144, 3146, and 3148 (e.g., pins). Additionally, the controller chip 3140 (e.g., a controller) includes a current source 3150, transistors 3160, 3170, 3180 and 3190, and a switch control circuit 3136. Moreover, the controller chip 3140 (e.g., a controller) includes a power supply circuit 1104, a feedback control circuit 1106, a current sensing control circuit 1108, an oscillator circuit 1110, a logic control circuit 1112, a protection circuit 1114, a constant current control circuit 1150, and a constant voltage control circuit 1160. Although the above has been shown using a selected group of components for the controller chip, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

For example, the controller chip 3140 (e.g., a controller) is the controller chip 140, the terminal 3106 is the terminal 106, the terminal 3132 is the terminal 132, the terminal 3134 is the terminal 134, the terminal 3142 is the terminal 142, the terminal 3144 is the terminal 144, the terminal 3146 is the terminal 146, the terminal 3148 is the terminal 148, the current source 3150 is the current source 150, the transistor 3160 is the transistor 160, the transistor 3170 is the transistor 170, the transistor 3180 is the transistor 180, the transistor 3190 is the transistor 190, and the switch control circuit 3136 is the switch control circuit 136. As an example, the controller chip 3140 (e.g., a controller) is the controller chip 340, the terminal 3106 is the terminal 306, the terminal 3132 is the terminal 332, the terminal 3134 is the terminal 334, the terminal 3142 is the terminal 342, the terminal 3144 is the terminal 344, the terminal 3146 is the terminal 346, the terminal 3148 is the terminal 348, the current source 3150 is the current source 350, the transistor 3160 is the transistor 360, the transistor 3170 is the transistor 370, the transistor 3180 is the transistor 380, the transistor 3190 is the transistor 390, and the switch control circuit 3136 is the switch control circuit 336.

For example, the controller chip 3140 (e.g., a controller) is the controller chip 540, the terminal 3106 is the terminal 506, the terminal 3132 is the terminal 532, the terminal 3134 is the terminal 534, the terminal 3142 is the terminal 542, the terminal 3144 is the terminal 544, the terminal 3146 is the terminal 546, the terminal 3148 is the terminal 548, the current source 3150 is the current source 550, the transistor 3160 is the transistor 560, the transistor 3170 is the transistor 570, the transistor 3180 is the transistor 580, the transistor 3190 is the transistor 590, and the switch control circuit 3136 is the switch control circuit 536. As an example, the controller chip 3140 (e.g., a controller) is the controller chip 740, the terminal 3106 is the terminal 706, the terminal 3132 is the terminal 732, the terminal 3134 is the terminal 734, the terminal 3142 is the terminal 742, the terminal 3144 is the terminal 744, the terminal 3146 is the terminal 746, the terminal 3148 is the terminal 748, the current source 3150 is the current source 750, the transistor 3160 is the transistor 760, the transistor 3170 is the transistor 770, the transistor 3180 is the transistor 780, the transistor 3190 is the transistor 790, and the switch control circuit 3136 is the switch control circuit 736.

In some embodiments, the power supply circuit 1104 includes an undervoltage-lockout (UVLO) component 1120, an overvoltage protection (OVP) component 1122, and a reference voltage and/or reference current generator 1124. In certain examples, the power supply circuit 1104 receives a voltage from the terminal 3146. For example, if the voltage received from the terminal 3146 exceeds a threshold voltage of the undervoltage-lockout (UVLO) component 1120, one or more internal circuits of the controller chip 3140 starts normal operation. As an example, if the voltage received from the terminal 3146 exceeds a threshold voltage of the overvoltage protection (OVP) component 1122, one or more internal circuits of the controller chip 3140 starts automatic recovery protection to avoid damage to the controller chip 3140. In some examples, the reference voltage and/or reference current generator 1124 provides to one or more internal circuits of the controller chip 3140 an operation voltage, a reference voltage, and/or a reference current.

In certain embodiments, the feedback control circuit 1106 includes an output overvoltage and undervoltage protection component 1170, a voltage drop compensation component 1172, a voltage sampling component 1174, an error amplifier 1178, and resistors 1180 and 1182. In some examples, the voltage sampling component 1174 receives a voltage from the terminal 3148, wherein the voltage is related to a primary winding and representative of an output voltage related to a secondary winding coupled to the primary winding. For example, the voltage sampling component 1174 generates an output voltage sampling signal 1175. As an example, the output voltage sampling signal 1175 is received by a combination of the error amplifier 1178 and the resistors 1180 and 1182. In certain examples, the combination of the error amplifier 1178 and the resistors 1180 and 1182 receives the output voltage sampling signal 1175 and a reference voltage 1181 and generates an error amplification signal 1179 based at least in part upon the output voltage sampling signal 1175 and the reference voltage 1181. For example, the error amplification signal 1179 is received by the constant voltage control circuit 1160. As an example, the error amplification signal 1179 is received by the voltage drop compensation component 1172.

In some embodiments, the voltage drop compensation component 1172 generates a voltage drop compensation signal 1173 based at least in part upon the error amplification signal 1179 as part of positive feedback loop. For example, the output overvoltage and undervoltage protection component 1170 generates one or more protection signals 1131 based at least in part on the voltage from the terminal 3148. In certain examples, the constant voltage control circuit 1160 receives the error amplification signal 1179 and a voltage from the terminal 3132 and generates a control signal 1135, which is used to regulate the output voltage of the power converter with respect to a constant value. In some examples, the constant current control circuit 1150 receives the voltage from the terminal 3148 and generates a control signal 1133, which is used to regulate the output current of the power converter with respect to a constant value.

In some embodiments, the current sensing control circuit 1108 includes a leading edge blanking (LEB) component 1140 and an overcurrent protection (OCP) component 1142 (e.g., a comparator). In certain examples, the leading edge blanking (LEB) component 1140 receives a voltage from the terminal 3132 and generates a voltage 1141. For example, the voltage 1141 is received by the overcurrent protection (OCP) component 1142. As an example, the overcurrent protection (OCP) component 1142 generates a signal 1145 (e.g., a comparison signal).

In certain embodiments, the oscillator circuit 1110 generates a signal 1111. For example, the signal 1111 is a sawtooth signal with a constant frequency (e.g., a predetermined high frequency). In some embodiments, the protection circuit 1114 generates a signal 1115 if one or more abnormal signals are detected. For example, the signal 1115 is used to make the controller chip 3140 enter the state of automatic recovery protection to avoid damage to the controller chip 3140.

According to some embodiments, the logic control circuit 1112 receives the one or more protection signals 1131, the control signal 1133, the control signal 1135, the signal 1145, the signal 1111, and/or the signal 1115. For example, the logic control circuit 1112 generates a signal 1113. As an example, the signal 1113 is a square-wave signal with adjustable duty cycle. According to certain embodiments, the switch control circuit 3136 receives the signal 1113 and generates a drive voltage for the transistor 3160, a drive voltage for the transistor 3170, a drive voltage for the transistor 3180, a drive voltage for the transistor 3190, and a drive voltage for the transistor 3152.

FIG. 12 is a simplified diagram showing certain components of a controller chip 3240 for the power converter 200 as shown in FIG. 2, the power converter 400 as shown in FIG. 4, the power converter 600 as shown in FIG. 6, and/or the power converter 800 as shown in FIG. 8 according to certain embodiments of the present invention. This diagram is merely an example, which should not unduly limit the scope of the claims. One of ordinary skill in the art would recognize many variations, alternatives, and modifications. The controller chip 3240 (e.g., a controller) includes terminals 3206, 3232, 3234, 3242, 3244, 3246, and 3248 (e.g., pins). Additionally, the controller chip 3240 (e.g., a controller) includes a current source 3250, transistors 3260, 3270, 3280 and 3290, and a switch control circuit 3236. Moreover, the controller chip 3240 (e.g., a controller) includes a power supply circuit 1204, a feedback control circuit 1206, a current sensing control circuit 1208, an oscillator circuit 1210, a logic control circuit 1212, a protection circuit 1214, a constant current control circuit 1250, and a constant voltage control circuit 1260. Although the above has been shown using a selected group of components for the controller chip, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

For example, the controller chip 3240 (e.g., a controller) is the controller chip 240, the terminal 3206 is the terminal 206, the terminal 3232 is the terminal 232, the terminal 3234 is the terminal 234, the terminal 3242 is the terminal 242, the terminal 3244 is the terminal 244, the terminal 3246 is the terminal 246, the terminal 3248 is the terminal 248, the current source 3250 is the current source 250, the transistor 3260 is the transistor 260, the transistor 3270 is the transistor 270, the transistor 3280 is the transistor 280, the transistor 3290 is the transistor 290, and the switch control circuit 3236 is the switch control circuit 236. As an example, the controller chip 3240 (e.g., a controller) is the controller chip 440, the terminal 3206 is the terminal 406, the terminal 3232 is the terminal 432, the terminal 3234 is the terminal 434, the terminal 3242 is the terminal 442, the terminal 3244 is the terminal 444, the terminal 3246 is the terminal 446, the terminal 3248 is the terminal 448, the current source 3250 is the current source 450, the transistor 3260 is the transistor 460, the transistor 3270 is the transistor 470, the transistor 3280 is the transistor 480, the transistor 3290 is the transistor 490, and the switch control circuit 3236 is the switch control circuit 436.

For example, the controller chip 3240 (e.g., a controller) is the controller chip 640, the terminal 3206 is the terminal 606, the terminal 3232 is the terminal 632, the terminal 3234 is the terminal 634, the terminal 3242 is the terminal 642, the terminal 3244 is the terminal 644, the terminal 3246 is the terminal 646, the terminal 3248 is the terminal 648, the current source 3250 is the current source 650, the transistor 3260 is the transistor 660, the transistor 3270 is the transistor 670, the transistor 3280 is the transistor 680, the transistor 3290 is the transistor 690, and the switch control circuit 3236 is the switch control circuit 636. As an example, the controller chip 3240 (e.g., a controller) is the controller chip 840, the terminal 3206 is the terminal 806, the terminal 3232 is the terminal 832, the terminal 3234 is the terminal 834, the terminal 3242 is the terminal 842, the terminal 3244 is the terminal 844, the terminal 3246 is the terminal 846, the terminal 3248 is the terminal 848, the current source 3250 is the current source 850, the transistor 3260 is the transistor 860, the transistor 3270 is the transistor 870, the transistor 3280 is the transistor 880, the transistor 3290 is the transistor 890, and the switch control circuit 3236 is the switch control circuit 836.

In some embodiments, the power supply circuit 1204 includes an undervoltage-lockout (UVLO) component 1220, an overvoltage protection (OVP) component 1222, and a reference voltage and/or reference current generator 1224. In certain examples, the power supply circuit 1204 receives a voltage from the terminal 3246. For example, if the voltage received from the terminal 3246 exceeds a threshold voltage of the undervoltage-lockout (UVLO) component 1220, one or more internal circuits of the controller chip 3240 starts normal operation. As an example, if the voltage received from the terminal 3246 exceeds a threshold voltage of the overvoltage protection (OVP) component 1222, one or more internal circuits of the controller chip 3240 starts automatic recovery protection to avoid damage to the controller chip 3240. In some examples, the reference voltage and/or reference current generator 1224 provides to one or more internal circuits of the controller chip 3240 an operation voltage, a reference voltage, and/or a reference current.

In certain embodiments, the feedback control circuit 1206 includes an output overvoltage and undervoltage protection component 1270, a voltage drop compensation component 1272, a voltage sampling component 1274, an error amplifier 1278, and resistors 1280 and 1282. In some examples, the voltage sampling component 1274 receives a voltage from the terminal 3248, wherein the voltage is related to a primary winding and representative of an output voltage related to a secondary winding coupled to the primary winding. For example, the voltage sampling component 1274 generates an output voltage sampling signal 1275. As an example, the output voltage sampling signal 1275 is received by a combination of the error amplifier 1278 and the resistors 1280 and 1282. In certain examples, the combination of the error amplifier 1278 and the resistors 1280 and 1282 receives the output voltage sampling signal 1275 and a reference voltage 1281 and generates an error amplification signal 1279 based at least in part upon the output voltage sampling signal 1275 and the reference voltage 1281. For example, the error amplification signal 1279 is received by the constant voltage control circuit 1260. As an example, the error amplification signal 1279 is received by the voltage drop compensation component 1272.

In some embodiments, the voltage drop compensation component 1272 generates a voltage drop compensation signal 1273 based at least in part upon the error amplification signal 1279 as part of positive feedback loop. For example, the output overvoltage and undervoltage protection component 1270 generates one or more protection signals 1231 based at least in part on the voltage from the terminal 3248. In certain examples, the constant voltage control circuit 1260 receives the error amplification signal 1279 and a voltage from the terminal 3232 and generates a control signal 1235, which is used to regulate the output voltage of the power converter with respect to a constant value. In some examples, the constant current control circuit 1250 receives the voltage from the terminal 3248 and generates a control signal 1233, which is used to regulate the output current of the power converter with respect to a constant value.

In some embodiments, the current sensing control circuit 1108 includes a leading edge blanking (LEB) component 1240 and an overcurrent protection (OCP) component 1242 (e.g., a comparator). In certain examples, the leading edge blanking (LEB) component 1240 receives a voltage from the terminal 3232 and generates a voltage 1241. For example, the voltage 1241 is received by the overcurrent protection (OCP) component 1242. As an example, the overcurrent protection (OCP) component 1242 generates a signal 1245 (e.g., a comparison signal).

In certain embodiments, the oscillator circuit 1210 generates a signal 1211. For example, the signal 1211 is a sawtooth signal with a constant frequency (e.g., a predetermined high frequency). In some embodiments, the protection circuit 1214 generates a signal 1215 if one or more abnormal signals are detected. For example, the signal 1215 is used to make the controller chip 3240 enter the state of automatic recovery protection to avoid damage to the controller chip 3240.

According to some embodiments, the logic control circuit 1212 receives the one or more protection signals 1231, the control signal 1233, the control signal 1235, the signal 1245, the signal 1211, and/or the signal 1215. For example, the logic control circuit 1212 generates a signal 1213. As an example, the signal 1213 is a square-wave signal with adjustable duty cycle. According to certain embodiments, the switch control circuit 3236 receives the signal 1213 and generates a drive voltage for the transistor 3260, a drive voltage for the transistor 3270, a drive voltage for the transistor 3280, a drive voltage for the transistor 3290, and a drive voltage for the transistor 3252.

As discussed above and further emphasized here, FIG. 1, FIG. 2, FIG. 3, FIG. 4, FIG. 5, FIG. 6, FIG. 7, FIG. 8, FIG. 11, and FIG. 12 are merely examples, which should not unduly limit the scope of the claims. One of ordinary skill in the art would recognize many variations, alternatives, and modifications. For example, the current source (e.g., the current source 150, the current source 250, the current source 350, the current source 450, the current source 550, the current source 650, the current source 750, and/or the current source 850) that generates the current Ism (e.g., the current 151, the current 251, the current 351, the current 451, the current 551, the current 651, the current 751, and/or the current 851) and the transistor D1 (e.g., the transistor 160, the transistor 260, the transistor 360, the transistor 460, the transistor 560, the transistor 660, the transistor 760, and/or the transistor 860) are replaced by a current source 1350, a transistor 1364, a transistor 1390, a transistor 1392, and a diode 1394 as shown in FIG. 13.

FIG. 13 is a simplified diagram showing certain components of the power converter 100 as shown in FIG. 1, the power converter 200 as shown in FIG. 2, the power converter 300 as shown in FIG. 3, the power converter 400 as shown in FIG. 4, the power converter 500 as shown in FIG.

5, the power converter 600 as shown in FIG. 6, the power converter 700 as shown in FIG. 7, and/or the power converter 800 as shown in FIG. 8 according to certain embodiments of the present invention. This diagram is merely an example, which should not unduly limit the scope of the claims. One of ordinary skill in the art would recognize many variations, alternatives, and modifications.

In certain embodiments, when the transistor 1364 is turned on, a current 1351 that is generated by the current source 1350 is mirrored to generate a current 1393, which flows through the diode 1394 to serve as a drive current 1395. For example, the current 1351 is equal to the current 1393 divided by N, which is a positive integer larger than 1. As an example, the size of the transistor 1364 is significantly smaller than the transistor D1 (e.g., the transistor 160, the transistor 260, the transistor 360, the transistor 460, the transistor 560, the transistor 660, the transistor 760, and/or the transistor 860). In certain examples, the drive current 1395, equal to the current 1393, flows to a terminal 1314 (e.g., the base 114, the base 214, the base 314, the base 414, the base 514, the base 614, the base 714, and/or the base 814). In some examples, the diode 1394 prevents any current from flowing from the terminal 1314 to the transistor 1392. In some embodiments, when the transistor 1364 is turned off, the current 1351 of the current source 1350 is not mirrored and the drive current 1395 is equal to zero.

FIG. 14 is a simplified diagram showing a chip package for the bipolar transistor Q1 (e.g., the bipolar transistor 110, the bipolar transistor 210, the bipolar transistor 310, the bipolar transistor 410, the bipolar transistor 510, the bipolar transistor 610, the bipolar transistor 710, and/or the bipolar transistor 810) and the bipolar transistor Q2 (e.g., the bipolar transistor 120, the bipolar transistor 220, the bipolar transistor 320, the bipolar transistor 420, the bipolar transistor 520, the bipolar transistor 620, the bipolar transistor 720, and/or the bipolar transistor 820) as parts of a power converter as shown in FIG. 1, FIG. 2, FIG. 3, FIG. 4, FIG. 5, FIG. 6, FIG. 7 and/or FIG. 8 according to certain embodiments of the present invention. This diagram is merely an example, which should not unduly limit the scope of the claims. One of ordinary skill in the art would recognize many variations, alternatives, and modifications. The chip package 1400 includes terminals (e.g., pins) 1410, 1420, 1430, 1440, 1450, 1460, 1470, and 1480.

In some embodiments, the bipolar transistors Q1 and Q2 are included in the chip package 1400. For example, the chip package 1400 is a single-base chip package. As an example, in the chip package 1400, the collector of the bipolar transistor Q1 and the collector of the bipolar transistor Q2 are connected to each other. In certain examples, pin 1410 is connected to the base of the bipolar transistor Q1 and used to receive the drive current for the bipolar transistor Q1. In some examples, pin 1420 is connected to the emitter of the bipolar transistor Q1 and the base of the bipolar transistor Q2. In certain examples, pins 1430 and 1440 both are connected to the emitter of the bipolar transistor Q2. For example, in order to increase the heat dissipation area and reduce the temperature, a chip package (e.g., the chip package 1400) with multiple wire-bonding connections and/or multiple pins is used. As an example, two pins are connected through two wire-bonding connections respectively, and each wire-bonding connection includes multiple wires, the number of which is determined according to the area of the emitter of the bipolar transistor Q2. In some examples, pins 1450, 1460, 1470 and 1480 are connected to the collector of the bipolar transistor Q1 and the collector of the bipolar transistor Q2. As an example, for heat dissipation and also layout convenience of a printed circuit board, a multi-pin chip package (e.g., the chip package 1400) is used. For example, the collector area of the bipolar transistors Q1 and Q2 is located at the back of the bipolar transistors Q1 and Q2, so the bipolar transistors Q1 and Q2 are connected to each other using conductive adhesive without wire bonding to reduce impedance.

FIG. 15 is a simplified diagram showing a chip package for the bipolar transistor Q1 (e.g., the bipolar transistor 110, the bipolar transistor 210, the bipolar transistor 310, the bipolar transistor 410, the bipolar transistor 510, the bipolar transistor 610, the bipolar transistor 710, and/or the bipolar transistor 810), the bipolar transistor Q2 (e.g., the bipolar transistor 120, the bipolar transistor 220, the bipolar transistor 320, the bipolar transistor 420, the bipolar transistor 520, the bipolar transistor 620, the bipolar transistor 720, and/or the bipolar transistor 820), and a controller chip (e.g., the controller chip 140, the controller chip 240, the controller chip 340, the controller chip 440, the controller chip 540, the controller chip 640, the controller chip 740, and/or the controller chip 840) as parts of a power converter as shown in FIG. 1, FIG. 2, FIG. 3, FIG. 4, FIG. 5, FIG. 6, FIG. 7 and/or FIG. 8 according to certain embodiments of the present invention. This diagram is merely an example, which should not unduly limit the scope of the claims. One of ordinary skill in the art would recognize many variations, alternatives, and modifications. The chip package 1500 includes terminals (e.g., pins) 1510, 1520, 1530, 1540, 1550, 1560, 1570, and 1580.

In some embodiments, the bipolar transistor Q1 and the bipolar transistor Q2 are packaged at the same level, and the controller chip is packaged on top of the bipolar transistor Q2. For example, this package arrangement for the bipolar transistors Q1 and Q2 and the controller chip can be adjusted. In certain examples, pins 1510, 1520 and 1530 are used connected to the controller chip. In some examples, pin 1540 is connected to the emitter of the bipolar transistor Q2. As an example, in order to increase the heat dissipation area and reduce the temperature, a chip package (e.g., the chip package 1500) with multiple wire-bonding connections is used to reduce the impedance of wire bonding. In certain examples, pins 1550, 1560, 1570 and 1580 are connected to the collector of the bipolar transistor Q1 and the collector of the bipolar transistor Q2. As an example, for heat dissipation and also layout convenience of a printed circuit board, a multi-pin package (e.g., the chip package 1500) is used. For example, the collector area of the bipolar transistors Q1 and Q2 is located at the back of the bipolar transistors Q1 and Q2, so the bipolar transistors Q1 and Q2 are connected to each other using conductive adhesive without wire bonding to reduce impedance. In some examples, the chip package 1500 can add extra pins without increasing the system pin costs and can also provide a simple circuit with few peripheral devices.

Some embodiments of the present invention provide a power converter that uses three transistors to drive one or more bipolar transistors. For example, the power converter can reduce the switching loss of one or more bipolar transistors and/or increase the turn-on speed and/or the turn-off speed of one or more bipolar transistors. As an example, the power converter can achieve efficient and/or fast switching.

According to certain embodiments, a controller for a power converter, the controller comprising: a first controller terminal connected to a first base of a first bipolar transistor, the first bipolar transistor further including a first collector and a first emitter; a second controller terminal connected to the first emitter of the first bipolar transistor and a second base of a second bipolar transistor, the second bipolar transistor further including a second collector and a second emitter, the second collector being connected to the first collector; a third controller terminal connected to a first resistor terminal of a resistor, the resistor further including a second resistor terminal; a fourth controller terminal connected to the second resistor terminal and also connected through a first transistor to the second emitter of the second bipolar transistor, the resistor being configured to generate a sensing voltage received by the third controller terminal with respect to a controller ground voltage at the fourth controller terminal; wherein: if an absolute value of the sensing voltage with respect to the controller ground voltage is smaller than a predetermined threshold, the first controller terminal is configured to output a first current to the first base to generate a second current at the first emitter, the second current flowing from the first emitter to the second base to turn on the second bipolar transistor; and if the absolute value of the sensing voltage with respect to the controller ground voltage reaches the predetermined threshold, the first controller terminal is configured to stop the second current from flowing from the first emitter to the second base and the second controller terminal is configured to make a base voltage at the second base of the second bipolar transistor floating before the second bipolar transistor becomes turned off. For example, the controller is implemented according to at least FIG. 1, FIG. 2, FIG. 3, FIG. 4, FIG. 5, FIG. 6, FIG. 7, FIG. 8, FIG. 9, and/or FIG. 10.

As an example, the first current is smaller than the second current in magnitude. For example, if the absolute value of the sensing voltage with respect to the controller ground voltage reaches the predetermined threshold, the first controller terminal is configured to reduce the first current to zero to turn off the first bipolar transistor and also reduce the second current to zero.

According to some embodiments, a controller for a power converter includes: a current source configured to generate a first current; a first transistor including a first transistor terminal, a second transistor terminal, and a third transistor terminal, the first transistor terminal being connected to the current source; a second transistor including a fourth transistor terminal, a fifth transistor terminal, and a sixth transistor terminal, the fourth transistor terminal being connected to the third transistor terminal; a third transistor including a seventh transistor terminal, an eighth transistor terminal, and a ninth transistor terminal, the seventh transistor terminal being connected to the sixth transistor terminal; and a drive voltage generator configured to: output a first drive voltage to the second transistor terminal of the first transistor; output a second drive voltage to the fifth transistor terminal of the second transistor; and output a third drive voltage to the eighth transistor terminal of the third transistor. For example, the controller is implemented according to at least FIG. 1, FIG. 2, FIG. 3, FIG. 4, FIG. 5, FIG. 6, FIG. 7, FIG. 8, FIG. 9, and/or FIG. 10.

As an example, the sixth transistor terminal of the second transistor is connected to the seventh transistor terminal of the third transistor. For example, the sixth transistor terminal of the second transistor is biased to a controller ground voltage. As an example, the drive voltage generator is further configured to, output the first drive voltage to turn on the first transistor; output the second drive voltage to turn off the second transistor; and output the third drive voltage to turn off the third transistor. For example, the drive voltage generator is further configured to, output the first drive voltage to turn off the first transistor; output the second drive voltage to turn on the second transistor; and output the third drive voltage to turn off the third transistor. As an example, the drive voltage generator is further configured to, output the first drive voltage to turn off the first transistor; output the second drive voltage to turn on the second transistor; and output the third drive voltage to turn on the third transistor.

For example, the third transistor terminal and the fourth transistor terminal are both connected to a first base of a first bipolar transistor, the first bipolar transistor further including a first collector and a first emitter. As an example, the sixth transistor terminal and the seventh transistor terminal are both connected to the first emitter of the first bipolar transistor and a second base of a second bipolar transistor, the second bipolar transistor further including a second collector and a second emitter, the second collector being connected to the first collector, the second emitter being connected, through a transistor, to a resistor configured to generate a sensing voltage received by the controller with respect to a controller ground voltage. For example, the drive voltage generator is further configured to, if an absolute value of the sensing voltage with respect to the controller ground voltage is smaller than a first predetermined threshold: output the first drive voltage to turn on the first transistor; output the second drive voltage to turn off the second transistor; and output the third drive voltage to turn off the third transistor. As an example, the drive voltage generator is further configured to, if the absolute value of the sensing voltage with respect to the controller ground voltage reaches the first predetermined threshold: output the first drive voltage to turn off the first transistor; output the second drive voltage to turn on the second transistor; and output the third drive voltage to turn off the third transistor. For example, the drive voltage generator is further configured to, if the absolute value of the sensing voltage with respect to the controller ground voltage reaches a second predetermined threshold: output the first drive voltage to turn off the first transistor; output the second drive voltage to turn on the second transistor; and output the third drive voltage to turn on the third transistor; wherein the second predetermined threshold is larger than the first predetermined threshold. As an example, each transistor of the first transistor, the second transistor, and the third transistor is a MOSFET.

According to certain embodiments, a method for a power converter, the method comprising: receiving a sensing voltage from a resistor with respect to a controller ground voltage; if an absolute value of the sensing voltage with respect to the controller ground voltage is smaller than a predetermined threshold, outputting a first current to a first base of a first bipolar transistor to generate a second current at a first emitter of the first bipolar transistor, the first emitter of the first bipolar transistor being connected to a second base of a second bipolar transistor, the second current flowing to the second base to turn on the second bipolar transistor, the first bipolar transistor further including a first collector, the second bipolar transistor further including a second collector and a second emitter, the second collector being connected to the first collector, the second emitter being connected to the resistor through a transistor; and if the absolute value of the sensing voltage with respect to the controller ground voltage reaches the predetermined threshold, stopping the second current from flowing from the first emitter to the second base and making a base voltage at the second base of the second bipolar transistor floating before the second bipolar transistor becomes turned off. For example, the method is implemented according to at least FIG. 1, FIG. 2, FIG. 3, FIG. 4, FIG. 5, FIG. 6, FIG. 7, FIG. 8, FIG. 9, and/or FIG. 10. As an example, the stopping the second current from flowing from the first emitter to the second base includes: reducing the first current to zero to turn off the first bipolar transistor; and reducing the second current to zero.

According to some embodiments, a method for a power converter includes: outputting a first drive voltage to a first transistor including a first transistor terminal, a second transistor terminal, and a third transistor terminal, the first transistor terminal being connected to a current source configured to generate a first current, the second transistor terminal being configured to receive the first drive voltage; outputting a second drive voltage to a second transistor, the second transistor including a fourth transistor terminal, a fifth transistor terminal, and a sixth transistor terminal, the fourth transistor terminal being connected to the third transistor terminal, the fifth transistor terminal configured to receive the second drive voltage; and outputting a third drive voltage to a third transistor, the third transistor including a seventh transistor terminal, an eighth transistor terminal, and a ninth transistor terminal, the seventh transistor terminal being connected to the sixth transistor terminal, the eighth transistor terminal being configured to receive the third drive voltage. For example, the method is implemented according to at least FIG. 1, FIG. 2, FIG. 3, FIG. 4, FIG. 5, FIG. 6, FIG. 7, FIG. 8, FIG. 9, and/or FIG. 10.

As an example, the method further includes: receiving a sensing voltage with respect to a controller ground voltage from a resistor connected, through a transistor, to a second emitter of a second bipolar transistor, the second bipolar transistor further including a second base and a second collector, the second collector being connected to a first collector of a first bipolar transistor, the first bipolar transistor further including a first base and a first emitter, the first emitter being connected to the second base. For example, the method further includes, if an absolute value of the sensing voltage with respect to the controller ground voltage is smaller than a first predetermined threshold: outputting the first drive voltage to turn on the first transistor; outputting the second drive voltage to turn off the second transistor; and outputting the third drive voltage to turn off the third transistor. As an example, the method further includes, if the absolute value of the sensing voltage with respect to the controller ground voltage reaches the first predetermined threshold: outputting the first drive voltage to turn off the first transistor; outputting the second drive voltage to turn on the second transistor; and outputting the third drive voltage to turn off the third transistor. For example, the method further includes, if the absolute value of the sensing voltage with respect to the controller ground voltage reaches a second predetermined threshold: outputting the first drive voltage to turn off the first transistor; outputting the second drive voltage to turn on the second transistor; and outputting the third drive voltage to turn on the third transistor; wherein the second predetermined threshold is larger than the first predetermined threshold.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller for a power converter, the controller comprising:

a first controller terminal connected to a first base of a first bipolar transistor, the first bipolar transistor further including a first collector and a first emitter;

a second controller terminal connected to the first emitter of the first bipolar transistor and a second base of a second bipolar transistor, the second bipolar transistor further including a second collector and a second emitter, the second collector being connected to the first collector;

a third controller terminal connected to a first resistor terminal of a resistor, the resistor further including a second resistor terminal; and a fourth controller terminal connected to the second resistor terminal and also connected through a first transistor to the second emitter of the second bipolar transistor, the resistor being configured to generate a sensing voltage received by the third controller terminal with respect to a controller ground voltage at the fourth controller terminal;

wherein:

if an absolute value of the sensing voltage with respect to the controller ground voltage is smaller than a predetermined threshold, the first controller terminal is configured to output a first current to the first base to generate a second current at the first emitter, the second current flowing from the first emitter to the second base to turn on the second bipolar transistor; and if the absolute value of the sensing voltage with respect to the controller ground voltage reaches the predetermined threshold, the first controller terminal is configured to stop the second current from flowing from the first emitter to the second base and the second controller terminal is configured to make a base voltage at the second base of the second bipolar transistor floating before the second bipolar transistor becomes turned off.

2. The controller of claim 1 wherein:

the first current is smaller than the second current in magnitude.

3. The controller of claim 1 wherein, if the absolute value of the sensing voltage with respect to the controller ground voltage reaches the predetermined threshold, the first controller terminal is configured to reduce the first current to zero to turn off the first bipolar transistor and also reduce the second current to zero.

4. A controller for a power converter, the controller comprising:

a current source configured to generate a first current;

a first transistor including a first transistor terminal, a second transistor terminal, and a third transistor terminal, the first transistor terminal being connected to the current source;

a second transistor including a fourth transistor terminal, a fifth transistor terminal, and a sixth transistor terminal, the fourth transistor terminal being connected to the third transistor terminal;

a third transistor including a seventh transistor terminal, an eighth transistor terminal, and a ninth transistor terminal, the seventh transistor terminal being connected to the sixth transistor terminal; and a drive voltage generator configured to:

output a first drive voltage to the second transistor terminal of the first transistor;

output a second drive voltage to the fifth transistor terminal of the second transistor; and output a third drive voltage to the eighth transistor terminal of the third transistor;

wherein the drive voltage generator is further configured to, at a first same time, output the first drive voltage to turn off the first transistor;

output the second drive voltage to turn on the second transistor; and output the third drive voltage to turn off the third transistor.

5. The controller of claim 4 wherein the sixth transistor terminal of the second transistor is connected to the seventh transistor terminal of the third transistor.

6. The controller of claim 4 wherein the sixth transistor terminal of the second transistor is biased to a controller ground voltage.

7. The controller of claim 4 wherein the drive voltage generator is further configured to, at a second same time, output the first drive voltage to turn on the first transistor;

output the second drive voltage to turn off the second transistor; and output the third drive voltage to turn off the third transistor.

8. The controller of claim 4 wherein the drive voltage generator is further configured to, at a second same time, output the first drive voltage to turn off the first transistor;

output the second drive voltage to turn on the second transistor; and output the third drive voltage to turn on the third transistor.

9. The controller of claim 4 wherein the third transistor terminal and the fourth transistor terminal are both connected to a first base of a first bipolar transistor, the first bipolar transistor further including a first collector and a first emitter.

10. The controller of claim 9 wherein the sixth transistor terminal and the seventh transistor terminal are both connected to the first emitter of the first bipolar transistor and a second base of a second bipolar transistor, the second bipolar transistor further including a second collector and a second emitter, the second collector being connected to the first collector, the second emitter being connected, through a transistor, to a resistor configured to generate a sensing voltage received by the controller with respect to a controller ground voltage.

11. The controller of claim 10 wherein the drive voltage generator is further configured to, if an absolute value of the sensing voltage with respect to the controller ground voltage is smaller than a first predetermined threshold:

output the first drive voltage to turn on the first transistor;

output the second drive voltage to turn off the second transistor; and output the third drive voltage to turn off the third transistor.

12. The controller of claim 11 wherein the drive voltage generator is further configured to, if the absolute value of the sensing voltage with respect to the controller ground voltage reaches the first predetermined threshold:

output the first drive voltage to turn off the first transistor;

output the second drive voltage to turn on the second transistor; and output the third drive voltage to turn off the third transistor.

13. The controller of claim 12 wherein the drive voltage generator is further configured to, if the absolute value of the sensing voltage with respect to the controller ground voltage reaches a second predetermined threshold:

output the first drive voltage to turn off the first transistor;

output the second drive voltage to turn on the second transistor; and output the third drive voltage to turn on the third transistor;

wherein the second predetermined threshold is larger than the first predetermined threshold.

14. The controller of claim 4 wherein each transistor of the first transistor, the second transistor, and the third transistor is a MOSFET.

15. A method for a power converter, the method comprising:

receiving a sensing voltage from a resistor with respect to a controller ground voltage;

if an absolute value of the sensing voltage with respect to the controller ground voltage is smaller than a predetermined threshold, outputting a first current to a first base of a first bipolar transistor to generate a second current at a first emitter of the first bipolar transistor, the first emitter of the first bipolar transistor being connected to a second base of a second bipolar transistor, the second current flowing to the second base to turn on the second bipolar transistor, the first bipolar transistor further including a first collector, the second bipolar transistor further including a second collector and a second emitter, the second collector being connected to the first collector, the second emitter being connected to the resistor through a transistor; and if the absolute value of the sensing voltage with respect to the controller ground voltage reaches the predetermined threshold, stopping the second current from flowing from the first emitter to the second base and making a base voltage at the second base of the second bipolar transistor floating before the second bipolar transistor becomes turned off.

16. The method of claim 15 wherein the stopping the second current from flowing from the first emitter to the second base includes:

reducing the first current to zero to turn off the first bipolar transistor; and reducing the second current to zero.

17. A method for a power converter, the method comprising:

outputting a first drive voltage to a first transistor including a first transistor terminal, a second transistor terminal, and a third transistor terminal, the first transistor terminal being connected to a current source configured to generate a first current, the second transistor terminal being configured to receive the first drive voltage;

outputting a second drive voltage to a second transistor, the second transistor including a fourth transistor terminal, a fifth transistor terminal, and a sixth transistor terminal, the fourth transistor terminal being connected to the third transistor terminal, the fifth transistor terminal configured to receive the second drive voltage;

outputting a third drive voltage to a third transistor, the third transistor including a seventh transistor terminal, an eighth transistor terminal, and a ninth transistor terminal, the seventh transistor terminal being connected to the sixth transistor terminal, the eighth transistor terminal being configured to receive the third drive voltage; and receiving a sensing voltage with respect to a controller ground voltage from a resistor connected directly to a transistor and also connected, through the transistor, to a second emitter of a second bipolar transistor, the second bipolar transistor further including a second base and a second collector, the second collector being connected to a first collector of a first bipolar transistor, the first bipolar transistor further including a first base and a first emitter, the first emitter being connected to the second base.

18. The method of claim 17, and further comprising, if an absolute value of the sensing voltage with respect to the controller ground voltage is smaller than a first predetermined threshold:

outputting the first drive voltage to turn on the first transistor;

outputting the second drive voltage to turn off the second transistor; and outputting the third drive voltage to turn off the third transistor.

19. The method of claim 18, and further comprising, if the absolute value of the sensing voltage with respect to the controller ground voltage reaches the first predetermined threshold:

outputting the first drive voltage to turn off the first transistor;

outputting the second drive voltage to turn on the second transistor; and outputting the third drive voltage to turn off the third transistor.

20. The method of claim 19, and further comprising, if the absolute value of the sensing voltage with respect to the controller ground voltage reaches a second predetermined threshold:

outputting the first drive voltage to turn off the first transistor;

outputting the second drive voltage to turn on the second transistor; and outputting the third drive voltage to turn on the third transistor;

wherein the second predetermined threshold is larger than the first predetermined threshold.

* * * * *